United States Patent
Gorny

(10) Patent No.: US 10,551,989 B2
(45) Date of Patent: Feb. 4, 2020

(54) SYSTEM AND METHOD OF A CUSTOMER MANAGEMENT SYSTEM

(71) Applicant: Tomas Gorny, Scottsdale, AZ (US)

(72) Inventor: Tomas Gorny, Scottsdale, AZ (US)

(73) Assignee: Nextiva, Inc., Scottsdale, AZ (US)

( * ) Notice: Subject to any disclaimer, the term of this patent is extended or adjusted under 35 U.S.C. 154(b) by 361 days.

(21) Appl. No.: 15/078,818

(22) Filed: Mar. 23, 2016

(65) Prior Publication Data

US 2016/0349932 A1 Dec. 1, 2016

Related U.S. Application Data

(60) Provisional application No. 62/169,215, filed on Jun. 1, 2015.

(51) Int. Cl.
| | |
|---|---|
| G06F 3/0481 | (2013.01) |
| G06F 17/24 | (2006.01) |
| G06F 3/0484 | (2013.01) |
| H04M 3/51 | (2006.01) |
| H04L 12/24 | (2006.01) |
| H04M 3/42 | (2006.01) |
| H04L 12/26 | (2006.01) |
| H04W 24/08 | (2009.01) |
| H04W 24/10 | (2009.01) |
| G06Q 30/02 | (2012.01) |

(52) U.S. Cl.
CPC ........ *G06F 3/0481* (2013.01); *G06F 3/04845* (2013.01); *G06F 17/248* (2013.01); *G06Q 30/02* (2013.01); *H04L 41/18* (2013.01); *H04L 41/22* (2013.01); *H04L 43/045* (2013.01); *H04M 3/42068* (2013.01); *H04M 3/5133* (2013.01); *H04W 24/08* (2013.01); *H04W 24/10* (2013.01); *H04M 3/42348* (2013.01); *H04M 2203/558* (2013.01)

(58) Field of Classification Search
CPC .. G06F 3/0481; G06F 3/0484; G06F 3/04842; G06F 3/04847; G06F 17/248; H04M 3/22; H04M 3/5133; H04M 3/5141
See application file for complete search history.

(56) References Cited

U.S. PATENT DOCUMENTS

| | | | |
|---|---|---|---|
| 6,446,127 B1 * | 9/2002 | Schuster | G06F 1/1632 709/227 |
| 6,584,185 B1 * | 6/2003 | Nixon | H04M 3/42314 379/201.01 |
| 7,430,590 B1 * | 9/2008 | Rive | H04L 29/06 709/203 |
| 7,787,602 B2 | 8/2010 | Pearson et al. | |
| 8,761,372 B1 | 6/2014 | Adamson et al. | |
| | (Continued) | | |

OTHER PUBLICATIONS

European Search Report for Application No. EP 16804128 dated Dec. 7, 2018. 1 Page.

*Primary Examiner* — Amy Ng
*Assistant Examiner* — William Wong
(74) *Attorney, Agent, or Firm* — Spencer Fane LLP; Steven J. Laureanti

(57) ABSTRACT

A system and method are disclosed for an interface system comprising a communication device and a system administrator, the system administrator is configured to initiate a setup process, receive an identification number, receive user information, and in response to the setup process, associate the identification number with the user information.

15 Claims, 38 Drawing Sheets

(56) References Cited

U.S. PATENT DOCUMENTS

| | | | |
|---|---|---|---|
| 2001/0046862 A1* | 11/2001 | Coppinger | G06F 8/65 455/435.1 |
| 2002/0016721 A1* | 2/2002 | Mason | G06F 19/3418 705/3 |
| 2002/0032641 A1* | 3/2002 | Mendiola | G06Q 30/0267 705/37 |
| 2003/0096621 A1* | 5/2003 | Jana | G08G 1/0104 455/456.1 |
| 2004/0122693 A1* | 6/2004 | Hatscher | G06Q 10/06313 705/319 |
| 2007/0009158 A1* | 1/2007 | Geva | G06Q 10/10 382/209 |
| 2007/0032225 A1* | 2/2007 | Konicek | H04M 1/72513 455/417 |
| 2007/0038924 A1* | 2/2007 | Beyer | G06Q 30/02 715/201 |
| 2007/0067735 A1* | 3/2007 | Hawley | G06Q 10/087 715/792 |
| 2008/0075245 A1* | 3/2008 | Pearson | H04M 3/42161 379/88.13 |
| 2008/0098327 A1* | 4/2008 | Berkovitz | G06F 3/0481 715/803 |
| 2011/0173541 A1* | 7/2011 | Carlson | H04L 67/36 715/735 |

* cited by examiner

Pre-import validation summary _744_

We reviewed your file and found some errors or missing fields, highlighted below. Please make the necessary corrections in your file and re-upload. (no re-downloading necessary)

View error list ─746

_748_

| A | B | C | D | E | F |
|---|---|---|---|---|---|
| _750a_ | _750b_ | _750c_ | _750d_ | _750e_ | _750f_ |
| 1. Tomas | Gorny | tgorny | tgorny@unitedweb | Scottsdale | Administrator |
| 2. Josh | Kay | jkay | jkay@nextiva.com | Scottsdale | Manager |
| 3. Heather | Miller | hmiller | hmiller@unitedweb.com | Scottsdale | Agent |
| 4. Lindsay | Berman | lberman | lberman@unitedweb.com | New York | Manager |
| 5. Lukas | Gorny | lgorny | lgorny@nextiva.com | Scottsdale | Administrator |
| 6. Alex | Pufan | apufan | apufan@nextiva.com | Romania | Agent |
| 7. Tomas | Gorny | tgorny | tgorny@unitedweb.com | Scottsdale | Administrator |
| 8. Josh | Kay | jkay | jkay@nextiva.com | Scottsdale | Manager |
| 9. Heather | Miller | hmiller | hmiller@unitedweb.com | New York | Agent |
| 10. Lindsay | Berman | lberman | lberman@unitedweb.com | Scottsdale | Manager |
| 11. Lukas | Gorny | lgorny | lgorny@nextiva.com | Romania | Administrator |
| 12. Alex | Pufan | apufan | apufan@nextiva.com | Scottsdale | Administrator |
| 13. Tomas | Gorny | tgorny | tgorny@unitedweb.com | Scottsdale | Manager |
| 14. Josh | Kay | jkay | jkay@nextiva.com | Scottsdale | Agent |
| 15. Heather | Miller | hmiller | hmiller@unitedweb.com | New York | Manager |
| 16. Lindsay | Berman | lberman | lberman@unitedweb.com | Scottsdale | Administrator |
| 17. Lukas | Gorny | lgorny | lgorny@nextiva.com | Scottsdale | Agent |
| 18. Alex | Pufan | apufan | apufan@nextiva.com | Romania | Manager |
| 19. Tomas | Gorny | lgorny | lgorny@unitedweb.com | Scottsdale | Administrator |
| 20. Josh | Kay | jkay | jkay@nextiva.com | Scottsdale | Manager |

752─ Cancel   Upload ─754   Complete import ─756

| nextiva | Users | Locations | Advanced Routing | Devices | Call Center | Reporting | ⚙ Hi Lukas! |

Users

Manage users

Add users

Manage users ― 830

Search users 🔍

< Back
Matthew Baker ― 836

User profile ― 840a    852a                               842a

First Name                     Last Name
[Matthew]                      [Baker] ― 852b 852c           854a  ☑ Receives voicemails
User Name              Email
[Mbaker]               [mbaker@nextiva.com] ― 852d 852e                    If primary phone number is
Phone         Extension        unreachable, forward calls to
[(800) 412-4848 ▼]  [(8000)]   [mbaker@nextiva.com] ― 852g 852h       852f
Location            Time zone
[Scottsdale ▼]      [*3 Athens ▼] ― 852i 854b        Pin
☑ Authorized user  [12345] ― 852j
☑ E911 address is same as location ○
854c

*Street number   Street direction ○   *Street name ○
[           ]    [         ▼]         [            ]
      852k            852l

*Street type ○   Post street direction ○   Apt/Suite/Floor    852m
[        ▼]      [          ▼]             [         ▼]
      852n Apt/Suite/Floor number    *City   852o      852p
[                    ]    [                    ] ― 852r 852s       852q  852t              852u
*State          *Zip code        *Country
[      ▼]       [          ]     [United States ▼]
                                                    850
Licenses ⌄   Devices ⌄   Schedules ⌄   Greetings ⌄
                                                  [Save]
856a         856b        856c           856d

My account
Billing
Summary
History & invoices
Licensing
Lines & phones
Numbers Billing summary —1514

Current account overview
Lines in use  3 of 15 —1516a  Numbers transferred  2 of 3 —1516b  Devices in use  2 of 3 —1516c 1520a— Call type ∨  1520b— Minute Usage ∨  1520c— Credit usage ∨  Detail —1520d

| | | 1518 |
|---|---|---|
| International calls | 18:17:44 | $247.16  View |
| Toll-free calls | 243:43:55 | $509.95  View |
| Overage calls | 00:00:00 | $0.00  View |

Credit usage     $100.00
Monthly charges  $100.00
Current bill total $757.11

Visit History & Invoices for details

1524— Payment details summary

⊙  ◯◯  **  ** 9872   06/2017   ✎
◯  VISA  **  ** 2235   02/2017   ✎

Pay —1522

SYSTEM AND METHOD OF A CUSTOMER MANAGEMENT SYSTEM

CROSS-REFERENCE TO RELATED APPLICATIONS

The present disclosure is related to that disclosed in the U.S. Provisional Application No. 62/169,215, filed Jun. 1, 2015, entitled "System and Method of a User Interface System." U.S. Provisional Application No. 62/169,215 is assigned to the assignee of the present application. The subject matter disclosed in U.S. Provisional Application No. 62/169,215 is hereby incorporated by reference into the present disclosure as if fully set forth herein. The present invention hereby claims priority under 35 U.S.C. § 119(e) to U.S. Provisional Application No. 62/169,215.

TECHNICAL FIELD

The present disclosure relates generally to a system and a method for telecommunications and specifically to a customer management system.

BACKGROUND

In a typical user interface, most users cannot access all features because the interface is too complicated even for technologically adept users. For enterprise telecommunications systems, in particular, access to useful features might require many steps, which take too long to accomplish and are overly complicated.

Prior art telecommunication user interfaces require a team of administrators, and/or customer service telephone calls to fully utilize powerful features of a communication interface. Traditional prior art systems sacrifice functionality for ease of use or provide more functionality at the expense of making a difficult and overly complex user interface. In fact, prior art user interfaces have been unable to create a user interface that is simple to use while still providing high functionality. Some, traditional prior art systems add more features, without simplifying the user interface to make the features easy to use. Other prior art systems attempt to simplify the user interface, but, in so doing, eliminate many user-desired functions. The lack of an easy-to-use interface that also provides high functionality is undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

FIGS. 7A-7I illustrate an account setup wizard according to an embodiment;

FIGS. 8A-8G illustrate a user overview wizard according to the user interface of FIG. 5;

FIGS. 10A-10D illustrate a locations overview wizard according to the user interface of FIG. 5;

FIGS. 15A-15B illustrate an account wizard according to the user interface of FIG. 5; and FIGS. 16A-16B illustrate a user portal according to the user interface of FIG. 5.

DETAILED DESCRIPTION

Figure 1:
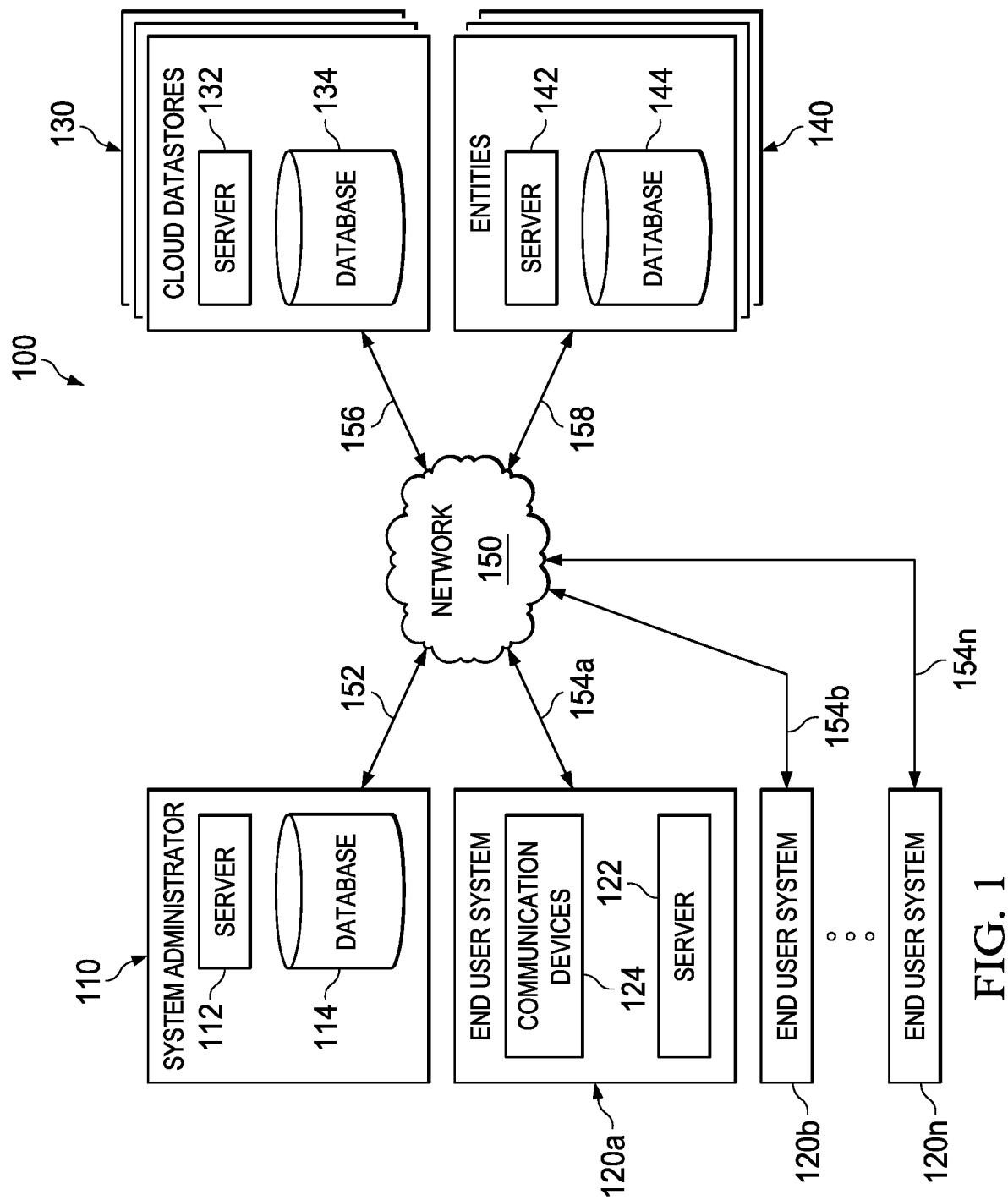
FIG. 1 illustrates an exemplary customer management system according to a preferred embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

FIG. 1 illustrates an exemplary customer management system 100, according to a preferred embodiment. Customer management system 100 comprises a system administrator 110, one or more end user systems 120a-n, one or more cloud datastores 130, one or more entities 140, network 150, and communication links 152, 154a-n, 156, and 158. Although a single system administrator 110, one or more end user systems 120a-n, one or more cloud datastores 130, one or more entities 140, a single network 150, and communication links 152, 154a-n, 156, and 158 are shown and described; embodiments contemplate any number of system administrators 110, end user systems 120a-n, cloud datastores 130, entities 140, networks 150, or communication links 152, 154a-n, 156, and 158 according to particular needs.

In one embodiment, system administrator 110 comprises server 112 and database 114. Server 112 is programmed to access, update and provide system administration, system updating, interface hosting, and database management associated with one or more end user systems 120a-n, one or more cloud datastores 130, and/or one or more entities 140, as discussed below in more detail. Database 114 comprises one or more databases or other data storage arrangements at one or more locations, local to, or remote from, system administrator 110. In one embodiment, one or more databases 114 is coupled with one or more servers 112 using one or more local area networks (LANs), metropolitan area networks (MANs), wide area networks (WANs), network 150, such as, for example, the Internet, or any other appropriate wire line, wireless, or any other communication links. One or more databases 114 stores data that is made available and may be used by one or more servers 112 according to the operation of customer management system 100.

In one embodiment, one or more end user systems 120a-n comprises an end user system such as, for example, a customer, buyer, seller, retailer, or any other business or enterprise coupled with one or more entities 140. Each of the one or more end user systems 120a-n comprises one or more communication devices 124. In addition, or as an alternative, each communication device 124 provides one or more end user systems 120a-n with a channel of communication between each of the one or more end user systems 120a-n and one or more entities 140. One or more end user systems 120a-n may be coupled with one or more entities 140 by network 150 via communication links 154a, 154b, and 154n.

According to an embodiment, one or more cloud datastores 130 comprises any server, system, or data arrangement that performs any one of the function described in connection with system administrators 110. One or more cloud datastores 130 comprise server 132 and database 134 that may comprise any database or datastore that replicates or works in connection with system administrator 110 according to any suitable distributed computing or remote data storage configuration.

In an embodiment, one or more entities 140 may be any entity, such as, for example, a business, company, enterprise, distributor, retailer, call-center, CRM specialist system, customer service system, help desk system, telephone or media service, social media service (such as FACEBOOK, TWITTER, or the like) or any entity which communicates with customers, either its own customers or the customers of another entity 140. One or more entities 140 may operate on one or more computers comprising one or more servers 142 and one or more databases 144 or other data storage arrangements at one or more locations which are integral to or separate from the hardware and/or software that support customer management system 100. These one or more entities 140 utilize customer management system 100 in order to monitor, score, and analyze the interactions and communications between one or more end user systems 120a-n and one or more entities 140.

According to some embodiments, one or more entities 140 comprise communication services such as an email service provider, VOIP or telephony provider, or any provider of communications. According to these embodiments, the communication services interact with other entities 140 to provide all the services indicated below with respect to entities. As an example only and not by way of limitation, an entity 140 that is a call-center may use the email and/or telephone services of another entity 140 which is a communication service. According to these embodiments, some data may be stored at one or more databases 144 of one or more entities 140 as indicated above and channels between one or more end user systems 120a-n may pass between one or more end user systems 120a-n and any one or more entities 140.

System administrator 110 including server 112 and database 114 is coupled with network 150 using communications link 152, which may be any wireline, wireless, or other link suitable to support data communications between system administrator 110 and network 150. One or more end user systems 120a-n is coupled with network 150 using communications links 154a-n, which may be any wireline, wireless, or other link suitable to support data communications between one or more end user systems 120a-n and network 150. One or more cloud datastores 130 including server 132 and database 134 may be coupled with network 150 using communications link 156, which may be any wireless or other link suitable to support data communications between one or more cloud datastores 130 and network 150. One or more entities 140 including server 142 and database 144 may be coupled with network 150 using communications link 158, which may be any wireless or other link suitable to support data communications between one or more entities 140 and network 150.

Although communication links 152, 154a-n, 156, and 158 are shown as generally coupling system administrator 110, one or more end user systems 120a-n, one or more cloud datastores 130, and one or more entities 140 with network 150, system administrator 110, one or more end user systems 120a-n, one or more cloud datastores 130, and one or more entities 140 may communicate directly with each other according to particular needs.

In an embodiment, network 150 includes the Internet, telephone lines, any appropriate local area networks LANs, MANs, or WANs, and any other communication network coupling system administrator 110, one or more end user systems 120a-n, one or more cloud datastores 130, and one or more entities 140. For example, data may be maintained by system administrator 110 or at one or more locations external to system administrator 110 and/or and made available to system administrator 110, one or more end user systems 120a-n, one or more cloud datastores 130, one or more entities 140 using network 150 or in any other appropriate manner. Those skilled in the art will recognize that the complete structure and operation of communication network 150 and other components within customer management system 100 are not depicted or described. Embodiments may be employed in conjunction with known communications networks and other components.

In one embodiment, system administrator 110, one or more end user systems 120a-n, one or more cloud datastores 130, and/or one or more entities 140 may each operate on one or more computers or computer systems that are integral to or separate from the hardware and/or software that support customer management system 100. In addition or as an alternative, one or more users, such as end users or representatives, may be associated with customer management system 100 including system administrator 110, one or more end user systems 120a-n, and/or one or more entities 140. These one or more users may include, for example, one or more computers programmed to autonomously configure, manage, and provide communications between system administrator 110, one or more end user systems 120a-n, and/or one or more entities 140 and/or one or more related tasks within customer management system 100. As used herein, the term "computer" or "computer system" includes any suitable input device, such as a keypad, mouse, touch screen, microphone, or other device to input information. Any suitable output device that may convey information associated with the operation of customer management system 100, including digital or analog data, visual information, or audio information. Furthermore, the computer includes any suitable fixed or removable non-transitory computer-readable storage media, such as magnetic computer disks, CD-ROM, or other suitable media to receive output from and provide input to customer management system 100. The computer also includes one or more processors and associated memory to execute instructions and manipulate information according to the operation of customer management system 100.

In one embodiment and as discussed in more detail below, customer management system 100 provides a simplified user interface for setting up, configuring, managing, and providing telecommunications within customer management system 100. Customer management system 100 provides a user interface of the current disclosure that is easy to use while also maintaining a high level of functionality. According to an embodiment, customer management system 100 provides a user interface that sets up, manages, configures, and provides communications utilizing one or more communication platforms, such as, for example, BROADSOFT™ telecommunication service or HOMEGROWN SOLUTIONS™ telecommunication service to provide communications between system administrator 110, one or more end user systems 120, and/or one or more entities 140.

As will be explained in more detail below, a user interface of customer management system 100 provides interface tools that are easy to access from local or remote locations and is configured to reduce the number of actions and time to perform set up and configuration of customer management system 100. According to some embodiments, the user interface of customer management system 100 is located at one or more servers 112, 122, 132, and 142 or remotely accesses servers through each communication device 124 using a communication protocol over network 150. According to embodiments, each communication device 124 may be assigned one or more identification numbers, such as IP addresses, that may be used to identify a communication device 124 at a fixed location in network 150 or to identify a communication device 124 as they are moved to different access points in network 150. According to these embodiments, communication devices 124 are associated with a user such that each communication device 124 will act the same no matter where it is connected in network 150. According to another embodiment, a user may associate each communication device 124 with the user's account, such that any features of that user's account may be accessed by any communication device 124 associated with the user.

For example, a user may connect a telephone, or other communication device 124, directly to network 150 through the computer, or directly to network 150. In addition, or as an alternative, customer management system 100 recognizes with an identification number (such an IP address) associated with communication device 124 regardless to where in network 150, it is connected.

According to some embodiments, system administrator 110 stores all configurations, settings, features, and functions associated with communication device 124 which provides for unplugging a communication device 124 from a first location, taking it to a second location, with the same configurations, settings, features, and functions, including the same phone number. According to some embodiments, communication device 124 may be location aware such that the configurations, settings, features, and functions associated with communication device 124 change automatically based on where or how communication device 124 connects to network 150.

According to some embodiments, each communication device 124 is associated with an identification number, such as an IP or MAC address, such that regardless of where communication device 124 is connected in network 150, system administrator 110 recognizes communication device 124 and associates configuration data 204 with that communication device 124.

Figure 2:
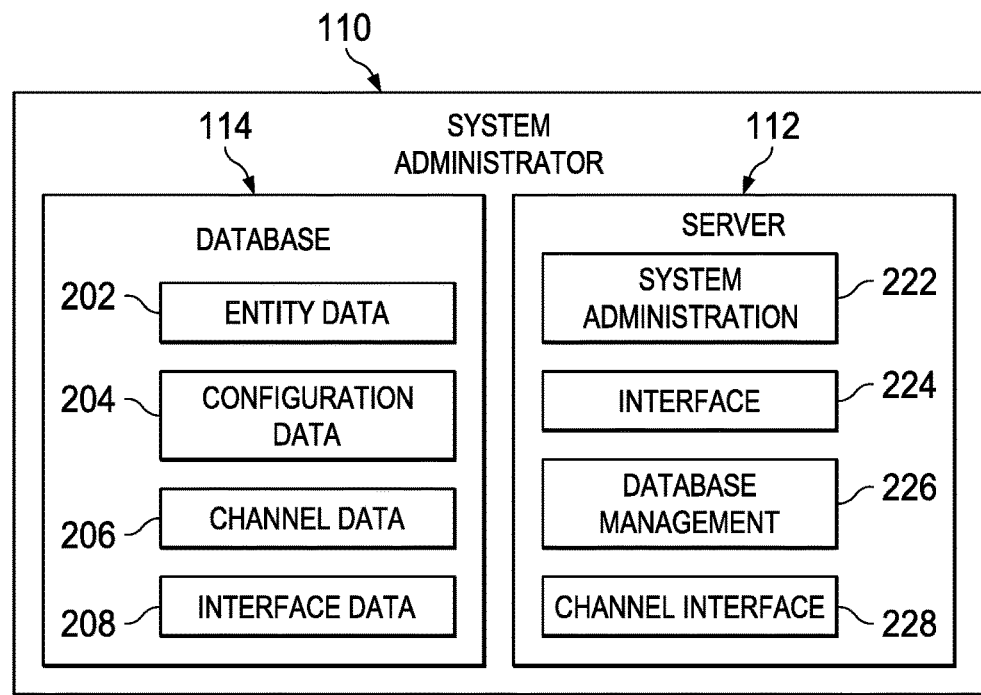
FIG. 2 illustrates the system administrator of FIG. 1 in greater detail according to an embodiment.

FIG. 2 illustrates system administrator 110 of FIG. 1 in greater detail, according to an embodiment. As discussed above, system administrator 110 comprises one or more computers at one or more locations including associated input devices, output devices, non-transitory computer-readable storage media, processors, memory, or other components for configuring, managing, and providing communications according to the operation of customer management system 100. In addition, and as discussed in more detail below, system administrator 110 comprises server 112 and database 114. Although system administrator 110 is shown and described as comprising a single computer, server 112 and database 114; embodiments contemplate any suitable number of computers, servers or databases internal to or externally coupled with system administrator 110. In addition, or as an alternative, system administrator 110 may be located internal to one or more entities 140. In other embodiments, system administrator 110 may be located external to one or more entities 140 and may be located in, for example, a corporate or regional entity of the one or more entities 140, according to particular needs.

Server 112 comprises system administration 222, interface 224, database management 226 and channel interface 228. Although a particular configuration of server 112 is shown and described; embodiments contemplate any suitable number or combination of these, located at one or more locations, local to, or remote from, system administrator 110, according to particular needs. In addition, or as an alternative, administration 222, interface 224, database management 226 and channel interface 228 may be located on multiple servers or computers at any location in customer management system 100.

Database 114 of system administrator 110 comprises entity data 202, configuration data 204, channel data 206 and interface data 208. Although, database 114 is shown and described as comprising entity data 202, configuration data 204, channel data 206 and interface data 208; embodiments contemplate any suitable number or combination of these, located at one or more locations, local to, or remote from, system administrator 110, according to particular needs.

Entity data 202 of database 114 describes the identification information of one or more entities 140 of customer management system 100. Entity data 202 comprises identification information, such as, for example, names, addresses, company, phone numbers, email, IP addresses, and the like. In one embodiment, entity data 202 is used by system administration 222 to identify one or more entities 140 in customer management system 100 to generate particular configurations of customer management system 100 specific to each of the one or more entities 140. As an example only and not by way of limitation, where one or more entities 140 is a customer service center, the identification information stored in entity data 202 permits system administrator 110 to generate a particularized user interface specific to the customer service center. Specifically, system administration 222 provides a particularized user interface specific to the industry of entity 140, the types of customers served by one or more entities 140, and/or the types of products sold by one or more entities 140. For example, particularized user interfaces may comprise a different arrangement of elements on user interface 500 (See FIG. 5). In one embodiment, the particularized user interfaces are stored in, for example, configuration data 204.

Configuration data 204 of database 114 comprises data which describes the various functionalities of customer management system 100 useful to each of one or more entities 140 and one or more end user systems 120a-n. In one embodiment, configuration data 204 comprises, for example, location data that describes where the data is generated or received by system administrator 110, one or more end user systems 120a-n, cloud datastores 130 and/or one or more entities 140. In another embodiment, configuration data 204 comprises settings and parameters that describe the system-level functioning of customer management system 100.

Channel data 206 of database 114 comprises the organization and setup of channel interface 228. According to some embodiments, channel data 206 comprises the particular communication channels which are open to a particular end user system 120a-n or entity 140, the times which the communication channels are open, the protocols or metadata which describe the communication, and/or any other configuration data and setup data necessary to configure channel interface 228. Interface data 208 of database 114 comprises the configuration, setup, and display data of user interface 224.

System administration 222 of server 112 may configure, update, and/or administer customer management system 100. That is, system administration 222 may provide services to configure the operation of customer management system 100 and change which data is executed and/or stored on system administrator 110, one or more end user systems 120a-n, and/or one or more entities 140. Embodiments contemplate a user-configurable customer management system 100, such that the data may be stored either singularly or redundantly on system administrator 110, one or more end user systems 120a-n, and/or one or more entities 140, according to particular needs. In addition, or as an alternative, system administration 222 receives, processes, updates, creates, and stores entity data 202 and configuration data 204.

Interface 224 of server 112 generates a user interface, such as user interface 500, described in more detail below. Various features of interface 224 include: generating charts, storing and retrieving historical data of customer relationship management, displaying notifications, and creating and managing calendars. Interface 224 stores and retrieves data from database 114 including entity data 202, configuration data 204, channel data 206, and interface data 208.

Database management 226 of server 112 provides a data sorting, retrieval, duplication, backup, creation and/or interface manager for data stored in database 114 to efficiently provide data to end user system 120a-n and one or more entities 140 and manage the data generated from various components of customer management system 100 that are stored in database 114. According to some embodiments, database management 226 organizes and stores the various types of data generated from customer management system 100 to provide real-time access of the data on database 114 to operate customer management system 100.

Channel interface 228 of server 112 generates, receives, and monitors communication between one or more entities 140 and one or more end user systems 120a-n. For example, channel interface 228 comprises one or more of VOIP, email, internet or web-based chat, and/or other types of communication systems useful for allowing an end user system 120a-n to contact one or more entities 140 or one or more entities 140 to contact other entities 140. For example, channel interface 228 initiates or receives communication to communication devices 124 of one or more end user systems 120a-n. In addition, channel interface 228 records the time, duration, date, voice, text, and other information transmitted.

Figure 3:
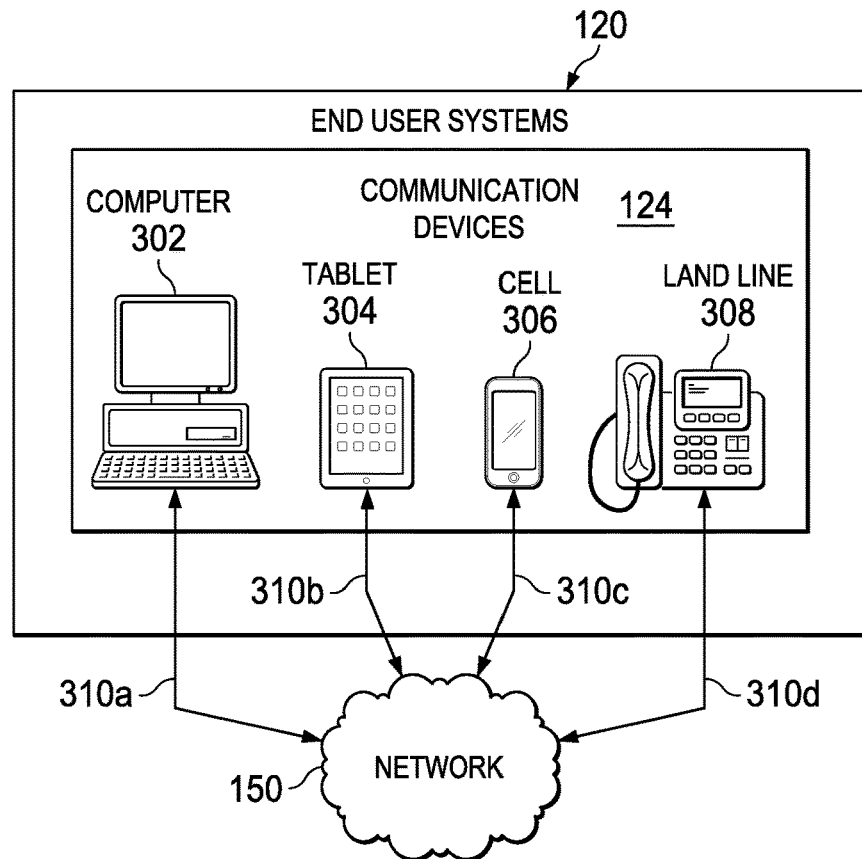
FIG. 3 illustrates the end user system of FIG. 1 in greater detail according to an embodiment.

FIG. 3 illustrates one or more end user systems 120a-n of FIG. 1 in greater detail according to an embodiment. One or more end user systems 120a-n each comprise communication devices 124, network 150 and communication links 310a-d and 314. As discussed above, each of one or more end user systems 120a-n comprise one or more computers at one or more locations including associated input devices, output devices, non-transitory computer-readable storage media, processors, memory, or other components that provide one or more end user systems 120a-n with a channel of communication between each of one or more end user systems 120a-n and one or more entities 140, according to the operation of customer management system 100. Although one or more end user systems 120a-n is shown and described as comprising a single computer, communication devices 124 and communication links 310a-d and 314 coupling one or more end user systems 120 to network 150; embodiments contemplate any suitable number of computers, servers or communication devices internal to or externally coupled with network 150.

Communication devices 124 comprise computers 302, tablet-type devices 304, smartphones 306 and land-line phones 308. Although particular communication devices are shown and described; embodiments contemplate any suitable communication device, according to particular needs. In one embodiment, computers 302, tablet-type devices 304, smartphones 306 comprise a processor, memory and data storage. The processor may execute an operating system program stored in memory to control the overall operation of computers 302, tablet-type devices 304, smartphones 306. For example, the processor may control the reception of signals and the transmission of signals within customer management system 100. The processor may execute other processes and programs resident in memory, such as, for example, registration, identification or communication and transferring data into or out of the memory, as required by an executing process.

Those skilled in the art will recognize that one or more specific examples of end user systems 120a-n are given by way of example and that for simplicity and clarity, only so much of the construction and operation of end user systems 120a-n as is necessary for an understanding of the present invention is shown and described. Moreover, it is understood that one or more end user systems 120a-n should not be construed to limit the types of communication devices in which embodiments of the present invention may be implemented. For example, one or more end user systems 120a-n may be any device, including, but not limited to, conventional cellular or mobile telephones, smart mobile phones, an IPHONE™, an IPAD™, wireless tablet devices, paging devices, personal digital assistant devices, short message service (SMS) wireless devices, portable computers, or any other device capable of wireless or network communication.

In addition, or as an alternative, system administrator 110, and/or one or more entities 140 provides one or more end user systems 120a-n access to one or more entities 140 in order to communicate over one or more channels. Among other things, embodiments enable customer service, such as troubleshooting and product set up, maintenance requests, refunds, providing product information, scheduling routine maintenance, requesting on-site maintenance, walkthroughs, company information, sales, taking purchase orders, scheduling meetings, changing passwords, website help, and the like.

Figure 4:
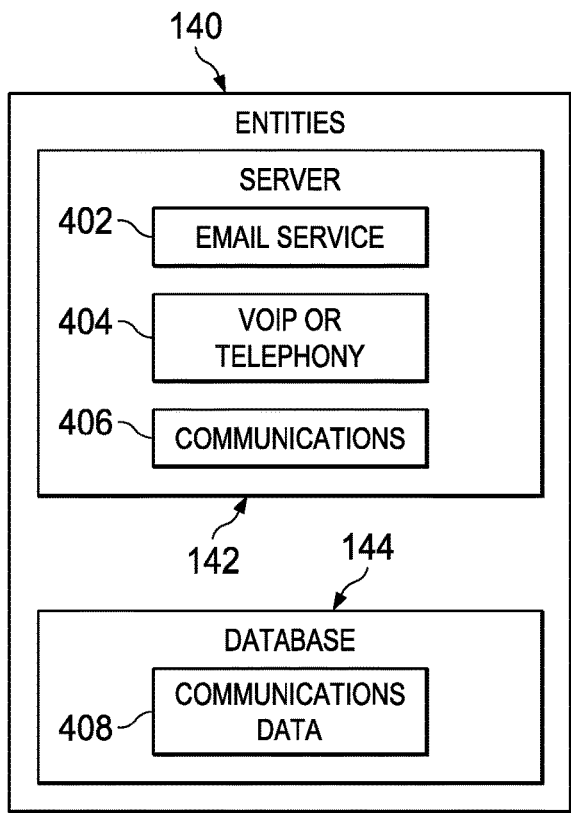
FIG. 4 illustrates the entities of FIG. 1 in greater detail according to an embodiment.

FIG. 4 illustrates one or more entities 140 of FIG. 1 in greater detail, according to an embodiment. As discussed above, one or more entities 140 comprises one or more computers at one or more locations including associated input devices, output devices, non-transitory computer-readable storage media, processors, memory, or other components for monitoring, scoring, and analyzing the interactions and communications between one or more end user systems 120a-n and one or more entities 140. In addition, and as discussed above, one or more entities 140 may be any entity, such as, for example, a business, company, enterprise, distributor, retailer, call-center, CRM specialist system, customer service system, help desk system, telephone or media service, social media service (such as FACEBOOK, TWITTER, or the like) or any entity which communicates with customers, either its own customers or the customers of another entity 140.

One or more entities 140 comprise server 142 and database 144. Although one or more entities 140 is shown and described as comprising a single computer, server 142 and database 144; embodiments contemplate any suitable number of computers, servers or databases internal to or externally coupled with one or more entities 140. In addition, or as an alternative, one or more end user systems 120a-120n may be located internal or external to one or more entities 140, such as, for example, a corporate or regional entity of one or more entities 140, according to particular needs.

Server 142 of one or more entities 140 comprises one or more communication services, such as, for example, email service 402, VOIP or telephony 404, and communications 406. Although a particular configuration of server 142 is shown and described; embodiments contemplate any suitable number or combination of these, located at one or more locations, local to, or remote from, one or more entities 140, according to particular needs. In addition, or as an alternative, email service 402, VOIP or telephony 404, and communications 406 may be located on multiple servers or computers at any location in customer management system 100.

Database 144 of one or more entities 140 comprises communications data 408. Although, database 144 is shown and described as comprising communications data 408; embodiments contemplate any suitable number or combination of these, located at one or more locations, local to, or remote from, one or more entities 140, according to particular needs.

According to some embodiments, one or more communication services associated with server 142, interact with other entities 140 to provide communication services. For example, an entity 140 that is a call-center may use email service 402 and communications data 408 of another entity 140 or use VOIP or telephony 404 services and communications data 408 of another entity. Likewise, an entity 140 may use communications 406 and communications data 408 of another entity, according to particular needs. According to these embodiments, data may be stored at communications data 408 of one or more entities 140 as indicated above and channels between one or more end user systems 120a-n may pass between one or more end user systems 120a-n and any one or more entities 140.

Figure 5:
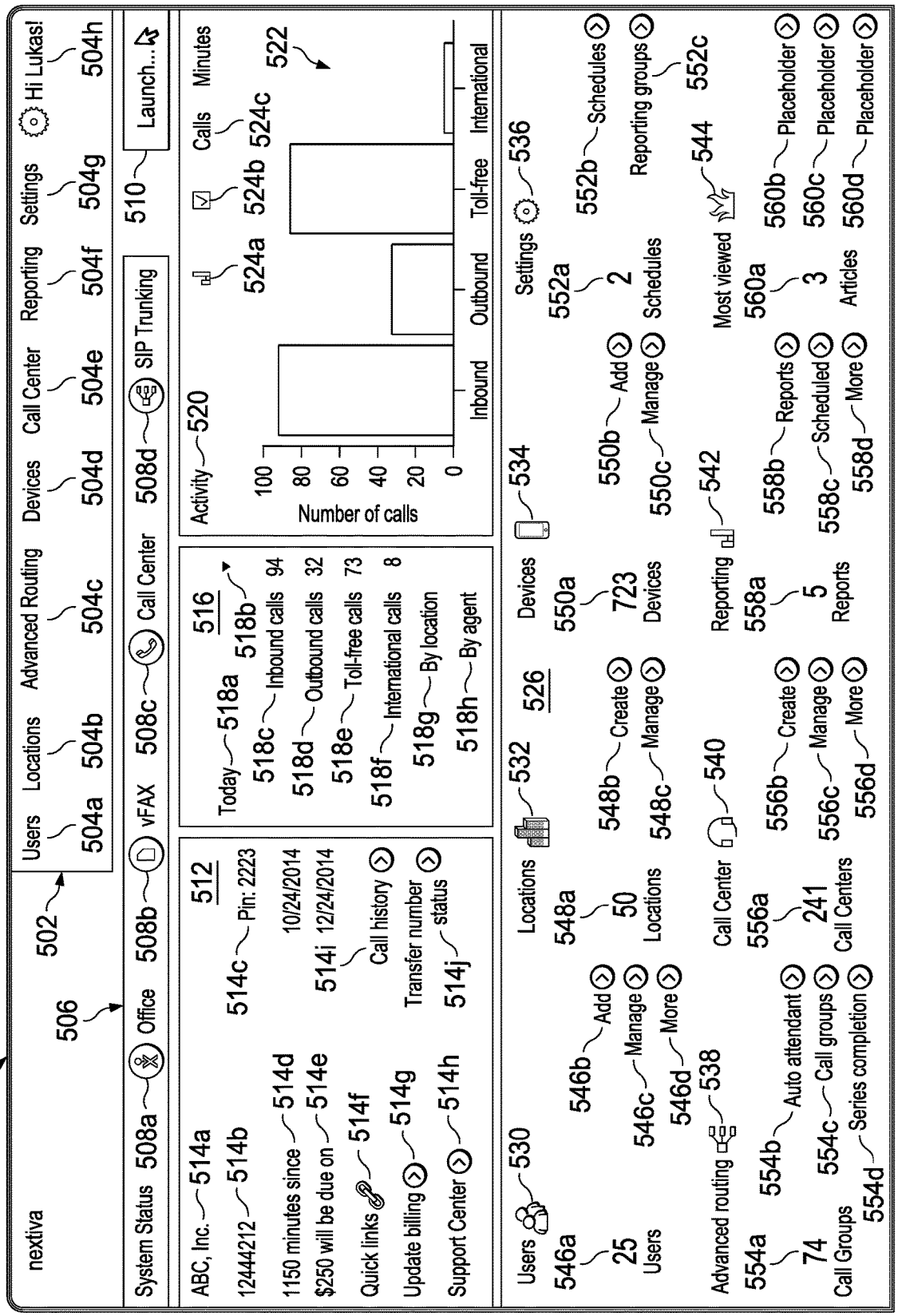
FIG. 5 illustrates a user interface according to an embodiment.

FIG. 5 illustrates user interface 500 according to an embodiment. User interface 500 comprises taskbar 502, status bar 506, quick launch button 510, account summary 512, call summary 516, activity summary 520, and dashboards 526. Although user interface 500 is shown and described as comprising a particular taskbar 502, status bar 506, quick launch button 510, account summary 512, call summary 516, activity summary 520, and dashboards 526; embodiments contemplate any suitable number or types of taskbars, status bars, buttons, summaries or dashboards, according to particular needs.

In one embodiment, one or more end user systems 120a-120n of customer management system 100 access user interface 500 to monitor, modify, and navigate customer management system 100 generated by interface 224 of server 112. As an example only and not by way of limitation, user interface 500 provides one or more end user systems 120a-120n with summaries, statistics, and charts illustrating use and status of, for example, a telecommunication system.

In other embodiments, user interface 500 provides access to high functionality, while providing a simplified and intuitive interface with viewing of information of customer management system 100, with one click access from login to access one or more features of customer management system 100. This provides quick access to high functionalities while providing a complete overview of an account in an intuitive way.

As will be discussed in more detail below, user interface 500 comprises a main information screen for a user login to user interface 500. User interface 500 may provide status and information about various wizard functionalities. According to an embodiment, status is received from a status system via an Application Program Interface (API) across one or more, or all, of the wizards or functionalities associated with user interface 500. Embodiments of the present disclosure provide a user with a quick and easy insight of the user interface system through user interface 500.

Taskbar 502 of user interface 500 comprises one or more user-selectable top-level menu choices 504a-504h. That is, taskbar 502 comprises users 504a, locations 504b, advanced routing 504c, devices 504d, call center 504e, reporting 504f, settings 504g, and user-selectable menu choice for adjusting log-in and user settings 504h. When top-level menu choice 504a-504h is selected from taskbar 502, user interface 500 is updated to display content representing that selection. For example, when users 504a is selected from taskbar 502, user interface 500 main wizard is replaced with user submenu wizard 600 (See FIG. 6). When other top-level menu choices 504a-504h are selected, the user interface 500 main wizard is replaced with the associated submenu wizard, as described more fully below.

According to some embodiments, taskbar 502 links to an overview wizard for one or more wizards, functions, or features of customer management system 100. For example, embodiments of the present disclosure provide a user a one click method to access any feature of function of the user interface system. According to an embodiment, a user of customer management system 100 can manage one or more other users of the system with, for example, a single input of the user interface system, such as a single click of a mouse. This provides for easy access to tools and general overviews of wizards.

Status bar 506 of user interface 500 comprises system status indicators 508a-508d, which illustrate the status of one or more subsystems of customer management system 100. For example, system status indicators 508a-508d may comprise a label and a button, wherein the color of the button indicates a status of the system. System labels may comprise, for example, "Office," "vFAX," "Call Center," and "SIP Trunking." Colors of the buttons may comprise, for example, green for a fully-functioning subsystem, yellow for a partially-functioning subsystem, and/or orange for an inactive subsystem.

Quick launch button 510 of user interface 500 comprises a user-selectable drop-down box that links to one or more submenus, features, or system configuration menus of user interface 500.

Account summary 512 of user interface 500 comprises an information summary of account information related to the currently logged-in account. Account information may be compiled from one or more databases of system administrator 110, one or more end user systems 120a-120n, and/or one or more entities 140. Such information of account summary 512 may comprise, for example, company name 514a, account number 514b, personal identification number (PIN) 514c, minutes used since a previous date 514d, account balance for a future date 514e, quick links configuration button 514f, update billing quick link 514g, support center quick link 514h, call history quick link 514i, and transfer number status quick link 514j. Although particular information and links are shown and described; embodiments contemplate any suitable information or quick links and any suitable arrangement of the same, according to particular needs.

Call summary 516 of user interface 500 comprises an information summary of call information related to the currently logged-in account. Call summary 516 comprises information sorted according to a time period 518a that may be user-adjusted by a time period drop down selection tab 518b. Based on time period 518a selected, call summary 516 displays call information according to the time period. For example, time period 518a selected in FIG. 5 is "today." In addition or as an alternative, call summary 516 may display call information or call history. For example, a dropdown box provides a selection box for one or more of "today," "yesterday," "last seven days," "last 30 days," and other like time periods. In addition, the call information may comprise the number of inbound calls 518c, outbound calls 518d, toll-free calls 518e, international calls 518f, calls by location 518g, and calls by agent 518h. Although the call information is shown and described as the number of calls; embodiments contemplate any call information or combination of call information, according to particular needs.

Activity summary 520 of user interface 500 comprises customizable charts and graphs that display the information of call summary 516 according to one or more user-selectable configurations. For example, activity summary 520 comprises chart 522 that display the number of calls for each of inbound calls, outbound calls, toll-free calls, and international calls. This call information may be configured to display different types of charts or graphs and different types of call information. For example, activity summary 520 comprises a chart selection tool 524a, an activity configuration button 524b, and a units selector 524c. Chart selection tool 524a comprises a drop down box that permits a user to select a different type of chart or graph, such as, for example, pie charts, line charts, bar charts, tables, or the like. In response a selection of a different type of chart or graph, chart 422 of activity summary 520 displays a presentation of information according to the selection. In one embodiment, activity configuration button 524b comprises a link to a configuration of activity information such as selecting what type of information to present, how that information is presented, or other configuration options, according to particular needs. In another embodiment, unit selector 524c permits a selection of what units the information in chart 522 is displayed in. According to the illustrated example, unit selector 524c permits a selection between calls and minutes; however embodiments contemplate any suitable units and any suitable presentation of information, such as dollars, time period, number of users, locations, devices, customers, or any like unit necessary for the presentation of call information.

Dashboards 526 of user interface 100 comprises users dashboard 530, locations dashboard 532, devices dashboard 534, settings dashboard 536, advanced routing dashboard 538, call center dashboard 540, reporting dashboard 542, and most viewed dashboard 544. Although dashboards 526 is shown and described as comprising particular dashboards; embodiments contemplate any suitable number or types of dashboards, according to particular needs. In addition, or as an alternative, as disused above, taskbar 502 comprises one or more user-selectable top-level menu choices 504a-504h that link to one or more dashboards 526.

According to an embodiment, dashboards 530-544 of user interface 500 correspond to high-level functionalities or other interfaces or wizards of customer management system 100. That is, dashboards 530-544 may provide one or more of the most commonly used features and one or more scores. As an example only and not by way of limitation, user score 546a for users dashboard 530 indicates the number of users set up on customer management system 100. According to some embodiments, a score represents the number of activities, the forms, or other functions within the interface or wizard associated with dashboards 530-544. In addition, or as an alternative, each of one or more dashboards 530-544 may display information relating to one or more subwizards associated with the dashboard and may comprise links to configuration settings or features associated with the subwizards.

For example, users dashboard 530 may comprise a user count 546a, an add user link 546b, a manager users link 546c, and a more users link 546d. Locations dashboard 532 may comprise a locations count 548a, a create locations link 548b, and a manage locations link 548c. Devices dashboard 534 may comprise a devices count 550a, a add devices link 550b, and a manage devices link 550c. Settings dashboard 536 may comprise a schedules count 552a, a schedules link 552b, and a reporting groups link 552c. Advanced routing dashboard 538 may comprise a call groups count 554a, an auto attendant link 554b, a call groups link 554c, and a series completion link 554d. Call center dashboard 540 may comprise a call centers count 556a, a create call centers link 556b, a manage call centers link 556c, and a more call centers link 556d. Reporting dashboard 542 may comprise a reports count 558a, a reports link 558b, a scheduled reports link 558c, and a more reporting link 558d. Most viewed dashboard 544 may comprise an articles count 560a, a plurality of placeholder links 560a-560c. Although FIG. 5 illustrates particular dashboards in a particular order, embodiments contemplate any number or combination of dashboards according to particular needs.

Figure 6:
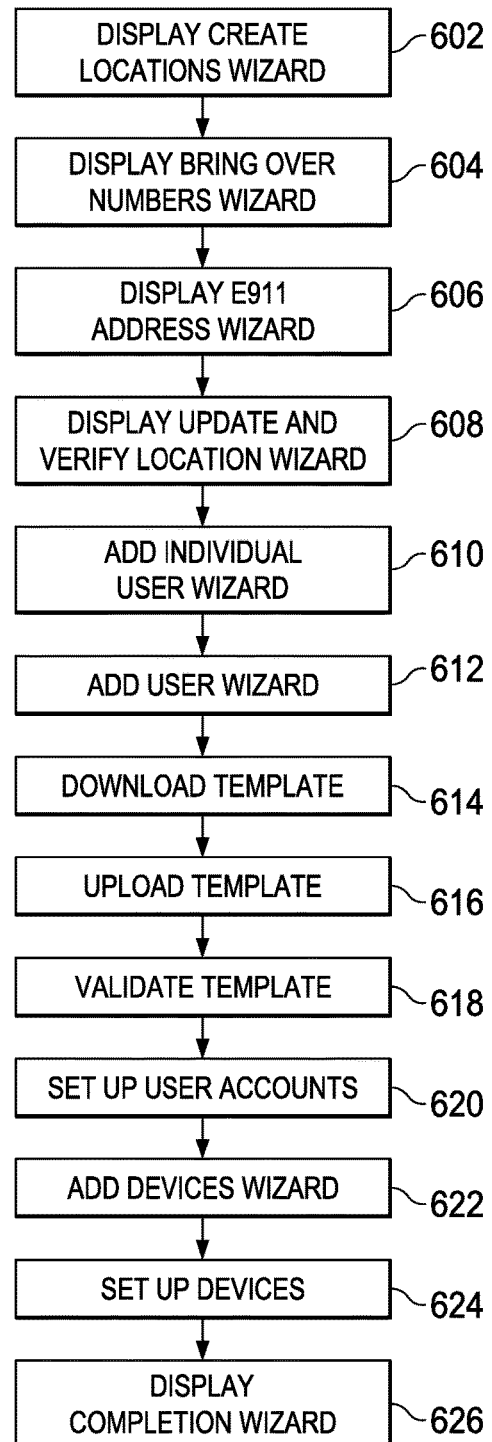
FIG. 6 illustrates an exemplary method of an account setup according to an embodiment.

FIG. 6 illustrates exemplary method 600 of an account setup according to an embodiment. Method 600 proceeds by one or more activities, which although described in a particular order may be performed in one or more permutations, according to particular needs. Method 600 may comprise one or more account setup wizards 7A-7H, according to an embodiment. In one embodiment, one or more account setup wizards 7A-7H may comprise a fast and easy-to-use user interface for setting up, for example, a phone system according to system administrator 110. In addition, or as an alternative, embodiments contemplate a guided user interface 500 that permits a user to setup a telephone system and one or more features of the telephone system according to the current disclosure.

Figures 7A, 7B:
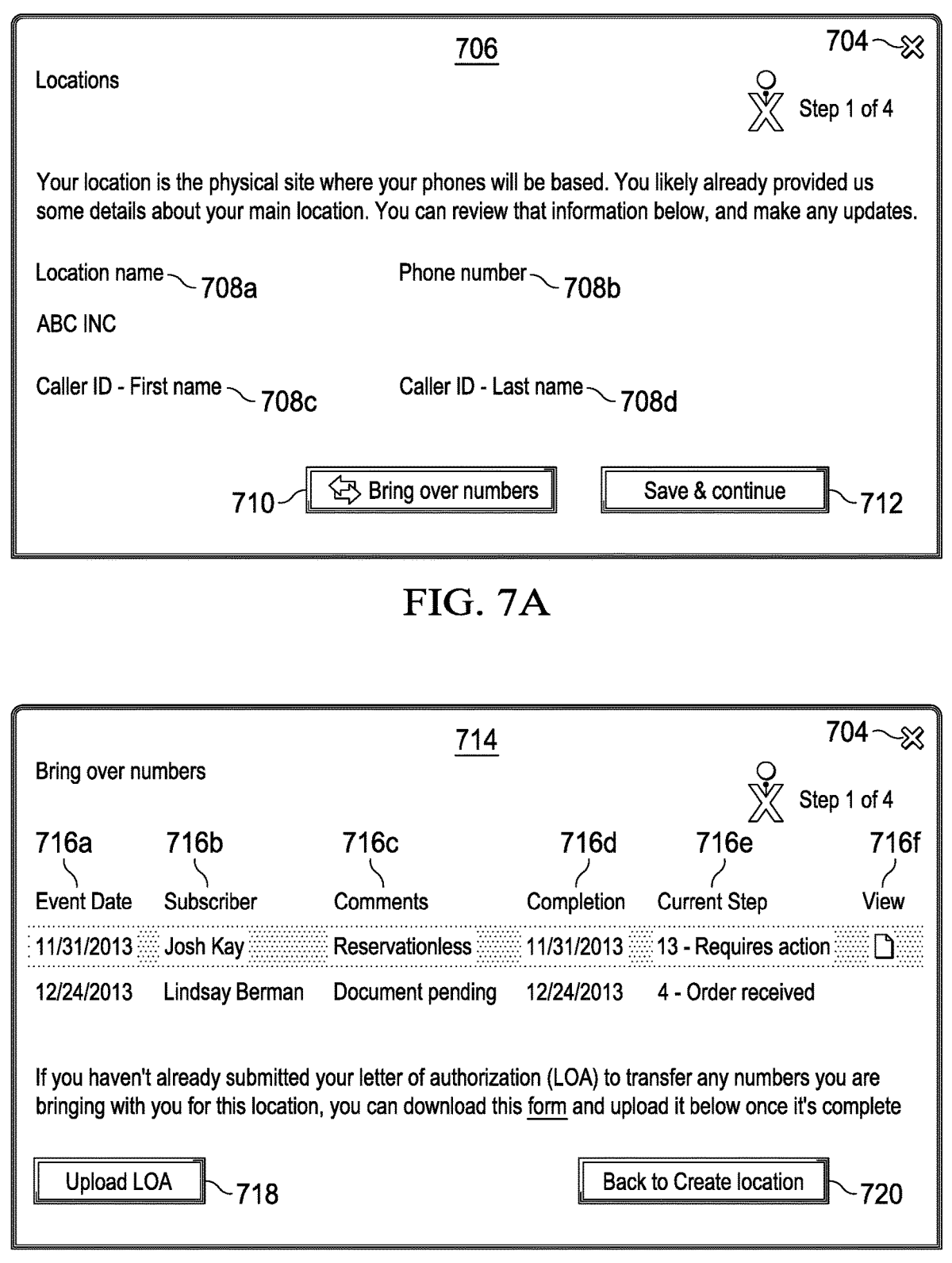
Figures 7C, 7D:
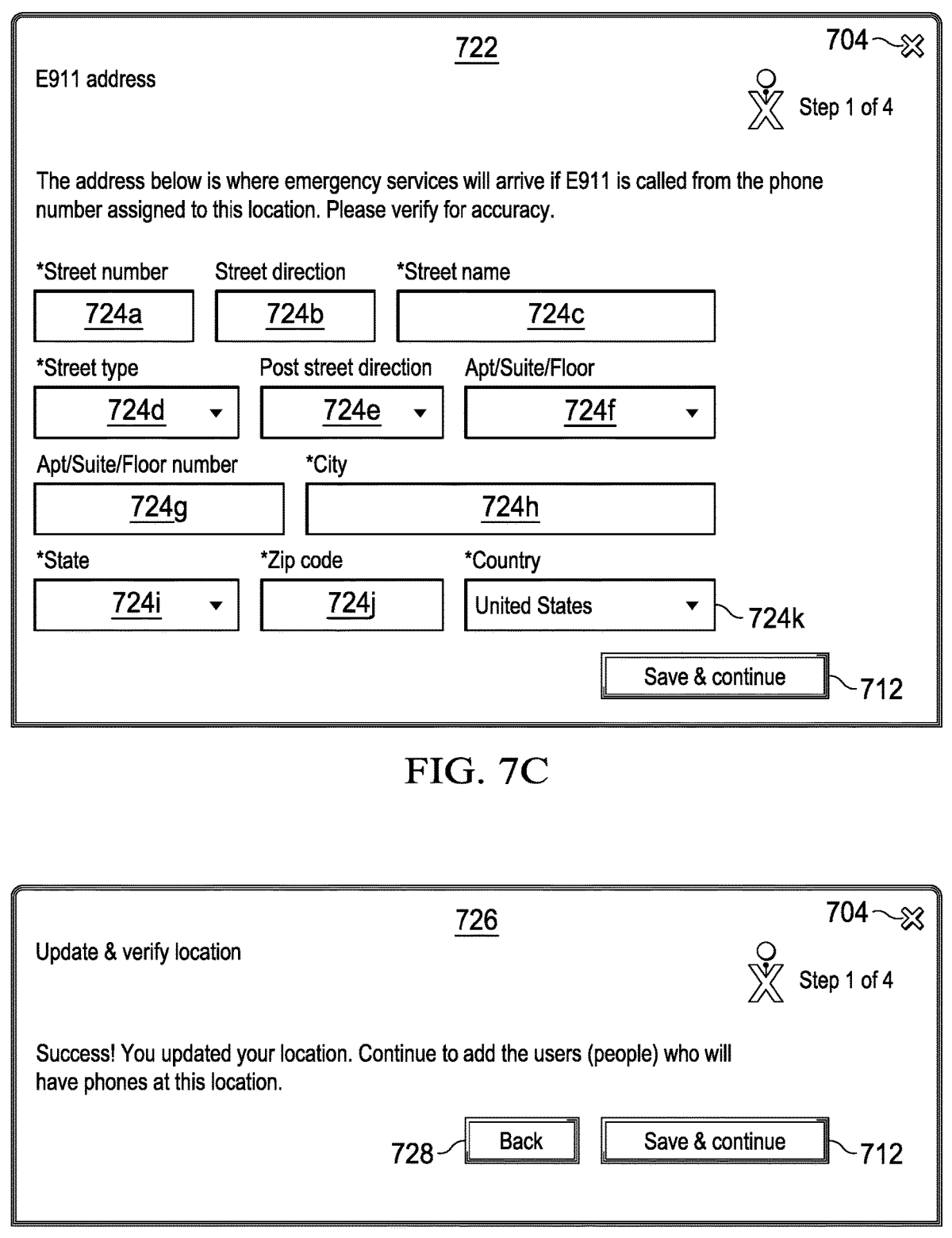
Figure 7E:
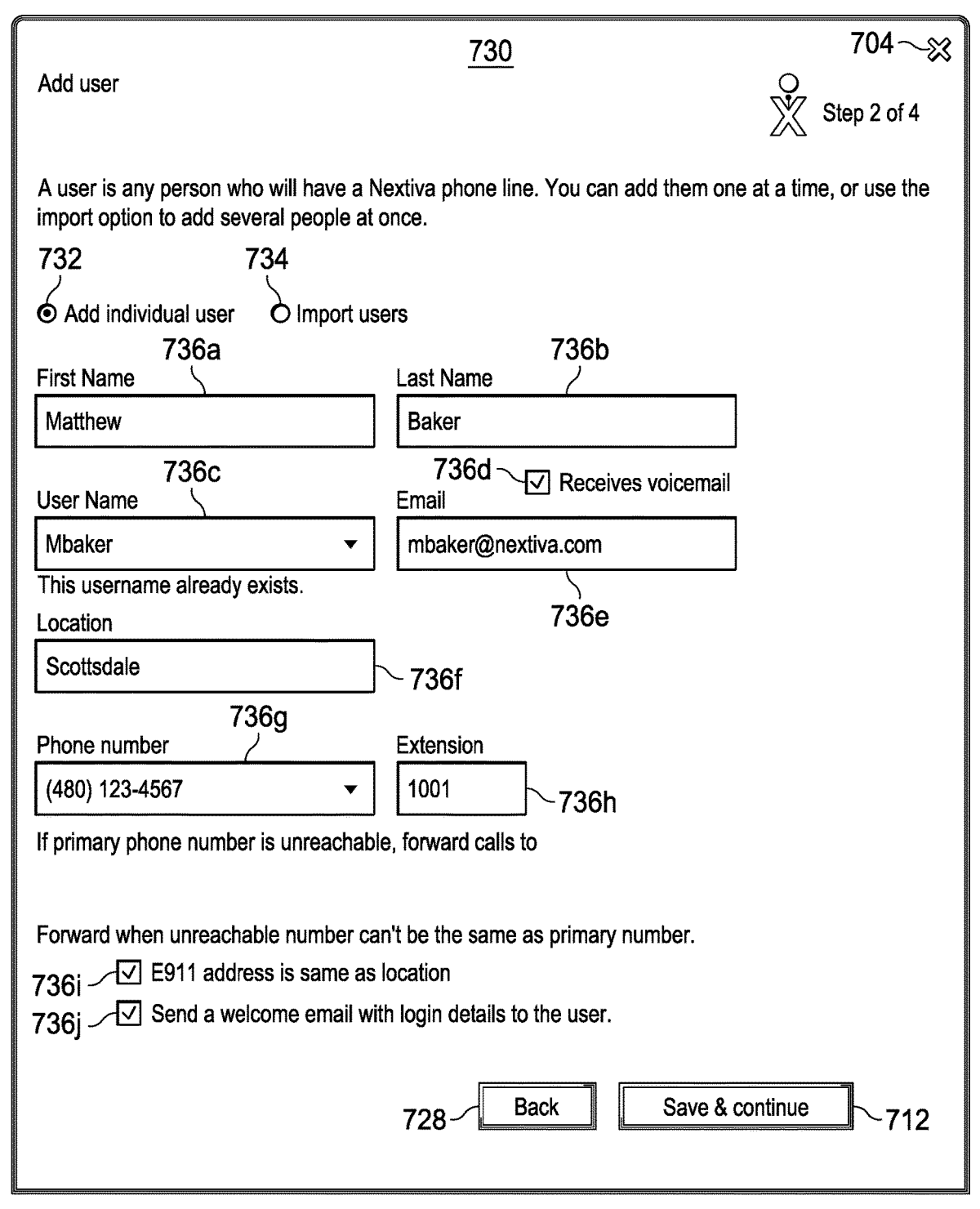
Figure 7F:
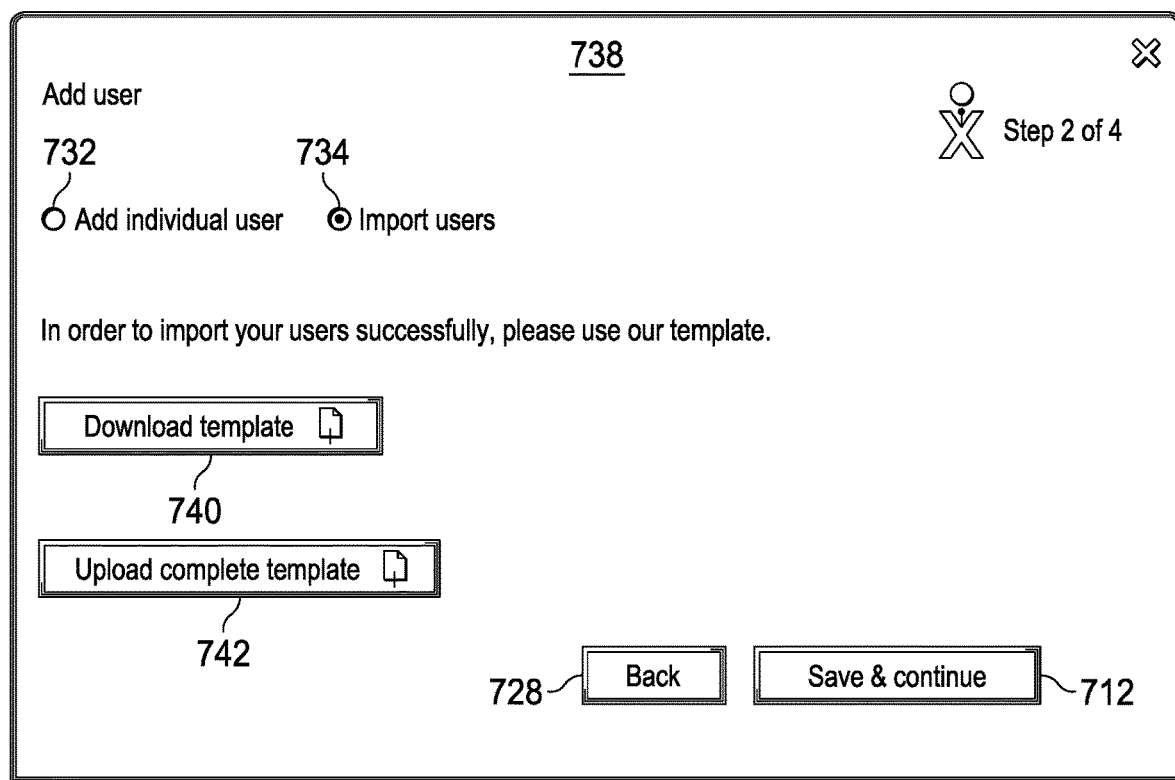

Method 600 begins at activity 602 where system administrator 110 displays locations wizard 706 (FIG. 7A) that permits the input of location information, such as, for example, location name 708a, phone number 708b, first name 708c, and last name 708d. After location data is entered, a user may select bring over numbers button 710 or save and continue button 712. In response to a selection of bring over numbers button 710, the method continues to activity 604. In addition, or as an alternative, exit button 704, may be selected at any of the one or more activities or wizards of method 600, and, in response, system administrator 110 may save or discard all or some of the entered data, according to particular needs.

At activity 604, system administrator 110 displays a bring over numbers wizard 714 (FIG. 7B) which displays the status of numbers that are ported from other communication services to system administrator 110. According to an embodiment, bring over numbers wizard 714 displays information associated with porting a number such as an event date 716a, subscriber 716b, comments 716c, completion 716d, current step 716e, and document view 716E Upload letter of authorization (LOA) button 718 permits a user to upload an LOA that may be required to port a number from one service to another. After a user has viewed or changed information on bring over numbers wizard 714, a user may select back to create location button 720 and return to locations wizard 706. At locations wizard 706, a user may select save and continue button 712 and the method continues to activity 606.

At activity 606, system administrator 110 displays an E911 address wizard 722 (FIG. 7C) which permits a user to enter an address in address input boxes 724a-724k, which associates each communication device 124 with a physical location. In one embodiment, the physical location may be used by emergency services to locate each communication device 124. After a user has entered a physical location in address input boxes 724a-724k, the user may select save and continue button 712, and the method continues to activity 608.

At activity 608, system administrator 110 displays an update and verify location wizard 726 (FIG. 7D), which provides for adding the updated users and locations. In response to a selection of back button 728, the method returns to activity 606, and the user may make changes to previously entered information. In response to a selection of save and continue button 712, the method continues to activity 610.

At activity 610, system administrator 110 displays add user wizard 730 (FIG. 7E) which permits a user to enter information for an individual user by selection of add individual user radio button 732 or import users by selection of import users radio button 734. According to an embodiment, add individual user radio button 732 is pre-selected and add user wizard 730 displays input and checkboxes 736a-736j that permit user input of information such as first name 736a, last name 736b, username 736c, request to receive voicemail 736d, email 736e, location 736f, phone number 736g, extension 736h, request to use E911 address as the same as entered location 736i, and request to send a welcome email with login details to an entered user 736j. In addition, or as an alternative, each user may be identified by, for example, a name, telephone number, address, username, email address or the like. One or more selection boxes enable one or more features to be associated with each user. In response to a selection of back button 728, the method returns to activity 608, and in response to selection of save and continue button 712, the method continues to activity 620.

At activity 612, system administrator 110 displays add user wizard 730 (FIG. 7F) comprising a download template button 740 and an upload complete template 742. In response to a selection of a download template button, method 600 continues to activity 614, and system administrator 110 sends an import user template to one or more end user systems 120a-120n. Import user template may comprise any suitable format or file that permits a user to input or generate user information to be added for setup of an account. After one or more end user systems 120a-120n inputs information into user information template, the user may select upload complete template button 742. In response, the method continues to activity 616, and one or more end user systems 120a-120n uploads the user template to system administrator 110. The method then continues to activity 618.

At activity 618, system administrator 110 receives the completed template, performs a validation check of the information contained in the user template, and generates a user template wizard 744 (FIG. 7G). In one embodiment, user template wizard 744 permits a user to edit information, view validation errors, cancel the upload, upload the template again after changing one or more fields of information, or complete the import of user information. In addition, or as an alternative, user template wizard 744 comprises a view error list selectable element 746, user information fields 748, cancel button 752, upload button 754, and complete import button 756.

In response to a selection of a view error list selectable element 746, system administrator 110 displays a list of errors detected by system administrator 110 in the user template. Errors may comprise, for example, inconsistent information, duplicate information, pre-assigned user information, or other like errors, according to particular embodiments. In addition, a user may directly edit the user information in user information fields 748 to correct information, which may be highlighted to indicate that an error is present in a particular field of information. Such information may include, for example, first name 750a, last name 750b, username 750c, email address 750d, location 750e, and role 750f Role 750f may indicate the position a user has within an enterprise or may indicate an access level for using customer management system 100. Roles 750f may include, for example, administrator, manager, and agent.

According to an embodiment, the user template module provides for adding many users at a single time by, for example, importing by a CSV file. According to this embodiment, a user downloads a file from system administrator 110 according to a template that is created, the user information is provided on the template, and the template is uploaded to system administrator 110. After uploading, system administrator 110 provides a pre-import validation module, which, for example, parses the import file for errors, generates error codes, finds fields which are missing information or are invalid, and permits a user to upload a new version of the CSV file or correct the errors shown. This provides for adding one, ten, hundreds, or more of users or businesses in a single simplified process. According to an embodiment, the user template module indicates the number of users added by the import file and may also indicate the number of users that were not added because of, for example, one or more errors. A user is then provided the option of downloading individually or in bulk a file to correct the information, or correcting the information directly through the module.

After one or more end user systems 120a-120n validates the information, cancel button 752, upload button 754, or complete import button 756 may be selected. In response to a selection of cancel button 752, method 600 returns to add users wizard 730 or import users wizard 738. In response to a selection of upload button 754, the method returns to activity 616 and one or more end user systems 120a-120n uploads the altered information in information fields 748 to system administrator 110. In response, the method may return to activity 618 and system administrator 110 may validate the template again.

In response to selection of complete import button 756, the method continues to activity 620 and system administrator 110 sets up user accounts for each of the users in information field 748. System administrator 110 sets up user accounts by associating user information with a user account.

Figure 7H:

At activity 622, system administrator 110 displays an add device wizard 758 (FIG. 7H). According to add device wizard 758, one or more devices may be associated with one or more users or user accounts. For example, a telephone system is selected and information about the system is input into the system. Additional devices may be added be selecting an appropriate button and other features may be added. In one embodiment, add device wizard 758 comprises system device radio button 760, bring a device radio button 762, import multiple devices radio button 764, model selection box 766, MAC address entry box 768, assign button 770, request email sent with authentication name and password box 772, and skip step selectable element 774.

When system device radio button 760 is selected, model selection box 766 may prepopulate with available models of communication devices 124 provided by customer management system 100 to one or more end user systems 120a-120n. After an appropriate model is selected, MAC address of the device is entered in MAC address entry box 768. After the model and MAC address are selected or entered, assign button 770 may be selected, and, in response, one or more end user systems 120a-120n causes the method to continue to activity 624, where system administrator 110 assigns the MAC address and device with a user of customer management system 100. When bring a device radio button 762 is selected, model selection box 766 may provide a text entry box or prepopulate with communication devices 124 that are compatible with customer management system 100. After an appropriate model is selected, MAC address of the device is entered in MAC address entry box 768. After the model and MAC address are selected or entered, assign button 770 may be selected, and, in response, one or more end user systems 120a-120n causes the method to continue to activity 626, where system administrator 110 assigns the MAC address and device with a user of customer management system 100.

When import multiple devices radio button 764 is selected, a template is downloaded to complete the necessary information, such as, for example, the MAC address, the device type and the user to assign each of the multiple devices to. Once completed, the template can be uploaded to system administrator 110.

After one or more communication devices 124 are assigned to one or more end user systems 120a-120n by system administrator 110, request email sent with authentication name and password box 772 may be selected, where system administrator 110 generates an email to be sent to an email address associated with one or more user accounts setup that will provide authentication name and password information. In addition, or as an alternative, in some instances, a communication device 124 may not be desired to be associated with a user account. According to embodiments, in this case, skip step selectable element 774 may be selected and the method will continue to activity 626, without assigning a MAC address and device with a user account.

Figure 7I:
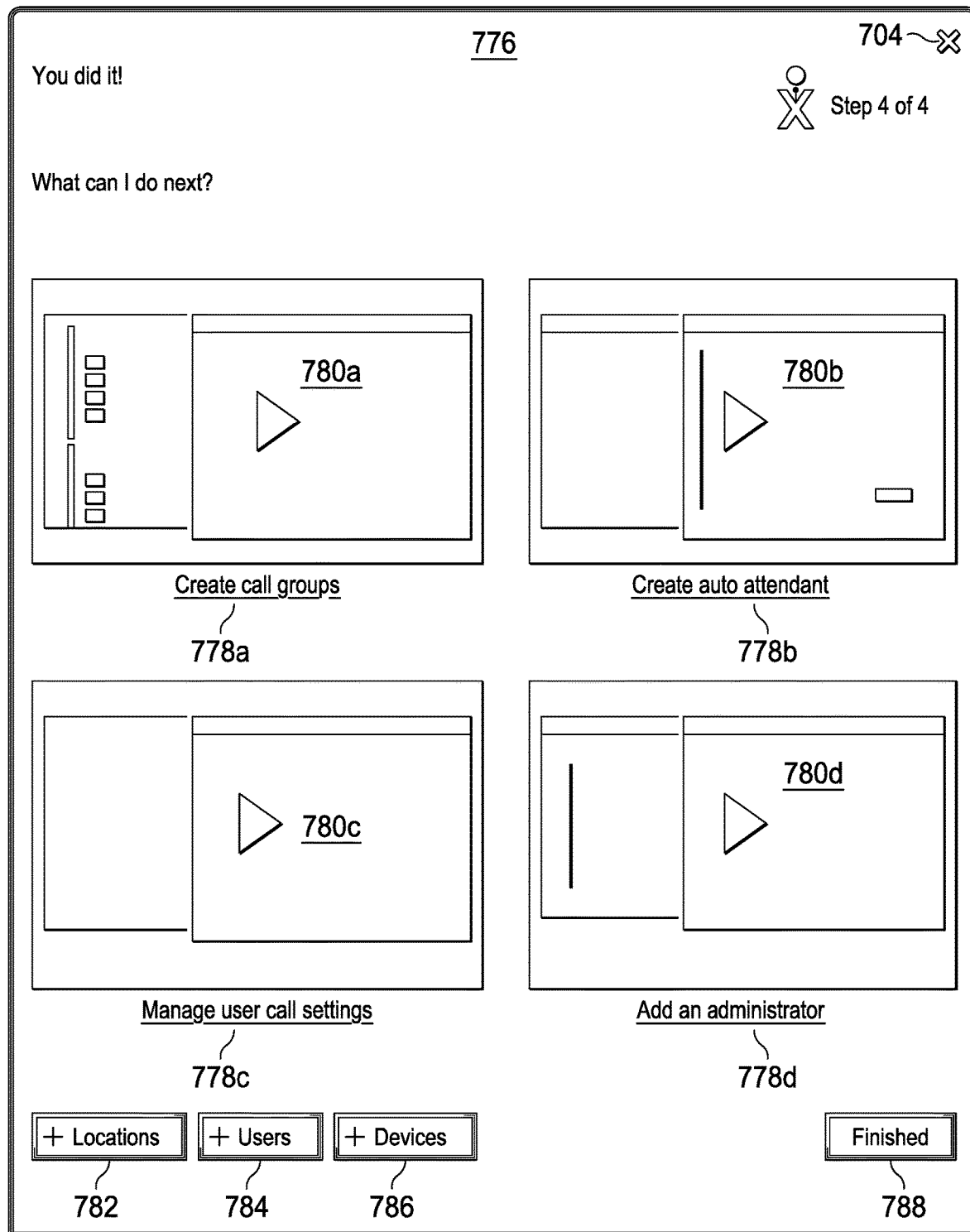

Back button 728 may be selected to return to a previous activity, or save and continue button 712 may be selected to continue to activity 626. At activity 626, system administrator 110 displays a completion wizard 776 (FIG. 7I). According to completion wizard 776 of the setup wizard, an indication that the phone system was successfully set up, is displayed. Selection buttons at the bottom of wizard 776 permit may be selected to add more locations 782, users 784, or devices 786. In addition, or as an alternative, one or more instructional videos may be played that demonstrate, for example, how to create call groups 780a, create auto attendants 780b, manage user call settings 780c, and/or add an administrator 780d.

According to an embodiment, completion wizard 776 may comprise links 778a-778d for and movies for how-to videos 780a-780d for creating call groups, creating auto attendants, managing user call settings, and adding an administrator, respectively. According to embodiments, completion wizard 776 provides access to adding more locations, users, or devices by add locations button 782, add users button 784, and add devices button 786. After the completion of the account setup wizard of method 600 is completed, finished button 788 is selected, and the method ends.

Figure 8A:
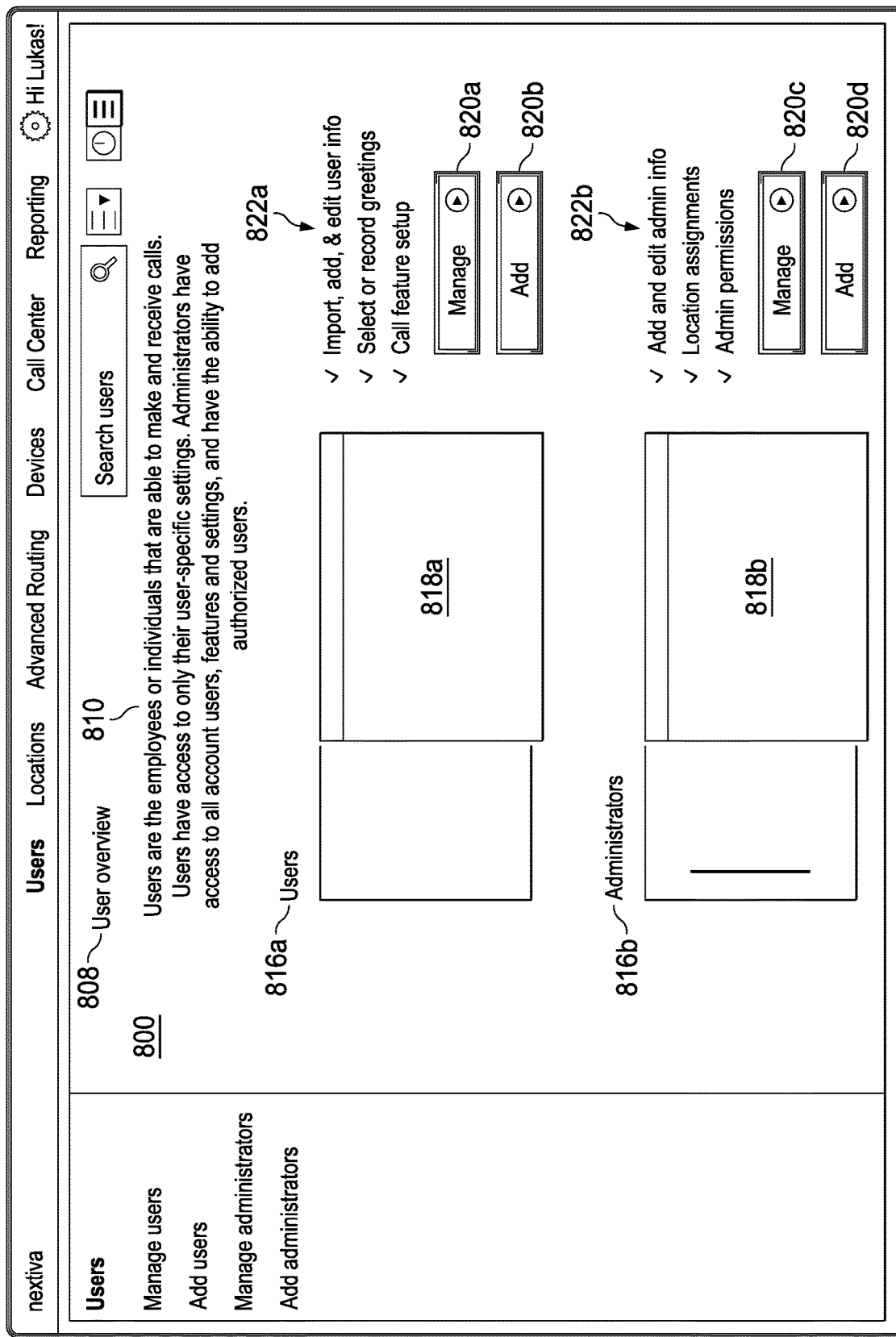

Returning now to user interface 500 of FIG. 5, scores associated with dashboards 530-544 may be updated to reflect the added users, locations, devices, or functionalities. In addition, account overview 512, call overview 516, and activity overview 520 are updated to reflect the new information. From user interface 500, selection of user top-level menu choice 504a causes user interface 500 to generate user overview wizard 800 (FIG. 8A). As used in this disclosure, selection of a button or link may be by customer management system 100 automatically monitoring a defined area of user interface 500, such as a button, link, or selectable area, and in response to a cursor, click, or other action occurring within the defined area, automatically generating a response in an attached computer to cause one or more defined functions, such as displaying a wizard or other elements, as described within this disclosure.

FIG. 8A illustrates user overview wizard 800 of user interface 500 according to an embodiment. In one embodiment, user overview wizard 800 permits a user to manage users, add users, manage administrators, and add administrators. Although particular elements are shown and described in association with overview wizard 800, embodiments contemplate any one or more elements or features, according to particular needs. User overview wizard 800 comprises a dynamic area which displays text, buttons, text or number entry boxes, and/or other types of dynamic elements that are configurable to allows for the input, display, or configure communication devices 124 and/or customer management system 100.

In one embodiment, user overview wizard 800 may comprise an overview 808, which in turn comprises overview information 810, help button 812, menu tool 814, and one or more feature overviews 816a-816b. Feature overviews 816a-816b comprise screenshots 818a-818b and link buttons 820a-820d, each of which relates to one or more features. For example, as shown in FIG. 8, users overview 808 comprises feature overviews for users 816a and administrators 816b. According to embodiments, each of feature overviews 816a-816b has one or more screenshots 818a-818b which displays on user interface 500 examples or pictures of updated user overview wizard 800 for the one or more features.

In addition, or as an alternative, the feature overview for users 816a comprises information 822a regarding that feature, including "Import, add, & edit user info," "select or record greetings," and "call feature setup." One or more link buttons 820a-820b allows for the selection of a feature, which causes user overview wizard 800 to update the display to show a wizard associated with the selected feature. In addition, the feature overview for administrators 816b comprises information 822b regarding that feature, including "add and edit admin info," "location assignments," and "admins permissions." One or more link buttons 820c-820d allows for the selection of a feature, which causes user overview wizard 800 to update the display to show a wizard associated with the selected feature.

Figure 8B:
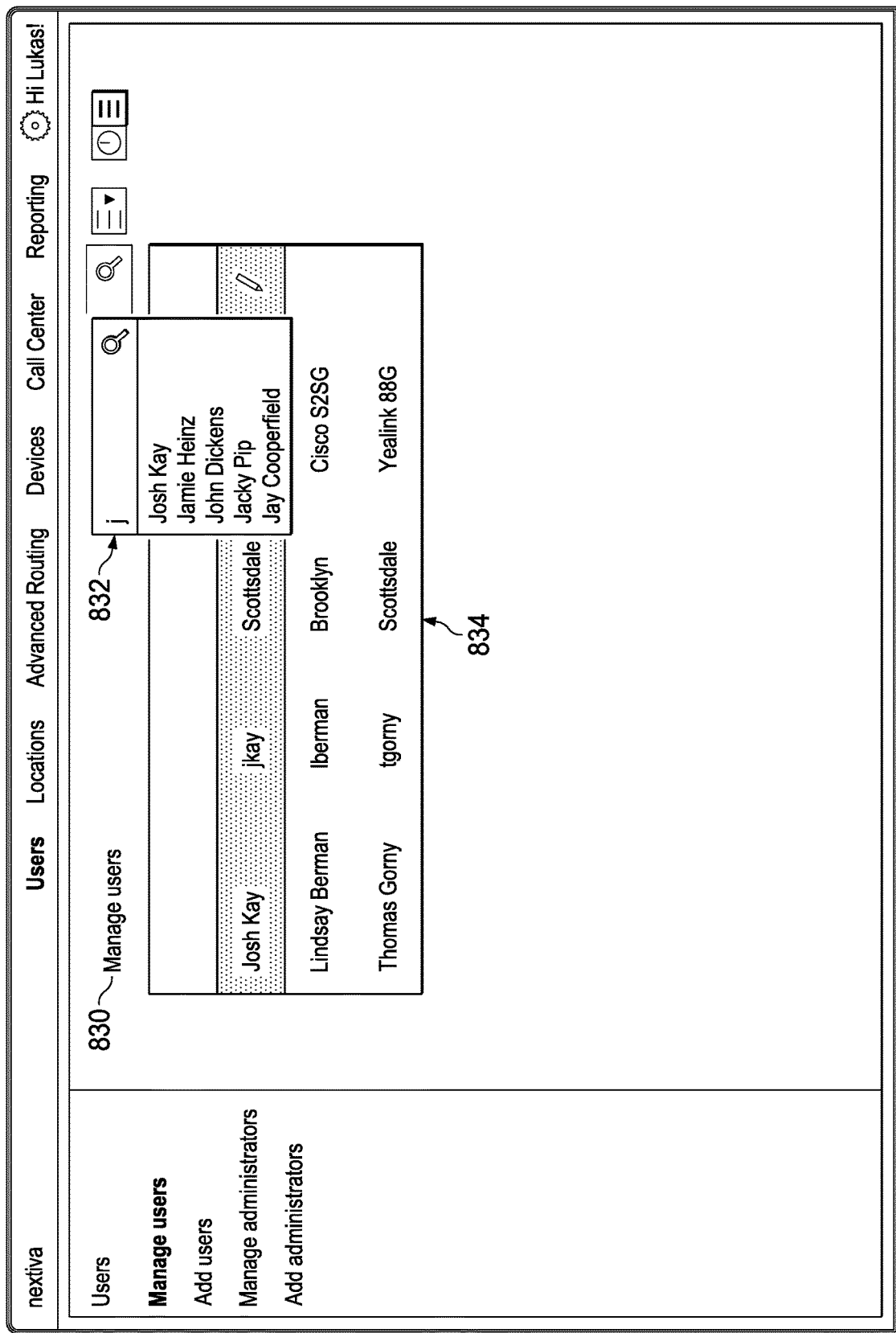

When manage 820a is selected to manage users, user overview wizard 800 is updated to display a manage users wizard 830 (FIG. 8B). In one embodiment, manage users wizard 830 permits the searching and selection of users associated with a communication account and adjusting the configurations and settings associated with the users. In addition, or as an alternative, manage users wizard 830 may comprise search bar 832 and list of users 834. Search bar 832 permits entering a query to search for one or more users associated with a communication account. List of users 834 comprises information about each of the users associated with the account, such as, for example, name, username, an associated location, and an associated communication device 124. Selection of one or more users permits editing the information or changing configurations and settings associated with the selected user.

Figure 8C:
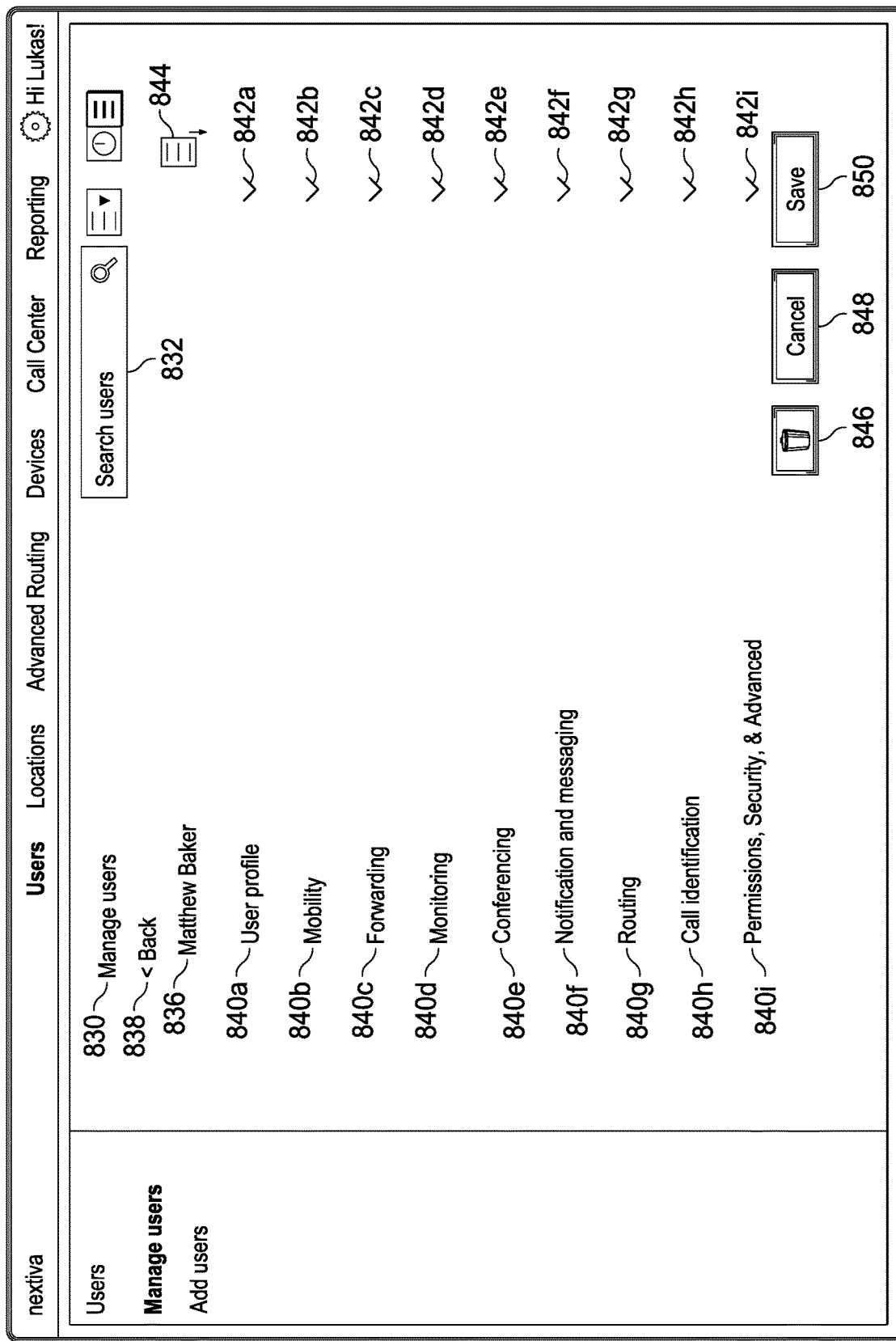
Figures 2, 8D:
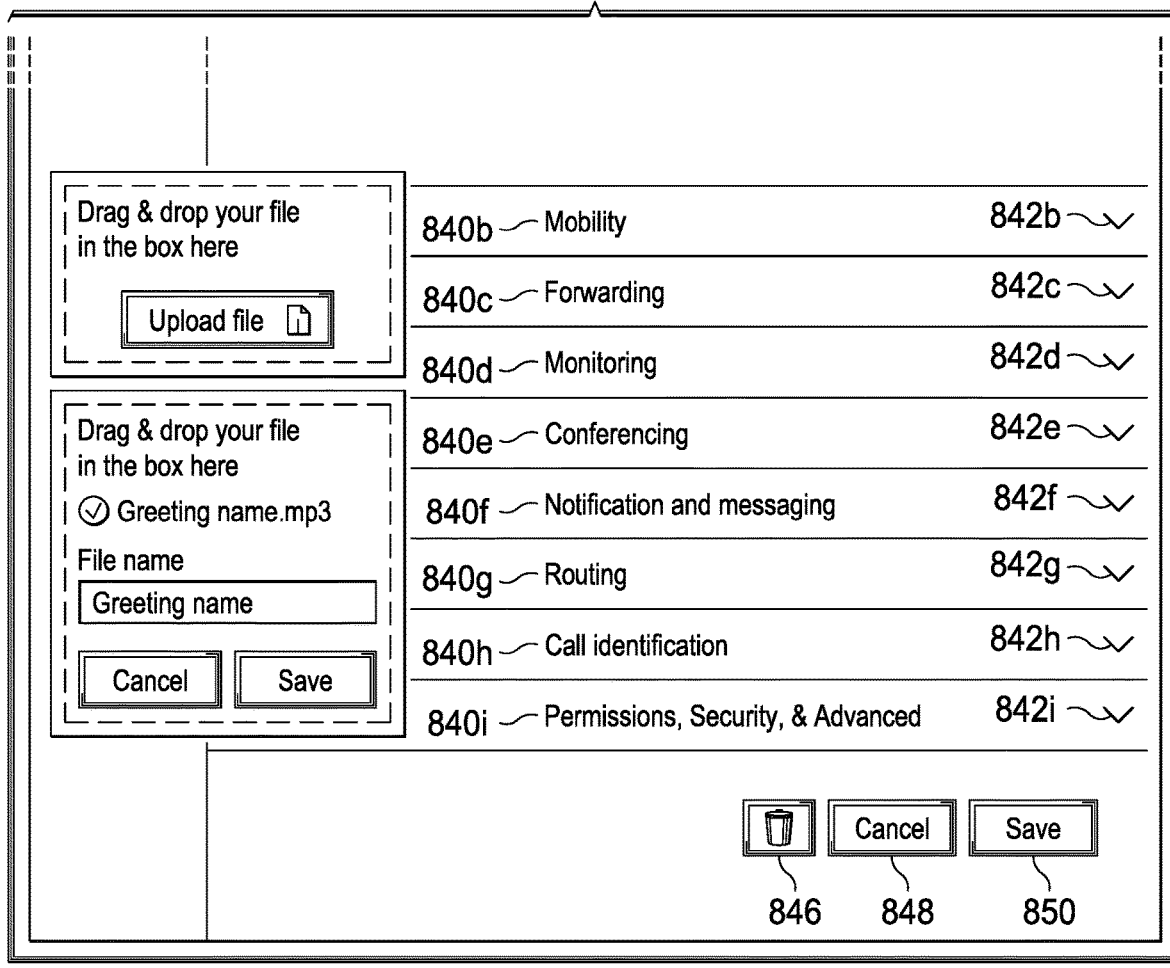

FIG. 8C illustrates manage users wizard 830 updated in response to selection of the user an exemplary user, i.e., Matthew Baker. In one embodiment, manager users wizard 830 displays a name of user 836, back button 838, configuration and settings subwizards 840a-840i, expand buttons 842a-842i, expand all button 844, delete user button 846, cancel button 848, and save button 850. Although manage users wizard 830 is described and illustrated with particular configuration and settings subwizards 840a-840i and a particular layout, embodiments contemplate any suitable categories or subcategories of configuration and settings subwizards 840a-840i arranged, according to particular needs. In addition, or as an alternative, each of expand buttons 842a-842i may expand the configuration and settings subwizard 840a-840i with which they are associated. For example, if user profile expand button 842a is selected, user profile configuration and settings subwizard 840a expands to reveal the configuration and settings of the user profile that may be edited, as shown in FIG. 8D. In addition, selection of expand all button 844 may expand all configuration and settings subwizards 840a-840i to reveal all configuration and settings associated with each configuration and settings subwizard 840a-840i.

For example, expanding the user profile configuration and settings subwizard 840a may reveal editable text boxes or drop-down selection boxes for first name 852a, last name 852b, username 852c, email 852d, phone number 852e, extension 852f, forwarding number 852g, location 852h, time zone 852i, PIN 852j, street number 852k, street direction 521, street name 852m, street type 852n, post street direction 852o, apt/suite/floor indicator 852p, apt/suite/floor number 852q, city 852r, state 852s, zip code 852t, and country 852u. According to some embodiments, expanding the user profile configuration and settings subwizard 840a may further reveal selection boxes for receiving voicemails by email 854a, authorizing a user 854b, and setting an E811 address the same as user location 854c. According to some embodiments, selectable elements allow for setting licenses 856a, devices 856b, schedules 856c, and greetings 856d. Once correct information has been entered or changed, selection of save button 850 uploads the information to server 114.

Once information has been entered or changed, a different configuration and settings subwizard 840a-840i may be selected, by selecting the associated expand buttons 842a-842i to reveal the configuration and settings associated with the respective configuration and settings subwizard 840a-840i. According to some embodiments, configuration and settings associated with each configuration and settings subwizard 840a-840i are revealed according to an accordion function, as described in more detail below. According to an embodiment, one or more wizards of customer management system 100 comprises an accordion function, which comprises a system and method for sectioning off particular information to permit a user to see only the most relevant or necessary information to provide for greater ease of use. According to an embodiment, an accordion function comprises sectioning off information depending on the associated feature, the profile setting, what the system determines is important to the user, such as providing a "bite-sized" field to provide for a not overwhelming interface for the user.

Figure 9:
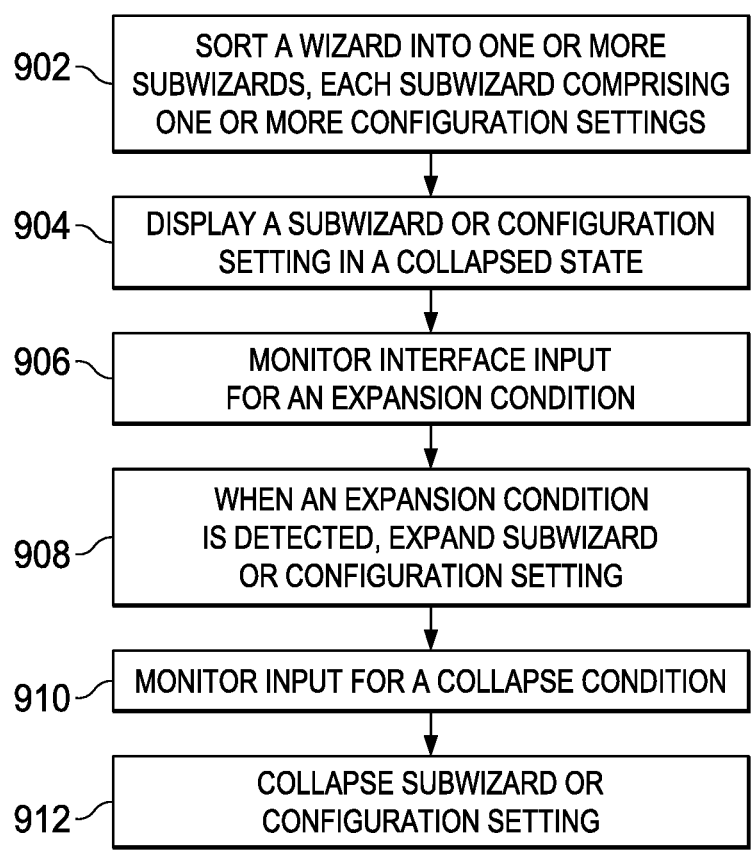
FIG. 9 illustrates an exemplary method of an accordion function.

FIG. 9 illustrates an exemplary method 900 of an accordion function according to an embodiment. Method 900 proceeds by one or more activities, which although described in a particular order may be performed in one or more permutations, according to particular needs. Method 900 may comprise one or more account setup wizards 8E-8G, according to an embodiment.

In one embodiment, the user interface system automatically minimizes the completed steps, so that the complex and long process of setting up or editing a functionality of customer management system 100 is divided into manageable parts by eliminating or hiding unused or unnecessary information. Instead of a user needing to scroll up and down the wizard to navigate the user interface, the system automatically hides unused information from the user, and presents only the information of the current step or a portion of the current step. According to some embodiments, the user interface hides portions of the user interface that do not pertain to that particular user. In this manner, system administrator 110 divides long tasks into small and manageable tasks, which guides a user through one or more setup or editing wizards or processes of customer management system 100.

Method 900 begins at activity 902 by sorting a wizard into one or more subwizards, where each subwizard comprises one or more configuration settings. For example, and as illustrated in FIG. 8C, wizard 830 is sorted according to subwizards 840a-840i. Each subwizard 840a-840i is, in turn, sorted according to one or more configuration settings in each subwizard, as will be explained in more detail below.

At activity 904, system administrator 110 displays a subwizard or configuration setting in a collapsed state. For example, each subwizard 840a-840i occupies a single line of text, and none of the configuration settings available in each subwizard is visible. Although subwizards are illustrated as comprising no visible configuration settings in a collapsed state, embodiments contemplate some collapsed states as comprising one or more configuration settings, selectable elements, or text entry or selection boxes, according to particular needs.

At activity 906, system administrator 110 monitors input for an expansion condition. For example, system administrator 110 may comprise a graphical user interface (GUI). According to a GUI embodiment, system administrator 110 may receive input through a mouse, touchscreen, cursor, or other input that comprises a visual representation of subwizards 840a-840i or configuration settings. Interface may detect a selection or movement inside an area of the interface, which indicates an expansion condition. Expansion conditions may comprise, for example, selecting an expansion button 842a, turning a switch on, entering text in a predetermined text entry box, selecting an item from a drop down selection box, clicking a button, or other types of input.

At activity 908, when an expansion condition is detected, system administrator 110 automatically expands a subwizard or configuration setting from a collapsed state into an expanded state that occupies a greater area of a display than the collapsed state. As illustrated in FIG. 8D, user profile subwizard 840a expands from a collapsed state in FIG. 8C. One or more text entry boxes associated with user profile subwizard 840a were not visible in the collapsed state, and other subwizards 840b-840i move to a lower portion of the display.

At activity 910, system administrator 110 monitors input for a collapse condition associated with a subwizard or a configuration setting. Collapse conditions may comprise a similar detected input as in expansion condition. A collapse condition may comprise a selection or movement inside an area of the interface, which indicates a collapse condition is desired to occur. Collapse conditions may comprise, for example, selecting an expansion button 842a for a second time or selecting an expansion button 842a when the associated subwizard is already in an expanded state, turning a switch off, entering text in a predetermined text entry box, selecting an item from a drop down selection box, clicking a button, or other types of input. According to some embodiments, a collapse condition for one subwizard may be the same as an expansion condition for another subwizard. For example, when user profile subwizard 840a is collapsed, mobility subwizard 840b automatically expands in response to the same input.

Figure 8E:
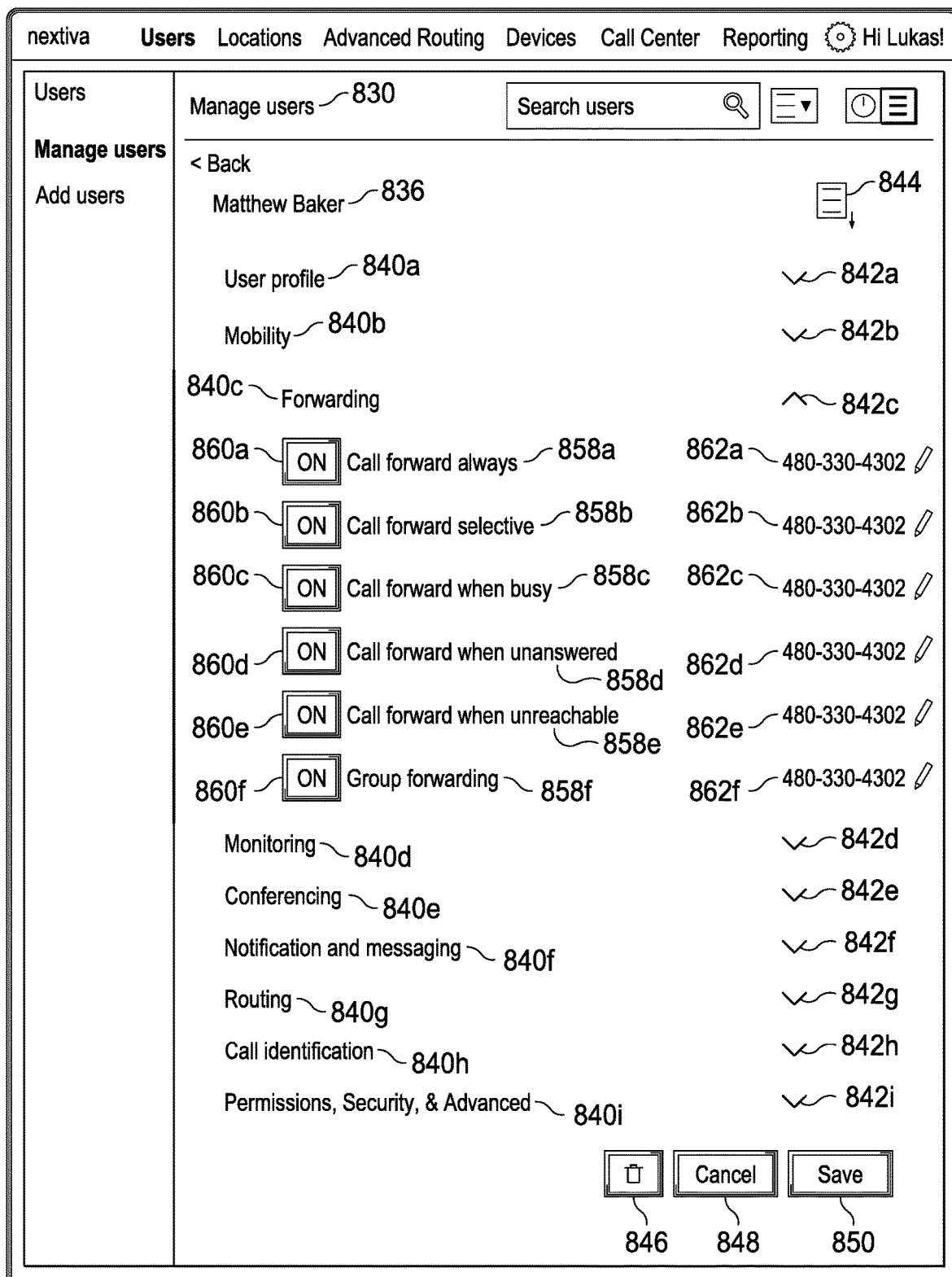

At activity 912, system administrator 110 automatically collapses a subwizard or configuration setting from an expanded state into a collapsed state that occupies a lesser area of a display than the expanded state. As illustrated in FIG. 8E, user profile subwizard 840 now occupies an area of the display in a collapsed state less than the area of the display in an expanded state.

To further illustrate the accordion function, an example is now given. In the following example, FIG. 8E illustrates manage users wizard 830 updated in response to selection of the forwarding configuration and settings subwizard 840c. Configuration settings of the forwarding configuration and settings subwizard 840c provides for call forwarding functionalities to be toggled on and off based on which particular phone number is illustrated on the wizard. For example, configuration settings of the forwarding configuration and settings subwizard 840c may comprise call forward always 858a, call forward selective 858b, call forward when busy 858c, call forward when unanswered 858d, call forward when unreachable 858e, and group forwarding 858f. Each of the configuration settings 858a-858f may be associated with a switch 860a-860f and a phone number 862a-862f. Switch 860a-860f permits each of the configuration settings 858a-858f associated with the switch to be toggled between an "on" state and an "off" state based on the position of the switch. Phone numbers 862a-862f associated with each of the configuration settings 858a-858f permits entry one or more phone numbers to receive forwarded calls when switch 860a-860f is toggled to an "on" state.

According to embodiments, the accordion function provides for the second (or further) step not being processed or displayed until a first step is completed, which then turns on or activates the second step. For example, where a first step comprises turning on or off a button, once a user turns on or off the button, system administrator 110 guides the user to the second step. In other words, the entire process is not presented at once, but, instead, the accordion function allocates and provides easy access to the subsections. According to some embodiments, the accordion function logically groups wizard functions and features together based on, for example, user input. Based on this, system administrator 110 provides for an easy, linear access to use any one or more of the functionalities or features of the one or more wizards.

Figure 8F:
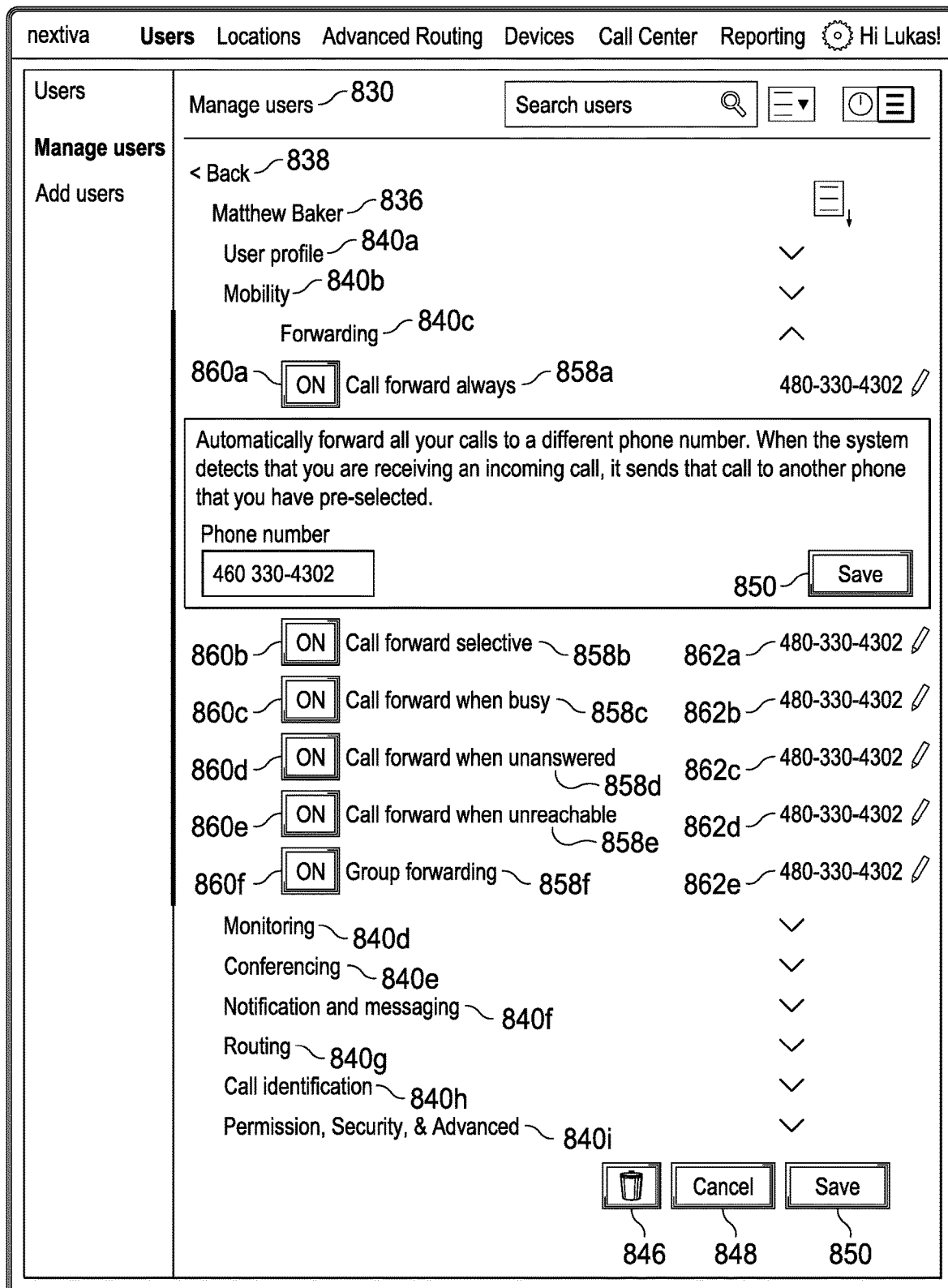

FIG. 8F illustrates manage users wizard 830 updated in response to selection of the call identification configuration and settings subwizard 840h. According to an embodiment, configuration settings of the identification configuration and settings subwizard 840h provides call identification functionalities to be toggled on and off a first item of the call identification wizard, such as, for example, a feature that has not been purchased.

According to an embodiment, call identification configuration and settings subwizard 840h is associated with the accordion function, turning on the first item of call identification subwizard 840h comprises a first step, and the further steps are provided for by the accordion function. For example, to add a number to call identification subwizard 840h, the plus sign is selected. When the plus sign is selected, a drop-own guide is presented by system administrator 110 that guides a user through the process, such as, filing in information, saving the information, and the process completes automatically, without a user scrolling or navigating to further wizards. Therefore, even though the functionality is complex, system administrator 110 provides only the information on a need-to-know basis, which provides an intuitive system that is easy to use, even for the most complex functionalities of customer management system 100. According to further embodiments, the accordion function eliminates many steps from a multi-step processes such as, for example, reducing the number of steps in a two, three, four, or more step process in order to provide an easier to use system. According to some embodiments, some wizards, functions, or features are provided for as a one-step process such as Caller ID functionality.

Returning to FIG. 8A, add 820b may be selected to add users. In response to selection of add 820b, user overview wizard 800 is updated to display add users wizard 730 or import users wizard 738 (FIG. 7E). The initial setup of each of the one or more wizards or functionalities is substantially similar to the look and feel of the editing process of the wizard or functionalities, such as providing a substantially similar editing a wizard functionality as when setting up the wizard or functionality. Therefore, once a user has setup the user interface system, the process to edit any of the features or information would be intuitive and familiar. The user would not need to relearn any of the process from setup to editing.

As discussed above, add users wizard 730 of FIG. 7E permits the adding of new users and import users wizard 738 permits importing users to customer management system 100. Data for adding new users or importing of users may be stored in configuration data 204 of user interface 500. In response to selection of manage 820c to manage administrators, user overview wizard 800 is updated to display a manage administrators wizard. Manage administrators wizard permits adding, deleting, or changing configuration settings of one or more users with administrator status.

Figure 8G:
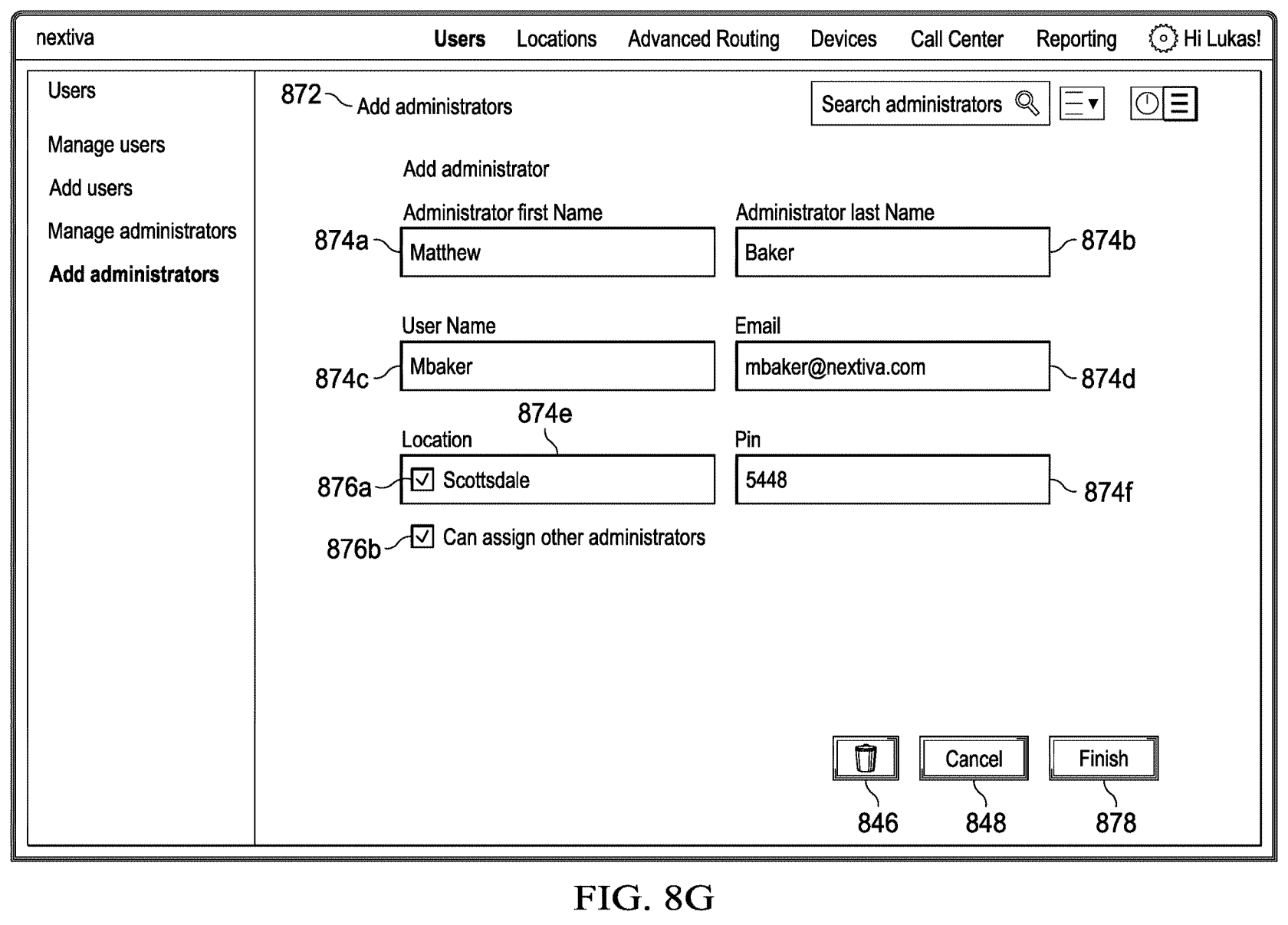

In response to selection of add 820d, user overview wizard 800 is updated to display an add administrators wizard 872 (FIG. 8G). Add administrators wizard 872 permits adding one or more administrators to a single location, multiple locations, and assign various rights and permissions to each of the administrators. Add administrators wizard 872 may comprise one or more text or selection boxes for entering, for example, administrator first name 874a, administrator last name 874b, username 874c, email 874d, location 874e, and PIN 874f. Add administrators wizard 872 may comprise one or more check boxes for associating an administrator with a location 876a and associating an administrator with privileges to assign other users as administrators 876b. Once information is entered, a user may select finish button 878 to store information in database 114.

Figure 10A:
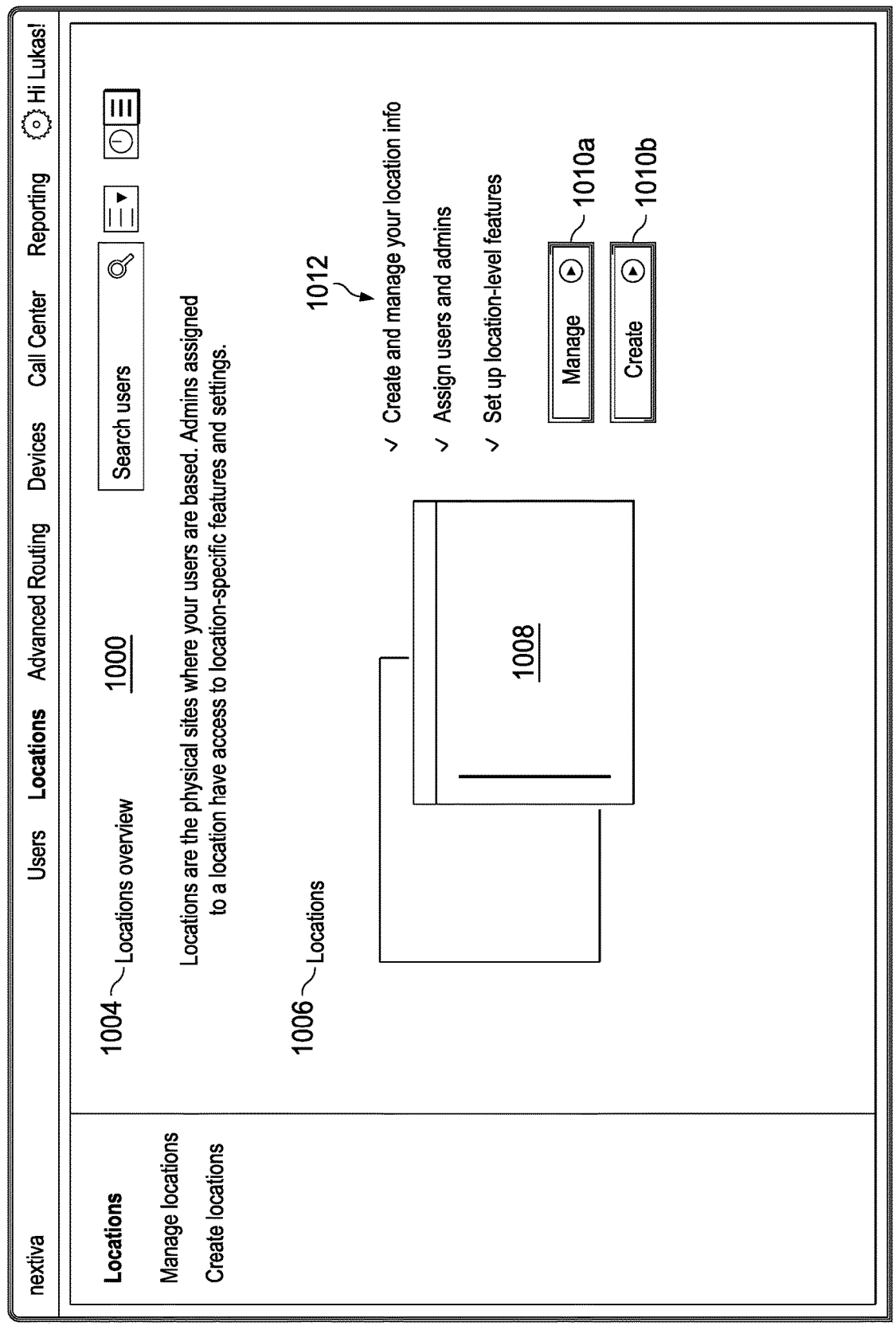

FIG. 10A illustrates a locations overview wizard 1000 of user interface 500 according to an embodiment. Locations overview wizard 1000 permits a user to manage locations, add locations, assign users and administrators to locations, and set up location-level features. In one embodiment, and in response to selection of locations top level menu choice 504b or locations dashboard 532 of user interface 500, locations overview wizard 1000 may display locations overview 1004, and locations feature overview 1006. Locations feature overview 1006 comprises screenshots 1008 and link buttons 1010a-1010b, each of which relates to one or more features. For example, as shown in FIG. 10A, locations overview 1004 comprises a locations feature overview 1006 comprising one or more screenshots 1008 which displays on interface 500 examples or pictures of locations overview wizard 1000 for the one or more features. Locations feature overview 1006 provides information 1012 including "create and manage your location info," "assign users and admins," and "set up location-level features." One or more link buttons 1010a-1010b allows for the selection of a feature, which causes locations overview wizard 1000 to update the display to show a wizard associated with the selected feature.

Figure 10B:
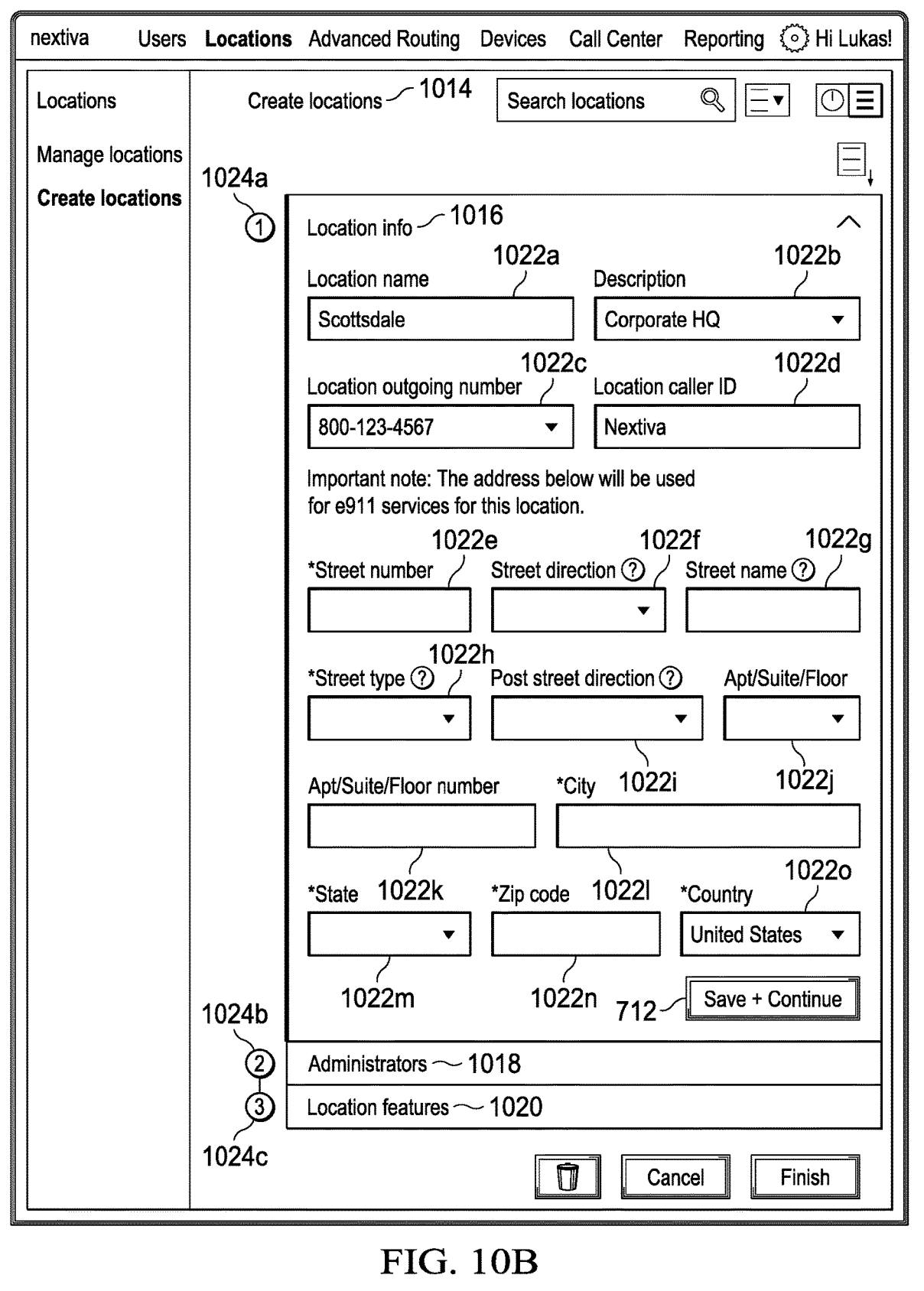

In response to selection of manage 1010a to manage locations, locations overview wizard 1000 is updated to display a manage locations wizard. Manage locations wizard permits the searching and selection of locations associated with a communication account and adjusting the configurations and settings associated with the locations. In response to selection of create 1010b to create locations, locations overview wizard 1000 is updated to display a create locations wizard 1014 (FIG. 10B). Create locations wizard 1014 permits creation and configuration of locations associated with a communication account.

FIG. 10B illustrates create locations wizard 1014 of locations overview wizard 1000 comprising an accordion function. Create locations wizard 1014 may comprise a three action process for creating locations associated with communication devices 124. According to an embodiment, create locations 1014 comprises a series of actions that are numbered off and, for example, provide for expanding and/or collapsing the one or more actions based on particular user needs. In this manner, one or more actions are presented as a single action, with various portions of the action sectioned off. According to a particular embodiment, the location information is entered into create locations wizard 1014, in a particular section or subwizard. Once information is entered, the next section expands and the information entered in the previous section may be collapsed or reduced. The process continues as information is entered into create locations wizard 1014, further sections expand and previous sections may collapse to facilitate the input of information into the system. In this manner, complex functionalities are divided into manageable portions according to the accordion function, which displays information only as needed at a particular time and avoiding the need to scroll up or down. The accordion function therefore provides for information to be presented, while still providing ease of access to all functions in an easy to use interface.

In addition, or as an alternative, create locations wizard 1014 may comprise a checklist structure of a user interface system. According to an embodiments the checklist structure checks off steps of a create locations user interface as a user completes the steps. The checklist structure permits a user to return to any previous steps and correct or change information by selecting the step from the list of steps. In one embodiment, a checkmark may be placed next each of the one or more steps as that step is completed.

Create locations wizard 1014 displays location information subwizard 1016, administrators subwizard 1018, and location features subwizard 1020 according to an accordion function. The accordion function permits create locations wizard 1014 to display only the features that are being configured by a user at a single time. In this way, the accordion function creates a linear path of actions to pass through one or more wizards. In accordance with an accordion function, the location information subwizard 1016 to be completed first by a user may be expanded automatically by interface 500 upon initiation of create locations wizard 1014. In addition, or as an alternative, interface 500 may monitor the cursor of a user or wait for a selection by the user before expanding one or more subwizards.

In one embodiment, location information subwizard 1016 may comprise text entry or drop down selection boxes for entering information for location name 1022a, description 1022b, location outgoing number 1022c, location caller ID 1022d, street number 1022e, street direction 1022f, street name 1022g, street type 1022h, post street direction 1022i, apt/suite/floor 1022j, apt/suite/floor number 1022k, city 1022l, state 1022m, zip code 1022n, and country 1022o. In addition, or as an alternative, one or more indicators 1024a-1024c may comprise guidance to a user as to an order or status of each action performed according to the accordion function. In one embodiment, when location information subwizard 1016 is expanded, indicator 1024a comprises a number 1 enclosed in a circle, indicating that location information subwizard 1014 should be completed first. In another embodiment, indicators 1024b-1024c may comprise a shaded or blurred numbers 2 and 3, respectively, that indicate that actions associated with these indicators 1024b-1024c are to be completed second and third after the action associated with indicator 1024a.

After information is entered into text entry or drop down selection boxes 1022a-1022n, accordion function may collapse location information subwizard 1016 and expand administrators subwizard 1018. In addition, selection of save and continue button 712 causes accordion function to collapse location information subwizard 1016 and expand administrators subwizard 1018 or another suitable wizard or subwizard, according to particular needs.

Figure 10C:
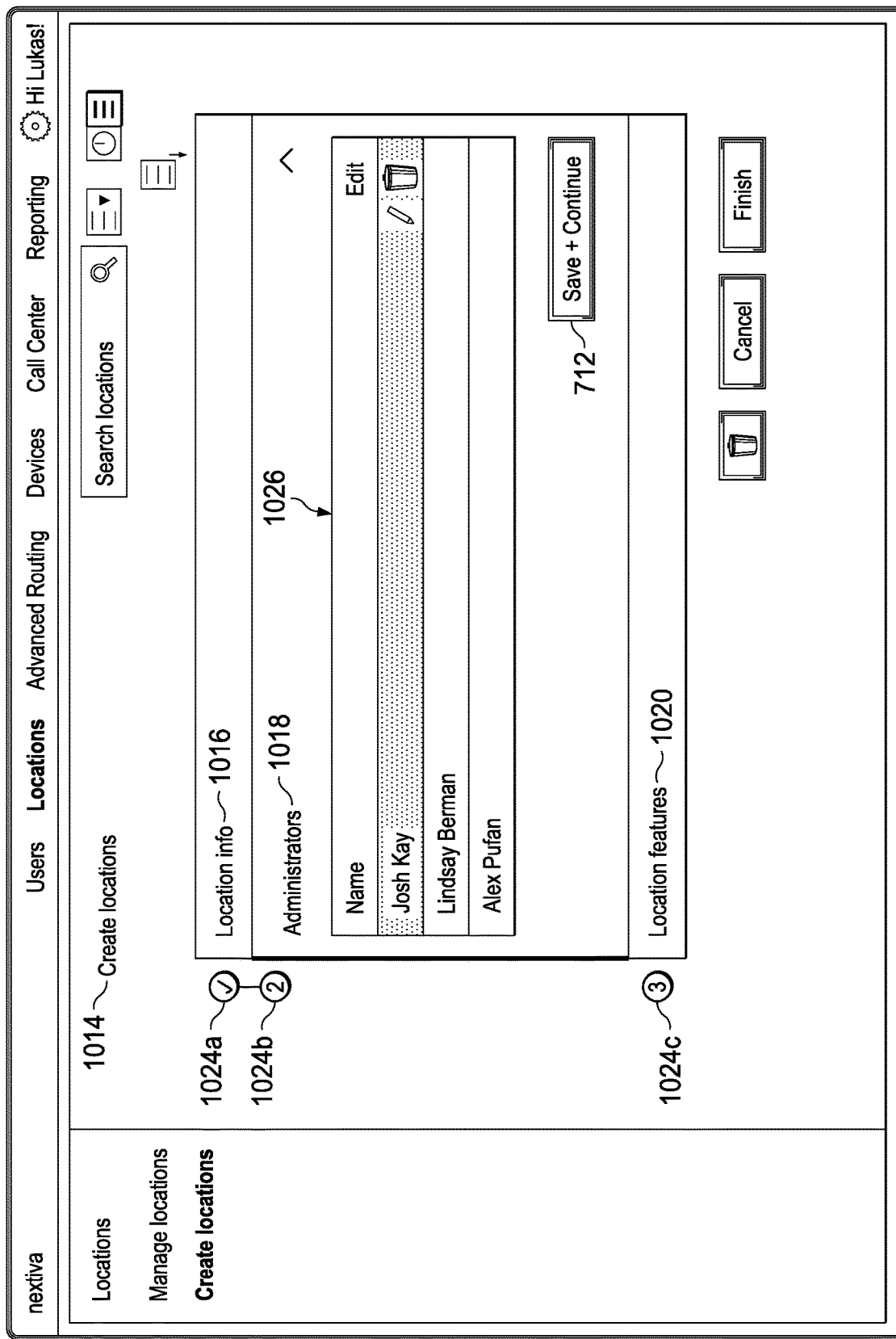

FIG. 10C illustrates administrators subwizard 1018 of locations overview wizard 1000 expanded according to the accordion function. As illustrated, location information subwizard 1016 is in a collapsed state and administrators wizard 1018 is in an expanded state. Additionally, indicator 1024*a* has changed into a checked box, indicating that the actions associated with location information subwizard 1016 is completed, and indicator 1024*b* has changed into a highlighted number 2, indicating that the actions associated with administrators subwizard 1018 are ready to be performed. In one embodiment, administrators subwizard 1018 permits searching, editing, and configuring the location information associated with one or more administrators. Administrators may be listed in a search box 1026 and selection of an administrator name may permit editing or deleting the selected administrator.

After actions associated with administrators subwizard 1018 are completed, accordion function may collapse administrators subwizard 1018 and expand location features subwizard 1020. In addition, or as an alternative, selection of save and continue button 712 causes accordion function to collapse administrators subwizard 1018 and expand location features subwizard 1020 or another suitable wizard or subwizard, according to particular needs.

Figure 10D:
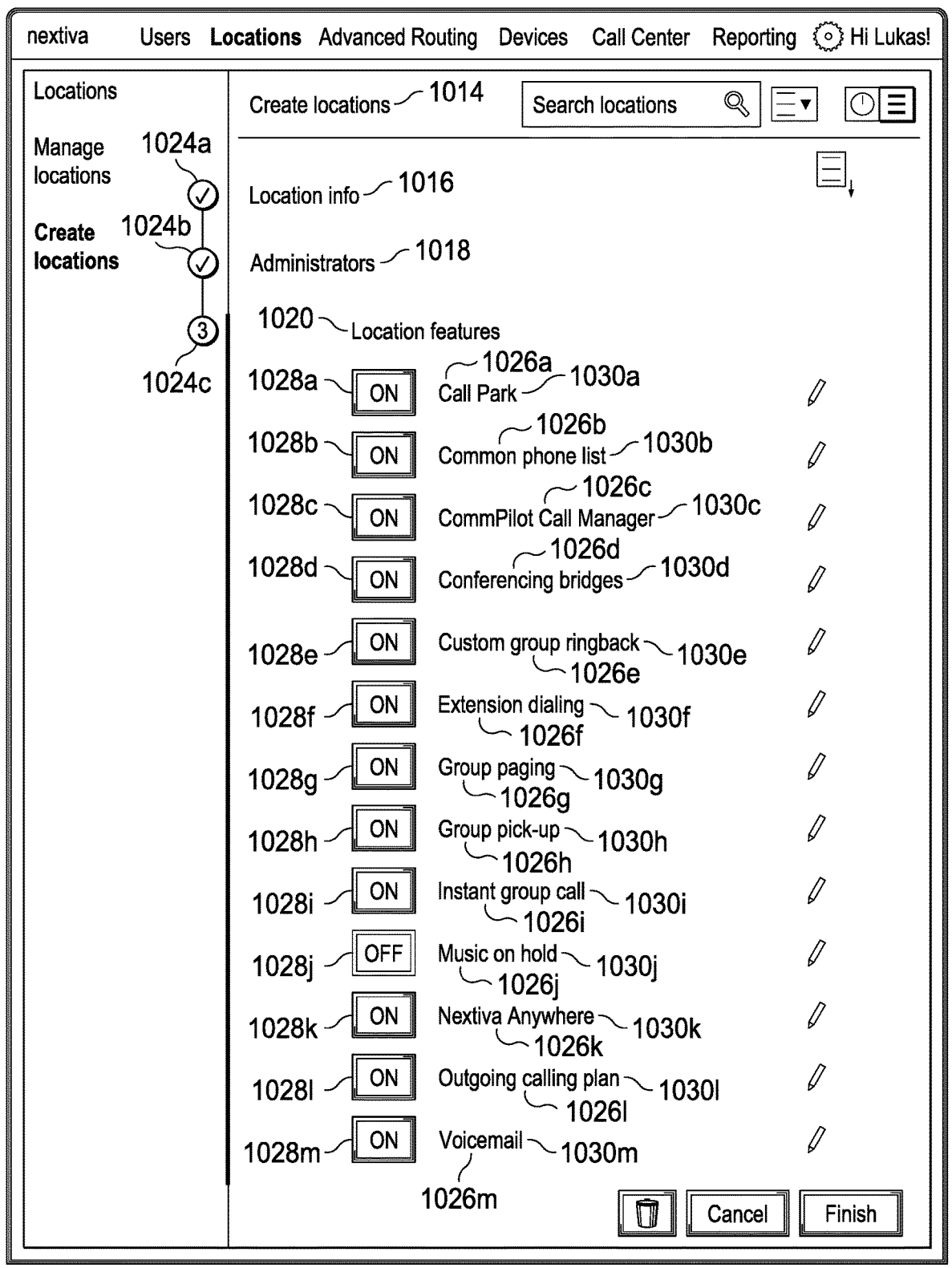

FIG. 10D illustrates location features subwizard 1020 locations overview wizard 1000 expanded according to the accordion function. In one embodiment, location features subwizard 1020 may permit locations of the user interface to be easily turned on and off. According to an embodiment, a list of the location features is presented to the user. Boxes next to the location features indicate whether the locations is on or off. The on or off button may be toggled, such that the location from an on status to an off status maybe selected. As illustrated, location features subwizard 1016 and administrators wizard 1018 are in a collapsed state and location features subwizard 1020 is expanded. In addition, indicator 1024*b* has changed into a checked box, indicating that the actions associated with administrators subwizard 1018 are completed, and indicator 1024*c* has changed into a highlighted number 3, indicating that the actions associated with location features subwizard 1020 are ready to be performed.

According to an embodiments, location features subwizard 1020 comprises an on and off functionality. Configuration settings of location features subwizard 1020 provides for location configuration features to be toggled on and off. In a non-limiting example, location configuration settings of location features subwizard 1020 may comprise call park 1030*a*, common phone list 1026*b*, CommPilot Call Manager 1026*c*, conferencing bridges 1026*d*, custom group ring back 1026*e*, extension dialing 1026*f*, group paging 1026*g*, group pick-up 1026*h*, instant group calls 1026*i*, music on hold 1026*j*, Nextiva Anywhere 1026*k*, outgoing calling plan 1026*l*, and voicemail 1026*m*. Each of the configuration settings 1026*a*-1026*m* may be associated with a switch 1028*a*-1028*m* and a help button 1030*a*-1030*m*. In one embodiment, switch 1028*a*-1028*m* permits each of the configuration settings 1026*a*-1026*m* associated with the switch to be toggled between an "on" state and an "off" state based on the position of the switch. In another embodiment, help buttons 1030*a*-1030*m* associated with each of the configuration settings 1026*a*-1026*m* permits a functional description functionality.

In association with the on and off functionality is a functional description functionality that provides for a detailed description of an associated function when a graphical element, such as help button 1030*a*-1030*m*, is selected. Although the functional description functionality is described in connection with an on and off functionality, the functional description functionality may provide a detailed description in connection with any feature, wizard, or functionality of user interface 500.

Figure 11A:
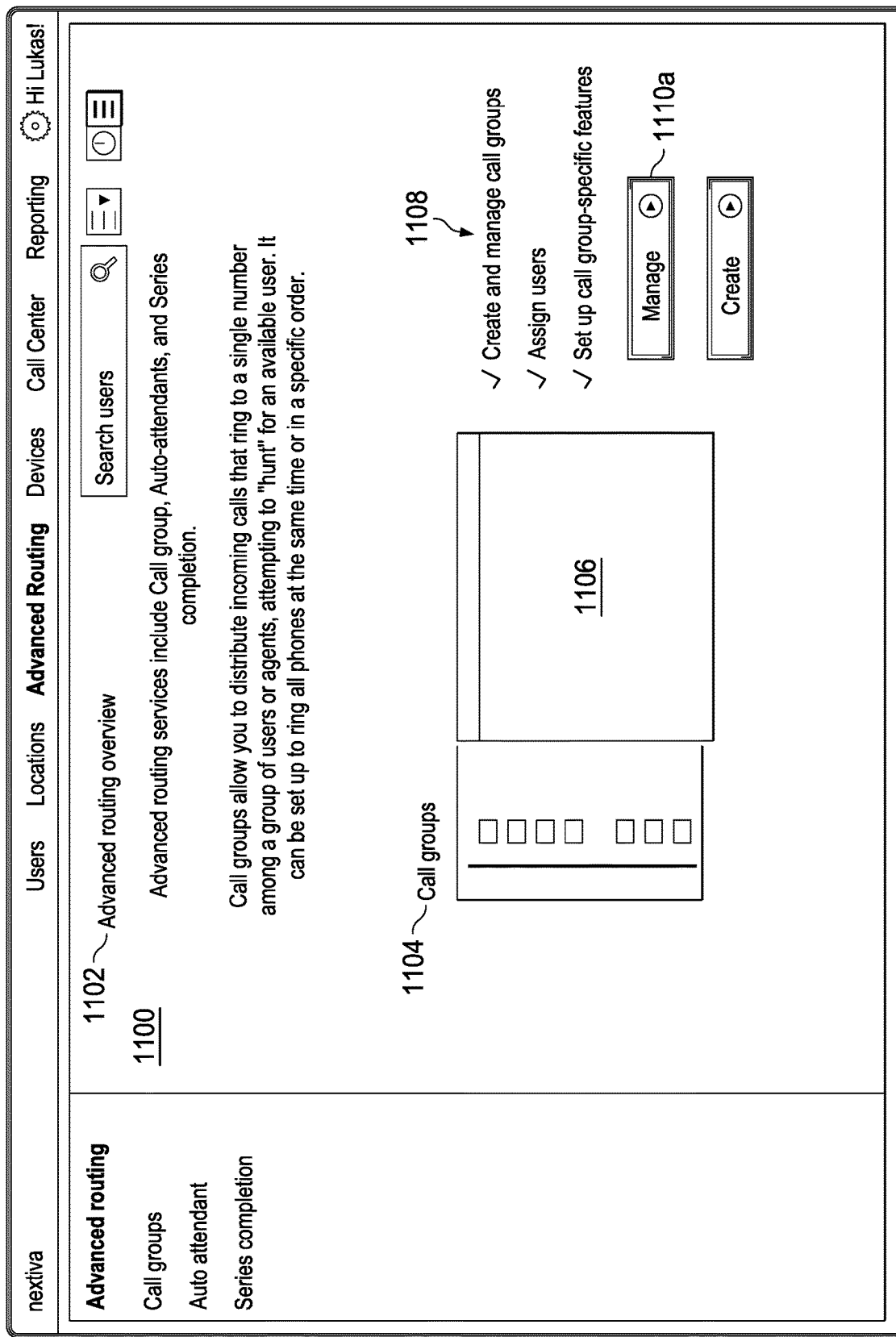
FIGS. 11A-11B illustrate an advanced routing wizard according to the user interface of FIG. 5.

FIG. 11A illustrates an advanced routing wizard 1100 of user interface 500 according to an embodiment. In one embodiment, and in response to selection of advanced routing top level menu choice 504*c* or advanced routing dashboard 538 of user interface 500, advanced routing wizard 1100 may display advanced routing overview 1102 and call groups feature 1104. In one embodiment, advanced routing wizard 1100 permits a user to manage advanced routing features, including configuring call groups, auto-attendants, and series completion. In one embodiment, advanced routing overview 1102 comprises a call groups feature 1104 comprising one or more screenshots 1106 which displays on interface 500 examples or pictures of the updated advanced routing wizard 1100 for call groups feature 1104. In addition, or as an alternative, call groups feature 1104 gives information 1108 including about the call groups feature 1104 including "create and manage call groups," "assign users," and "setup call group-specific features."

Figure 11B:
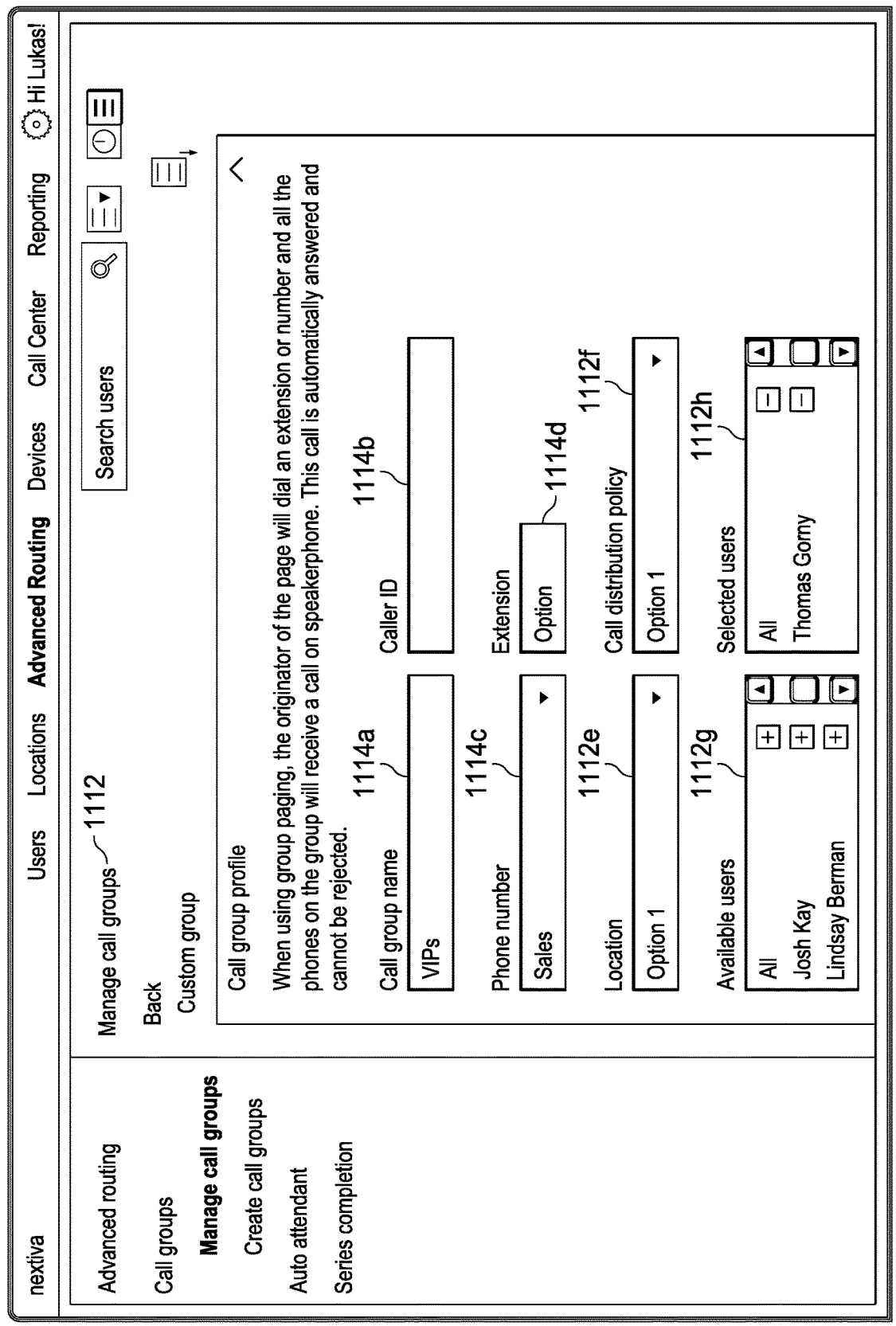

In response to selection of manage 1110*a* to manage call groups, advanced routing wizard 1100 is updated to display a manage call groups wizard 1112 (FIG. 11B). In one embodiment, manage call groups wizard 1112 permits configuration of a call group profile. A call group may comprise permitting a user to dial an extension or number from a first communication device 124 and causing one or more selected communication devices 124 to receive a communication from the first communication device 124. Configuration of the call group according to manage call groups wizard 1112 may comprise one or more text entry or selection boxes for call group name 1114*a*, caller identification (ID) 1114*b*, phone number 1114*c*, extension 112*d*, location 1114*e*, call distribution policy 1114*f*, available users 1114*g*, and/or selected users 1114*h*.

Figure 12:
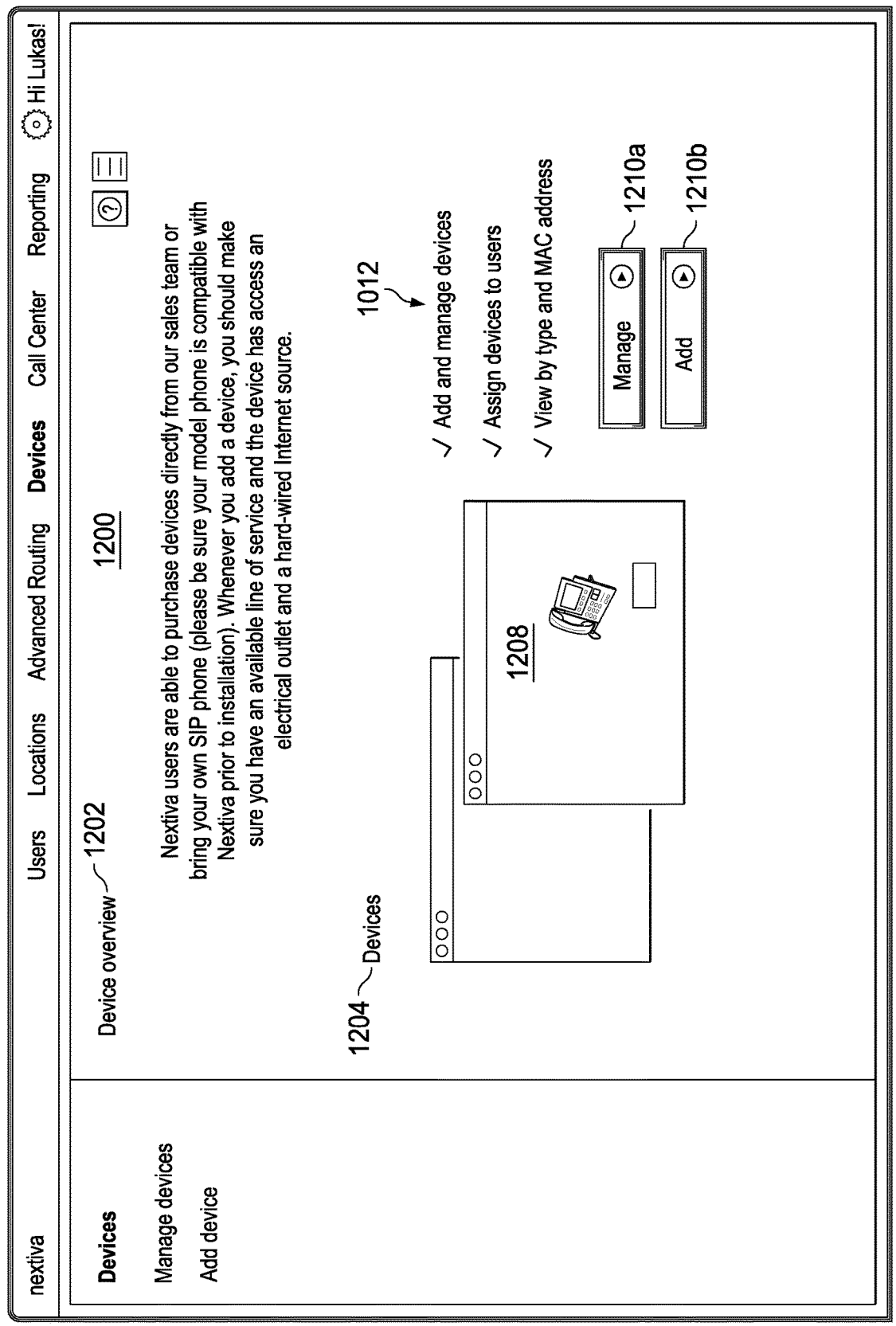
FIG. 12 illustrates a device wizard according to the user interface of FIG. 5.

FIG. 12 illustrates a device wizard 1200 of user interface 500 according to an embodiment. In one embodiment, device wizard 1200 permits a user to manage device features, including adding and viewing communication devices 124 to network 150 and configuring locations or users associated with communication devices 124. In response to selection of devices top level menu choice 504*d* or devices dashboard 534, interface 500 initiates display wizard 1200, which causes device wizard 1200 to display device overview 1202 and devices feature 1204. In an embodiment, device overview 1202 may comprise information regarding the content of devices wizard 1200. Devices feature 1204 may comprise screenshots 1208 and link buttons 1210*a*-1210*b*, each of which relates to one or more features associated with devices wizard 1200.

In one embodiment, devices feature 1204 comprises one or more screenshots 1208 which displays on interface 500 examples or pictures of the updated device wizard 1200. Devices feature 1204 provides information 1212 about devices feature 1204 including "add and manage devices," "assign devices to users," and "view by type and MAC address." In response to selection of manage 1210*a* to manage devices, device wizard 1200 is updated to display a manage devices wizard. In response to selection of add 1210*b* to add devices, device wizard 1200 is updated to display a add devices wizard 758, as discussed previously in connection with FIG. 7H.

Figure 13A:
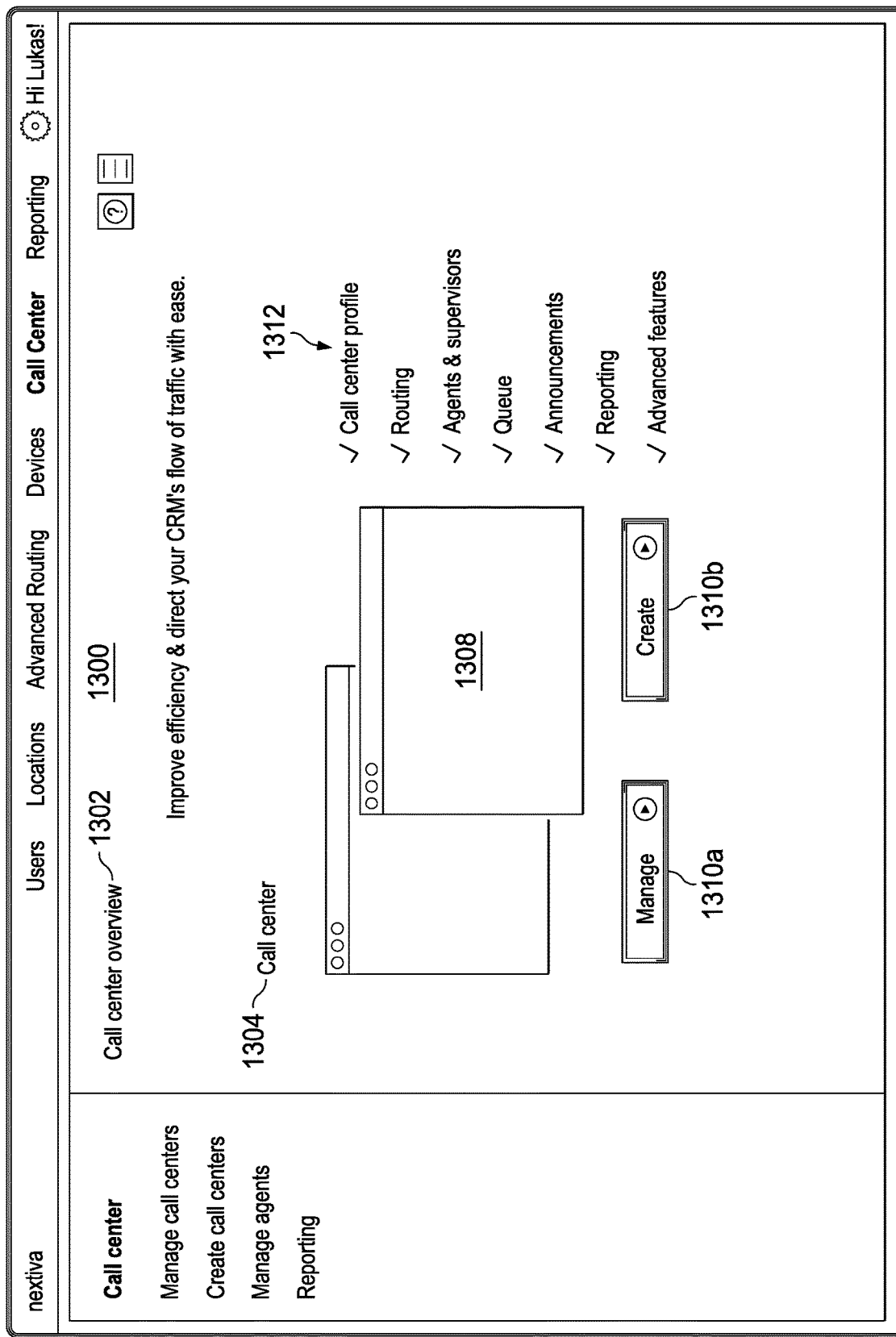
FIGS. 13A-13C illustrate a call centers wizard according to the user interface of FIG. 5.

FIG. 13A illustrates call center wizard 1300 of user interface 500 according to an embodiment. In one embodiment, call center wizard 1300 permits a user to manage call center features, including adding and setting up call centers, managing agents and supervisors, establish and modify routing, and other features as described below. In response to selection of call center top level menu choice 504e or call center dashboard 540, call center wizard 1300 causes task interface 804 to display call center overview 1302 and call center feature 1304. In one embodiment, call center overview 1302 may comprise information regarding the content of call center wizard 1300. In addition, call center feature 1304 may comprise screenshots 1308 and link buttons 1310a-1310b, each of which relates to one or more features associated with call center wizard 1300.

In one embodiment, call center feature 1304 comprises one or more screenshots 1308 which may display on interface 500 examples or pictures of the updated call center wizard 1300, such as, examples of manage call centers or create call centers wizards. Call center feature 1304 provides information 1312 about call center feature 1304 including "call center profile," "routing," "agents and supervisors," "queue," "announcements," "reporting," and "advanced features." In response to selection of manage 1310a to manage call centers, call center wizard 1300 is updated to display a manage call centers wizard. In response to selection of create 1310b to create call centers, call center wizard 1300 is updated to display a create call centers wizard 1314, as discussed in connection with FIGS. 13B-1 and 13B-2.

Figures 1, 13B:
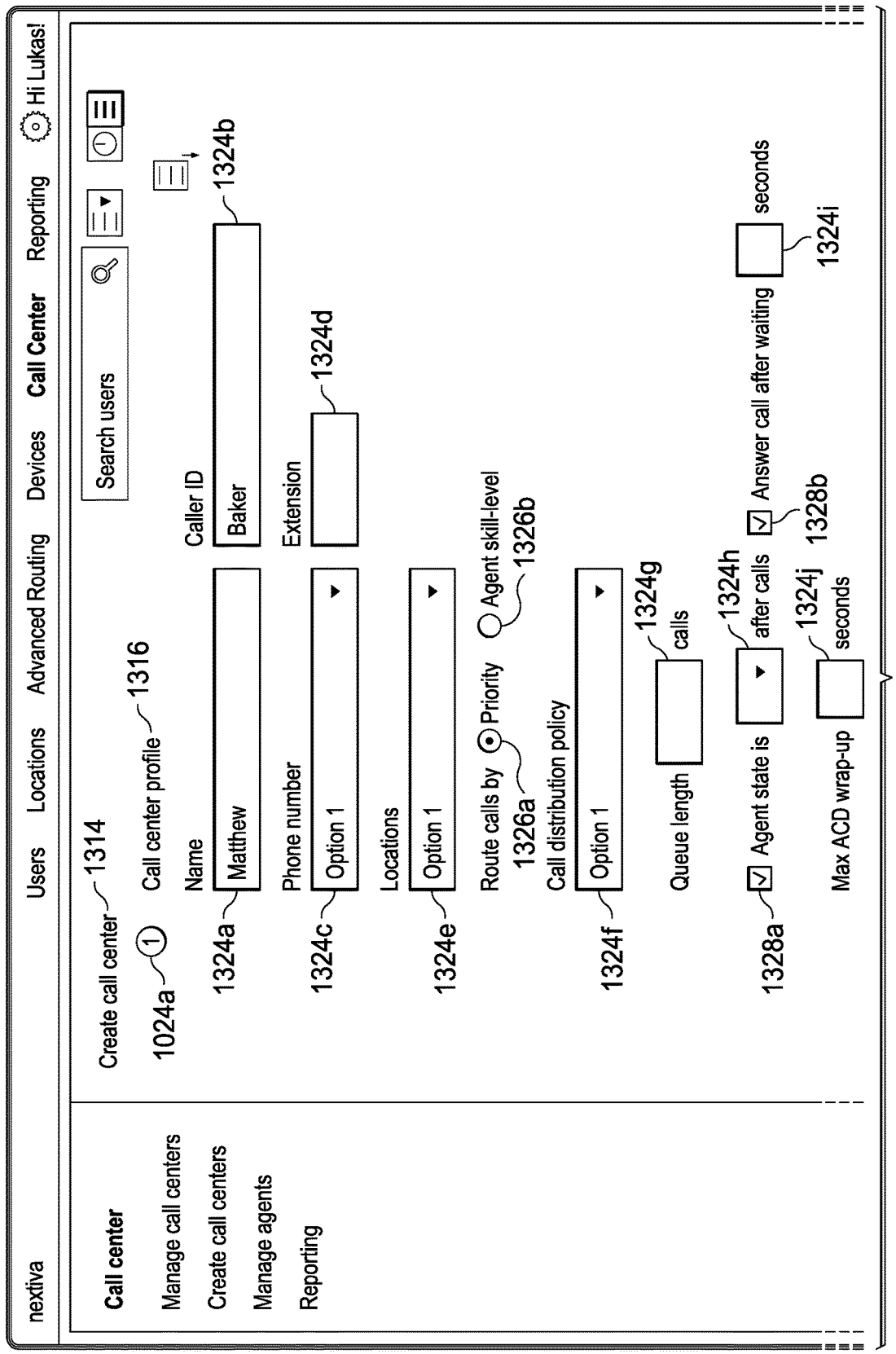
Figures 2, 13B:
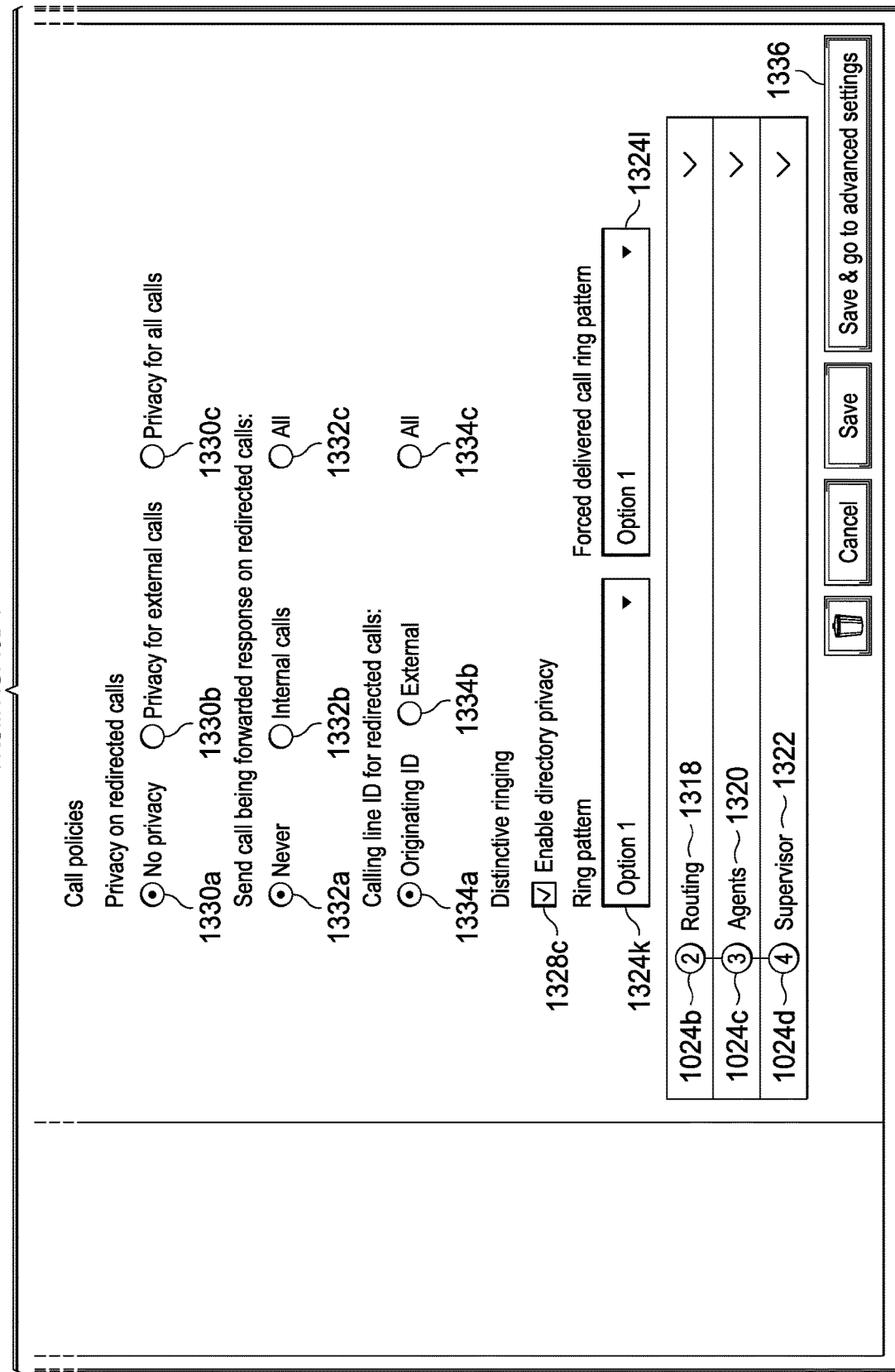

FIGS. 13B-1 and 13B-2 illustrate create call center wizard 1314 according to an accordion function, as described above. Create call center wizard 1314 comprises call center profile subwizard 1316, routing subwizard 1318, agents subwizard 1320, and supervisor subwizard 1322 according to an accordion function. The accordion function permits call center wizard 1300 to display only the features that are being configured by a user at a single time. In this way, the user's exposure is limited to only the configurations or settings that a user needs to do in the current subwizard, and is prevented from adjusting further configuration or settings in other subwizards until the current subwizard is completed. In addition, or as an alternative, each of the subwizards may be associated with an indicator 1022a-1022d which may be highlighted or shaded as actions are completed or are waiting to be completed discussed above.

As illustrated, create call center profile subwizard 1314 is in an expanded state and routing subwizard 1318, agents subwizard 1320, and supervisor subwizard 1322 are in a collapsed state. In one embodiment, create call center profile subwizard 1314 may comprise text entry or selection boxes for associating information with a call center profile, including, name 1324a, caller ID 1324b, phone number 1324c, extension 1324d, location 1324e, call distribution policy 1324f, queue length 1324g, agent state 1324h, wait time 1324i, maximum ACD wrap-up time 1324j, ring pattern 1324k, and forced delivered call ring pattern 1324l. Create call center profile subwizard 1314 may comprise radio selection boxes to choose between routing calls by priority 1326a or by agent skill-level 1326b; associating privacy on redirected calls by no privacy 1330a, privacy for external calls 1330b, or privacy for all calls 1330c; sending call being forwarded response on redirected calls never 1332a, only on internal calls 1332b, or for all calls 1332c; and associating caller line ID for redirected calls with originating ID 1334a, external ID 1334b, or all 1334c. Check boxes permit the selection of features to be associated with the call center profile such as setting an agent state after a user-defined number of calls 1328a, answering a call automatically after waiting a user-defined number of seconds 1328b, setting a maximum ACD wrap-up time 1324j, and enabling directory privacy 1328c. Although call center profile subwizard 1316 is indicated with particular features and in a particular configuration, embodiments contemplate any suitable combination or configuration of features, according to particular needs.

In addition, or as an alternative, after information is entered in call center profile subwizard 1314 or save and go to advanced settings button 1336 are selected, information is stored in database 114 and each of the subwizards 1314-1322 may collapse and expand according to the accordion function as discussed above to permit a user to complete the further actions associated with creating a call center.

Figure 13C:
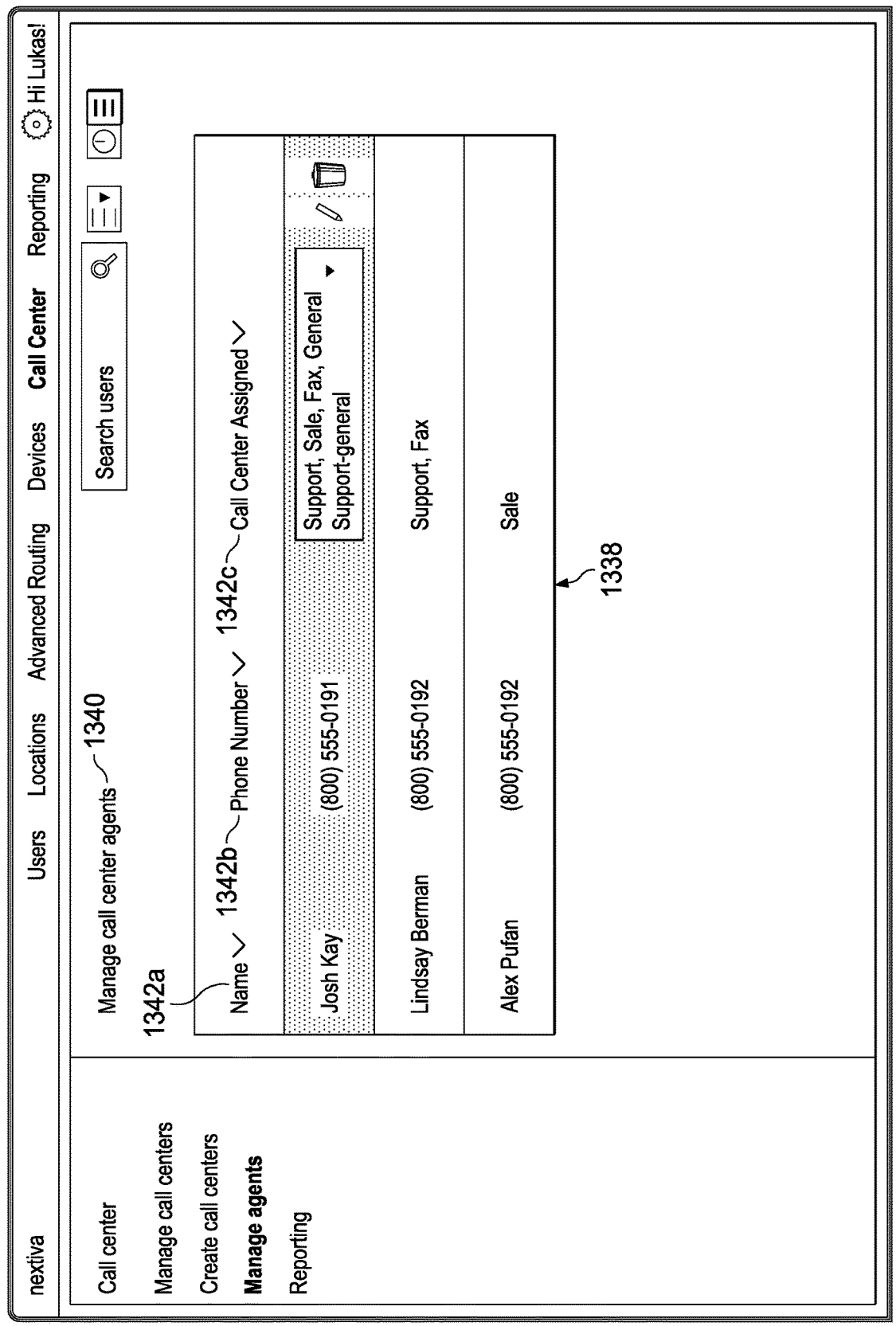

FIG. 13C illustrates manage call center agents wizard 1340 according to an embodiment. Manage call center agents wizard 1340 may be displayed in response to selection of manage call center agents. In one embodiment, manage call center agents wizard 1340 permits a user to assign and view, edit, and delete assignments of one or more users to one or more call centers. In addition, or as an alternative, manage call centers wizard 1340 may comprise a list 1338 of names 1342a, phone number 1342b, and call center assignments 1342c of one or more agents associated with a call center. Call center assignments 1342c may comprise, for example, support, sale, fax, general, and/or general support. Call center assignments 1342c are readily viewable from list 1338 which permits a quicker determination of call center assignments 1342c associated with each of one or more agents. According to an embodiment, a call center agent is one or more end user systems 120a-120n that is associated with a call center assignment and thereby is configured to be associated with one or more configuration settings of a call center, such as being assigned to one or more call center queues.

Figure 14A:
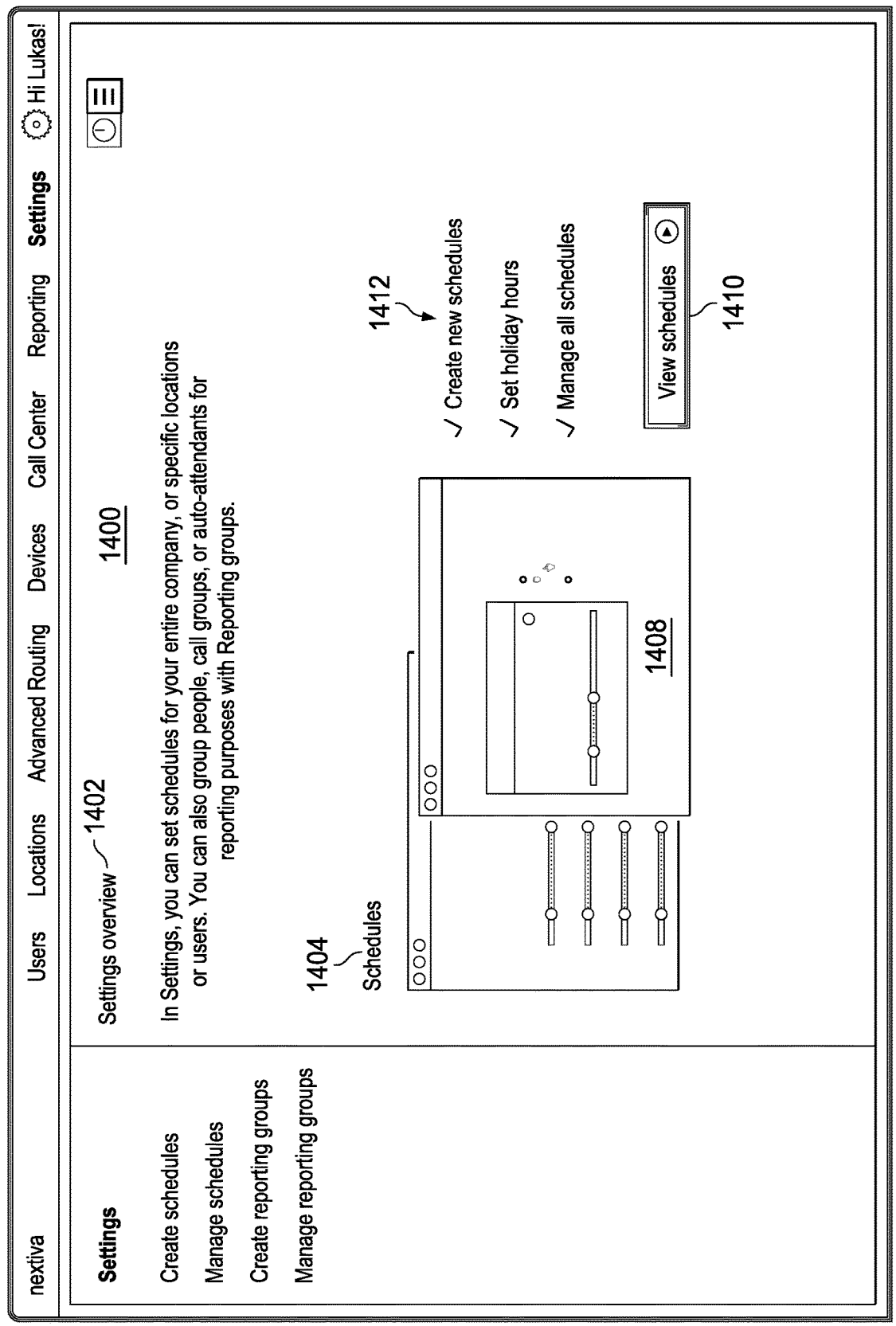
FIGS. 14A-14C illustrate a settings wizard according to the user interface of FIG. 5.

FIG. 14A illustrates a settings wizard 1400 of user interface 500 according to an embodiment. In one embodiment, settings wizard 1400 permits one or more end user systems 120a-120n to create and manage schedules for one or more users, an entire company, or for specific locations. Settings wizard 1400 may also permit grouping one or more end user systems 120a-120n, call groups, or auto-attendants for reporting purposes by creating and managing reporting groups. A reporting group may be, for example, one or more users that are organized differently then, for specific locations. For example, if one or more users are grouped together, such as sales in Phoenix and Los Angeles, a report may be run for this group, without having to tie this group to a specific locations.

In response to selection of settings top level menu choice 504g or settings dashboard 536, settings wizard 1400 displays settings overview wizard 1402 and schedules feature 1404. In one embodiment, settings overview 1402 may comprise information regarding the content of settings wizard 1400. In addition, or as an alternative, schedules feature 1404 may comprise screenshots 1408 and a link button 1410, which relates to a schedules feature 1404 associated with settings wizard 1400.

In one embodiment, schedules feature 1404 comprises one or more screenshots 1408 which may display on user interface 500 examples or pictures of the updated settings wizard 1404, such as, examples of schedules wizard and holidays and closures wizard. Schedules feature 1404 gives information 1412 about schedules feature 1404 including "create new schedules," "set holiday hours," and "manage all schedules." Link button 1410 allows for the selection of a view schedules feature 1404 which causes settings wizard 1400 to update the display to show a wizard associated with the selected feature 1404.

Figure 14B:
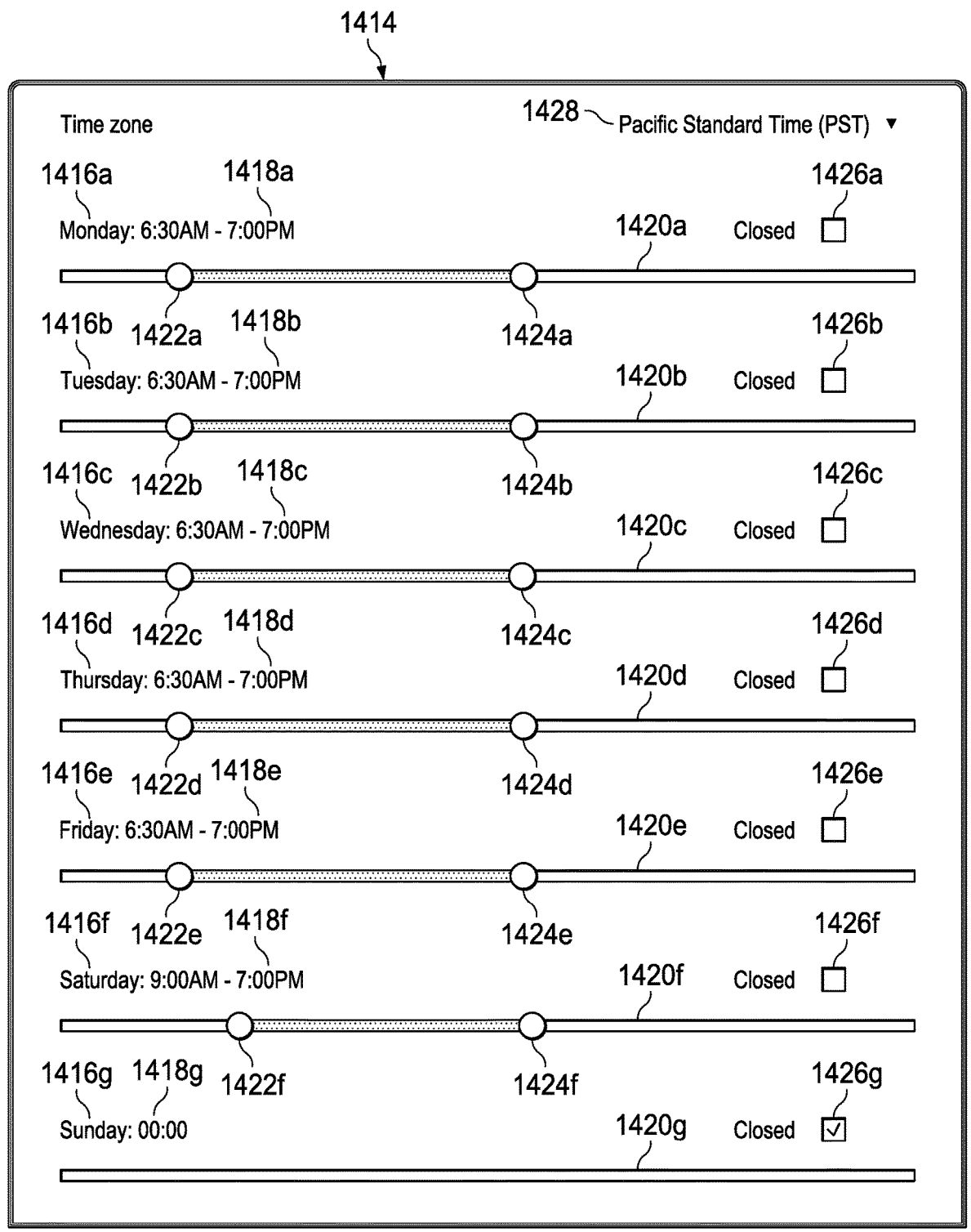

FIG. 14B illustrates a schedules wizard 1414 of user interface 500 according to an embodiment. In one embodiment, schedules wizard 1414 permits a user to associate time zones, schedules, breaks, and the like with one or more accounts of the system. Furthermore, a user is permitted to select one or more times when a call center is open or closed, and set time periods for one or more breaks when call center is open but not accepting calls.

Schedules wizard 1414 may comprise a schedule organized by, for example, one or more days of a week 1416*a*-1416*g*. Each of the days 1416*a*-1416*g* may be associated with a time period 1418*a*-1418*g* during which time the associated call center is open or closed. Time period 1418*a*-1418*g* may be adjusted by sliders 1420*a*-1420*g* and closed checkboxes 1426*a*-1426*g*. To indicate that a call center is open, a user checks or unchecks boxes 1426*a*-1426*g*. According to an embodiment, if the box is checked, schedules wizard 1414 receives an indication that the call center is closed on the associated day 1416*a*-1416*g* and associated slider 1420*a*-1420*g* is dimmed, such as Sunday slider 1420*g*. To adjust the time period for a day that the call center is open, a user may slide a first dial 1422*a*-1422*f* along the slider to a point that indicates an opening time and a second dial 1424*a*-1424*f* along the slider to a point that indicates the closing time. Embodiments contemplate adding one or more additional sliders or checkboxes to indicate break periods or other time restraints. A drop down selection box 1428 allows a user to change the time zone associated with the call center schedule.

Figure 14C:
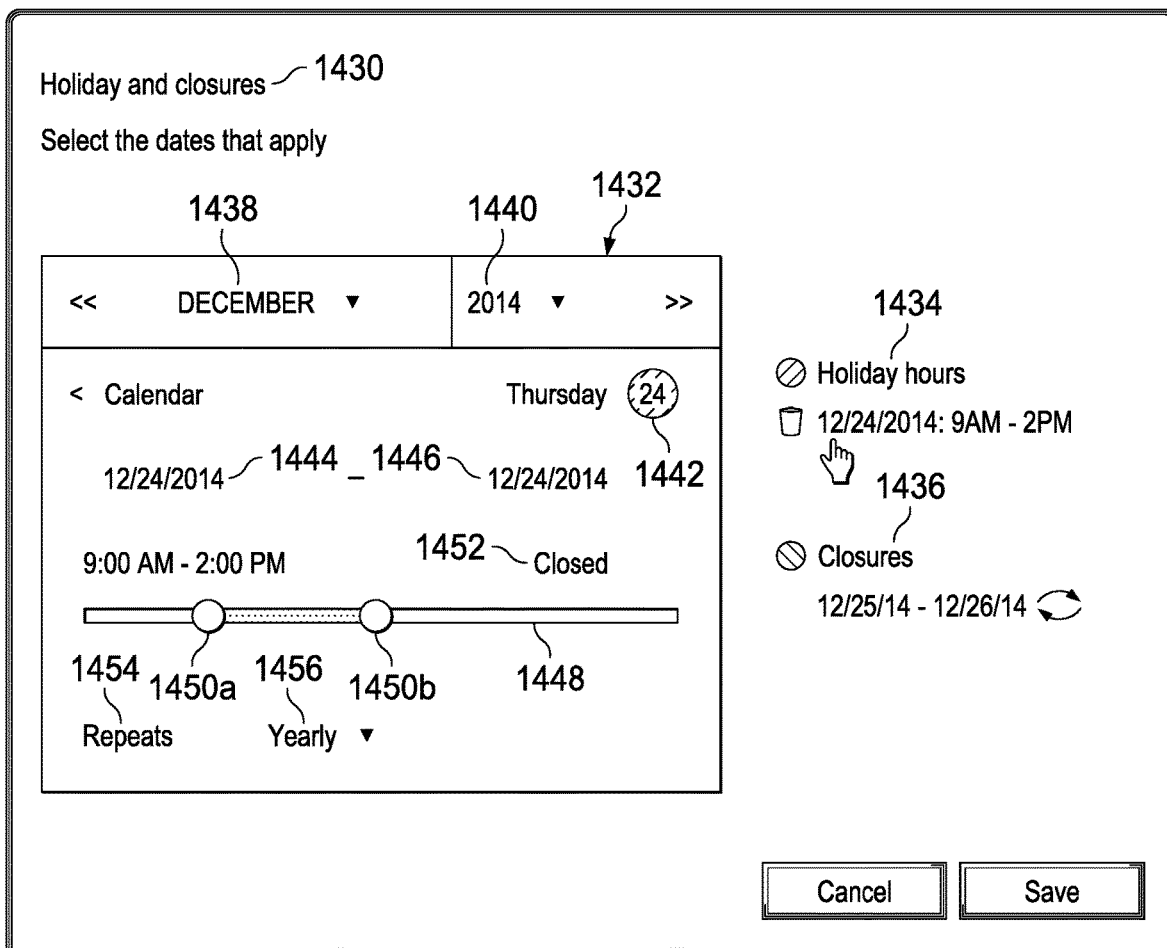

FIG. 14C illustrates holidays and closures wizard 1430 may comprise a calendar that permits a user to select one or more times and dates that the call center will be closed or that a special message or greeting will be played to callers to call center. According to some embodiments, the user may set a special time for a date during which the call centers hours will differ from the schedule set in schedules wizard 1414.

Holidays and closures wizard 1430 may comprise calendar picker tool 1432, holiday hours viewer 1434, and closures viewer 1436. Calendar picker tool 1432 comprises a month selector 1438, year selector 1440, and day selector 1442. A user may select according to the month selector 1438, year selector 1440, and day selector 1442 an date for a holiday or closure. According to some embodiments, calendar picker tool 1432 comprises a calendar that permits a user to scroll through days, years, and months to select an appropriate day for a holiday or closure.

In addition, or as an alternative, calendar picker tool 1432 permits a user to choose a starting date 1444 and an ending date 1446 for a holiday or closure. A slider bar 1448 permits a user to adjust by one or more dials 1450*a*-1450*b* a start time and end time, as described above in connection with sliders 1420*a*-1420*g*. Check boxes 1452 and 1454 permit a user to select whether the call center is closed 1452 on the date specified, and whether the holiday or closure repeats 1454 at a specified schedule. The time period for the repeating of the schedule may be selected by selection box 1456 and may be selected as any suitable time period, such as, yearly, monthly, weekly, daily, or the like. After a holiday or closure is selected by calendar picker tool 1432, holiday hours viewer 1434 and closures viewer 1436 display the holiday hours and days of closure, respectively, that were selected by calendar picker tool 1432.

Figure 15A:
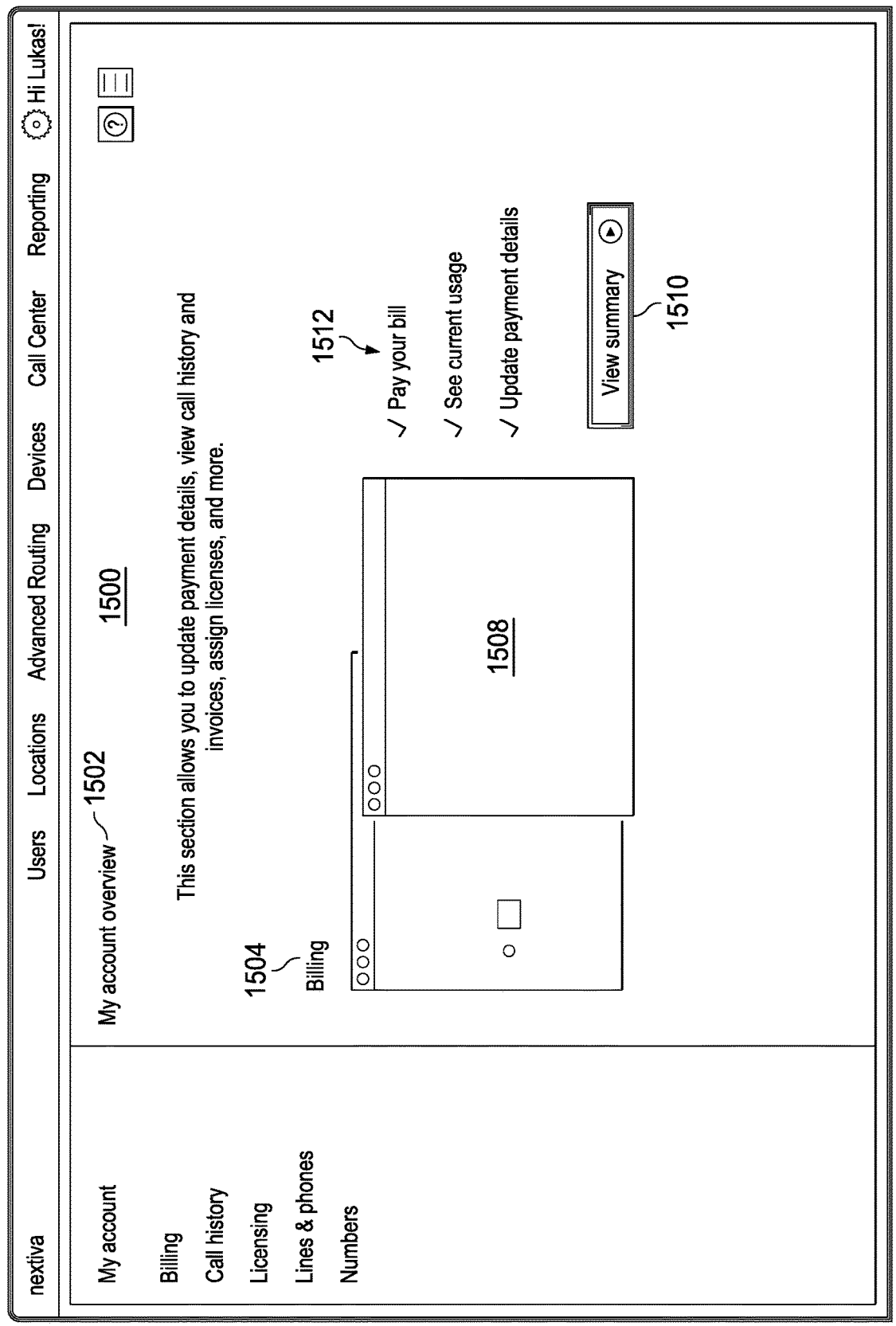

FIG. 15A illustrates my accounts wizard 1500 of user interface 500 according to an embodiment. In one embodiment, my accounts wizard 1500 permits one or more end user systems 120*a*-120*n* to update payment details, view call history and invoices, and assign licenses. In response to selection of my accounts top level menu choice 504*h*, my accounts wizard 1500 displays my accounts overview wizard 1502 and billing feature 1504. My accounts overview 1502 may comprise information regarding the content of my accounts wizard 1500. Billing feature 1504 may comprise screenshots 1508 and a link button 1510, which relates to a billing feature 1504 associated with my accounts wizard 1500.

In one embodiment, billing feature 1504 comprises one or more screenshots 1508 which may display on interface 500 examples or pictures of my accounts wizard 1500, such as, for example a billing wizard, a call history wizard, a licensing wizard, a lines and phone wizard, and a numbers wizard. Billing feature 1504 provides information 1512 about billing feature 1504 including "pay your bill," "see current usage," and "update payment details." Link button 1510 allows for the selection of a billing feature 1504 which causes task interface 804 to update the display to show a wizard associated with the selected feature 1504.

FIG. 15B illustrates a billing summary wizard 1514 of user interface 500 according to an embodiment. In one embodiment, billing summary wizard 1514 permits a user to update credit card information, view invoices, pay bills, and the like. Information presented to the user may include the number of lines in use 1516*a*, numbers transferred 1516*b*, and devices in use 1516*c*. A billing summary list 1518 may provide call type 1520*a*, minutes of usage 1520*b*, credit usage 1520*c*, and a detailed view of charges 1520*d*. Further information provided by billing summary wizard 1514 includes viewing history and invoice details, totals of credit usage, monthly charges, and current bill totals. According to some embodiments, billing summary wizard provides a pay button 1522 that permits a user to pay a current invoice. A user may edit the payment information in the payment details summary 1524 provided.

Figure 16A:
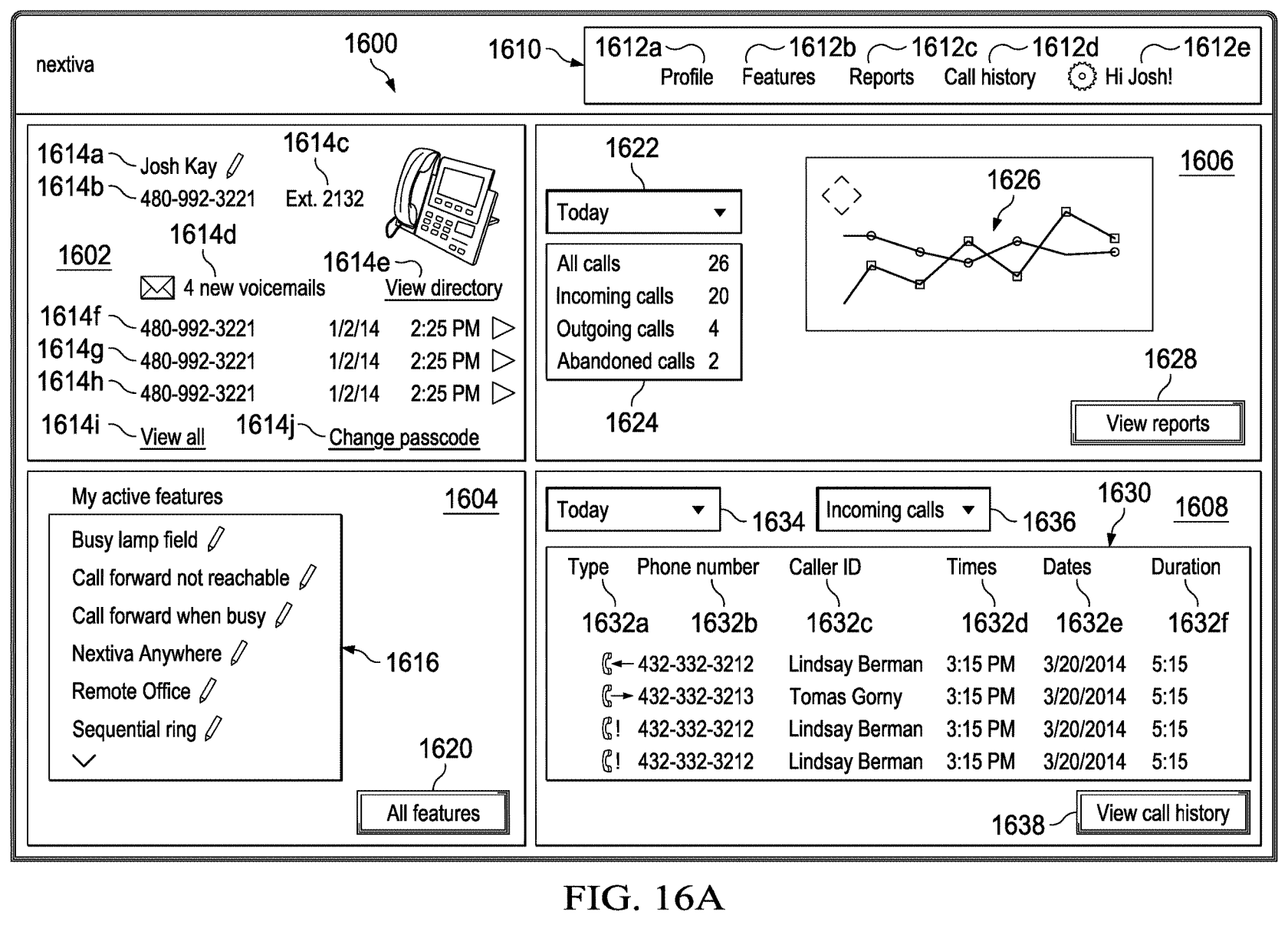

FIG. 16A illustrates a user portal 1600 of interface 500 according to an embodiment. In one embodiment, user portal 1600 provides an interface for a user that does not have administrator status. Each of the one or more end user systems 120*a*-120*n* that does not have an administrator status may have a different user portal 1600 that provides for logging into and managing a user account, such as, viewing and changing configurations and settings associated with the non-administrator account.

According to an embodiment, one or more end user systems 120*a*-120*n* are permitted to view only the functionalities that are available to them. For example, based on the settings selected by an administrator, one or more features may be shown or hidden from the non-administrative user. User portal 1600 may comprise user summary 1602, active features summary 1604, reports summary 1606, and call history 1608. User summary 1602 may comprise user name 1610*a*, assigned phone number 1610*b*, extension 1610*c*, voicemail indicator 1610*d*, link to view directory 1610*e*, missed calls 1610*f*-1610*h*, view all missed calls link 1610*i*, and change passcode link 1610*j*.

Active features summary 1604 may comprise a list 1612 of currently active features 1614*a*-1614*f*. Selection of one of the currently active features 1614*a*-1614*f* permits a user to edit one or more configuration settings associated with the active features 1614*a*-1614*f* Additionally, selection of the all features button 1620 permits a user to view and edit all features 1616 available to the user by opening the user features wizard 1640. User features wizard 1640 will be discussed in more detail in connection with FIG. 16B.

Reports summary 1606 of user portal 1600 may comprise call statistics for a predefined period and charts that represent the selected statistics. According to an embodiment, reports summary 1606 comprises drop down box 1622 which permits a user to select a time period over which statistics 1624 and charts 1626 will display data relating to a user's calls. For example, the current selection for drop down box 1622 is the time period "today," and statistics 1624 shows that the user has a total of 26 calls today, of which 20 were incoming calls, 4 were outgoing calls, and 2 were abandoned calls. Additionally, a user may elect view reports button 1628 to launch a view reports wizard, which provides for additional reports associated with the user's call data.

Call history 1608 may comprise a list 1630 of calls made to and from the user account. Call history list 1630 may comprise the type of call 1632a (such as whether the call was incoming, outgoing, or abandoned), phone number 1632b, caller ID 1632c, time of call 1632d, date of call 1632e, and duration of call 1632f The list may be sorted according to a time period or by call type by selecting an appropriate choice in time period selection box 1634 or call type selection box 1636. According to some embodiments, a user may launch the call history wizard to a larger list of the call history and edit or modify the call history by selecting view call history button 1638.

Figure 16B:
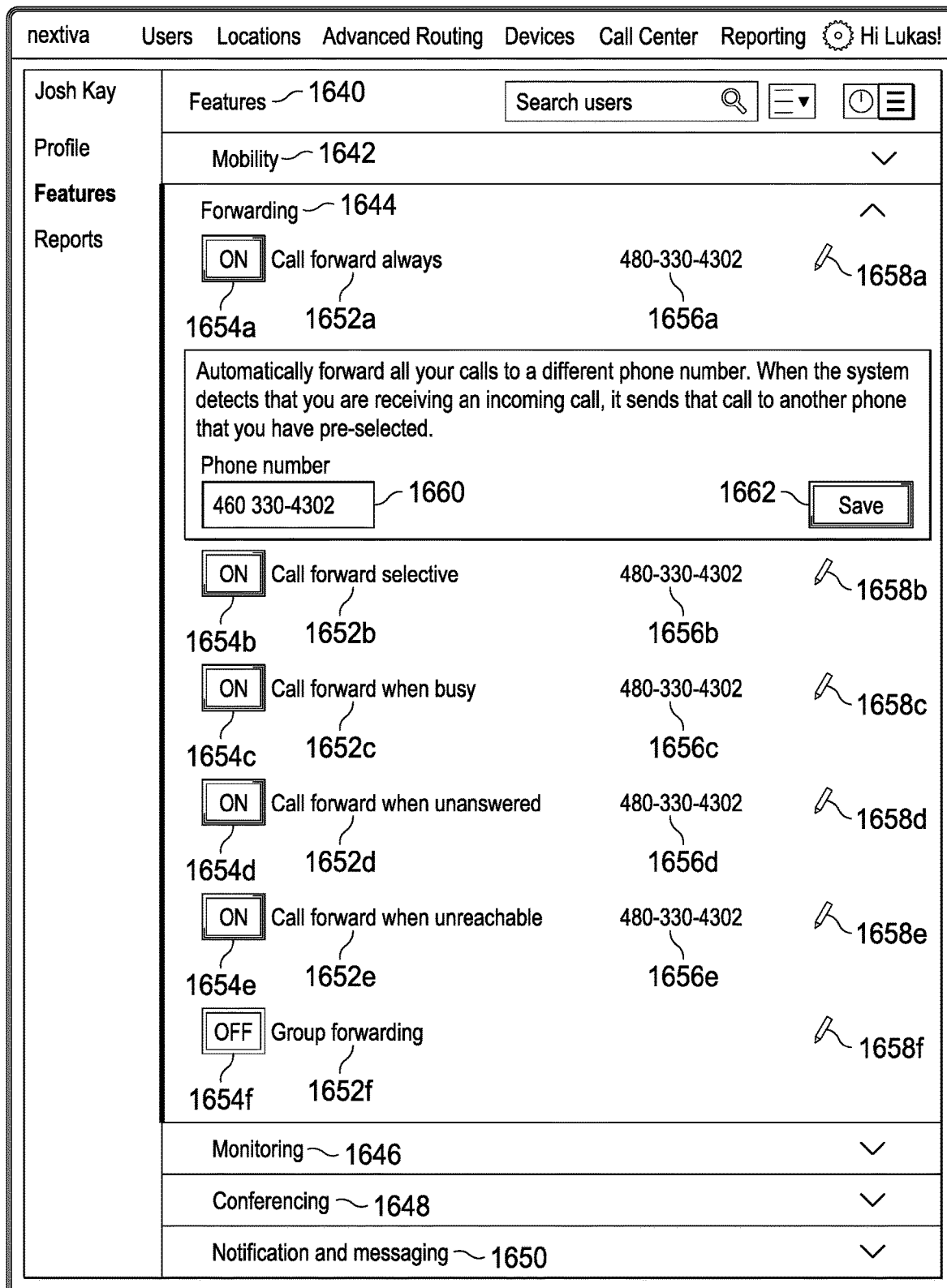

FIG. 16B illustrates a user features wizard 1640 according to an embodiment. In response to selection all features 1616, user portal 1600 updates to display user features wizard 1640. User features wizard 1640 may permit a user to select, modify, and turn on and off various features associated with the user account. According to an embodiment, the configurations and settings may be grouped into one or more subwizards that are expanded or collapsed according to an accordion function.

In one embodiment, user features wizard 1640 may comprise mobility subwizard 1642, forwarding subwizard 1644, monitoring subwizard 1646, conferencing subwizard 1648, and notification and messaging subwizard 1650. As illustrated forwarding subwizard 1644 is expanded and comprises features 1652a-1652f that may be toggled on and off by switches 1654a-1654f and edited by edit button 1658a-1658f. Each of the features 1652a-1652f may be associated with a phone number 1656a-1656e or other setting.

In response to selection of call forward always feature 1652a, user portal 1600 expands according to the accordion function and permits a user to edit the associated phone number by a phone number edit box 1660. Changes to the phone number may be saved by selection of save button 1662. Embodiments contemplate the editing or modifying of other settings associated with each of the features 1652a-1652f according to particular needs.

As can be seen from the above disclosure, the clean structure of user interface 500 and the accordion function permits an interface to be equally useful on any sized device with any type of input, such as a laptop, tablet, smartphone, or the like. Similarly, the product has sufficient design that everyone in an organization may be able to use the interface, not simply a highly-trained technical user. Among other things, user interface 500 eliminates and reduces the number of calls that users will have to make into a help desk. In addition, embodiments provide for complex functionalities of user interface 500 to be greatly simplified according to current disclosure. For example, time to accomplish a task is greatly reduced and the number of steps are greatly reduced, that is, features now take less clicks and less time.

As an example only and not by way of limitation, if a first user is setting up a location according to customer management system 100 and wants to assign an administrator to the location but the administrator is not in the list of current administrators, prior art interfaces require abandoning the process, opening an administrator creation process, setting up a new administrator, and returning to the location setup. However, according to the present disclosure, a user may simply add an administrator in the setting up location process, greatly reducing the steps and time needed to set up the location.

By way of further example, TABLE 1 illustrates the time savings using the set up process of the current disclosure compared with prior art set up processes.

TABLE 1

| Method | # of Clicks | Total Time | Time saved |
| --- | --- | --- | --- |
| The Old Way | 124 | 165 minutes | |
| The Current Disclosure | 64 | 85 minutes | 80 minutes |

As shown above, user interface 500 of the current disclosure greatly reduces the number of clicks and amount of time to setup and/or use customer management system 100 and user interface 500. For example, and as shown above, prior art required, for example, 124 clicks, to accomplish an exemplary task, while the current disclosure requires only 64 clicks. Similarly, prior art required an additional one hour and twenty minutes of productivity time in performing the same function.

Additional evidence of the time and amount of clicks savings can be seen in TABLE 2.

TABLE 2

| | SAVE TIME AND STEPS | | | |
| --- | --- | --- | --- | --- |
| | Old system | New portal | Difference | Time saved |
| Setting up busy lamp freid (BLF) | 20 | 6 | 14 | 20 mins |
| Setting up shared call appearance (SCA) | 21 | 8 | 13 | 15 mins |
| Creating a call/hunt group | 11 | 4 | 7 | 10 mins |
| Creating an auto attendant | 10 | 4 | 6 | 10 mins |
| Creating a schedule | 9 | 4 | 6 | 7 mins |
| Setting up call forwarding always | 9 | 5 | 4 | 3 mins |
| Setting up call forwarding not reachable | 9 | 6 | 3 | 3 mins |
| Adding a device to the account | 6 | 4 | 2 | 3 mins |
| Adding an administrater | NA | 4 | — | — |
| Making a payment | 3 | 5 | −2 | |

As shown above, the current disclosure "new portal" saves time and steps for every process or action.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A system, comprising:
a communication device comprising an identification number; and
a computer comprising a processor and memory, the computer coupled with a database and configured to:
initiate a setup process;
receive the identification number;
receive configuration data; and
in response to receiving the configuration data and the identification number, associate the configuration data with the communication device;
add an administrator to a location when creating a new location using a location creation wizard by:
displaying a user interface comprising the location creation wizard, the location creation wizard comprising one or more subwizards;
displaying a first subwizard of the one or more subwizards in an expanded state;
receiving by an input to the first subwizard an outgoing number associated with the new location;
after receiving the outgoing number associated with the new location, continue monitoring the input for an expansion condition;
expanding automatically a second subwizard of the location creation wizard in response to detecting the expansion condition;
receiving by the input to the second subwizard assignment of an administrator to the new location, wherein the administrator is not in a list of current administrators; and
storing the assignment of the administrator to the new location; and
automatically change a configuration of the communication device based, at least in part, on the configuration data and assign management of the communication device to the administrator of the new location in response to removal of the communication device from a first location in a network and coupling of the communication device to a second location in the network, wherein the second location comprises the new location.

2. The system of claim 1, wherein the computer is further configured to:
monitor the input for a collapse condition; and
automatically collapse the first subwizard in response to detecting the collapse condition.

3. The system of claim 1, wherein the computer is further configured to receive user information, and receive the user information comprises:
sending a blank user template;
receiving a user template comprising user information;
validating the user information in the user template;
displaying errors in the user information; and
receiving a corrected user template.

4. The system of claim 3, wherein the user information comprises a user name and a location.

5. The system of claim 4, wherein the computer is further configured to:
associate the communication device with the user name and the location.

6. A method, comprising:
initiating, by a computer, a setup process of a communication device;
receiving, by a computer, an identification number of the communication device;
receiving, by the computer, configuration data; and
associating, by the computer, the configuration data with the communication device in response to receiving the configuration data and the identification number;
adding, by the computer, an administrator to a location when creating a new location using a location creation wizard by:
displaying a user interface comprising the location creation wizard, the location creation wizard comprising one or more subwizards;
displaying a first subwizard of the one or more subwizards in an expanded state;
receiving by an input to the first subwizard an outgoing number associated with the new location;
after receiving the outgoing number associated with the new location, continue monitoring the input for an expansion condition;
expanding automatically a second subwizard of the location creation wizard in response to detecting the expansion condition;
receiving by the input to the second subwizard assignment of an administrator to the new location, wherein the administrator is not in a list of current administrators; and
storing the assignment of the administrator to the new location; and
automatically changing, by the computer, a configuration of the communication device based, at least in part, on the configuration data and assigning, by the computer, management of the communication device to the administrator of the new location in response to removal of the communication device from a first location in a network and coupling of the communication device to a second location in the network, wherein the second location comprises the new location.

7. The method of claim 6, further comprising:
monitoring the input for a collapse condition; and
automatically collapsing the first subwizard in response to detecting the collapse condition.

8. The method of claim 6, further comprising receiving user information, and wherein receiving the user information comprises:
sending a blank user template;
receiving a user template comprising user information;
validating the user information in the user template;
displaying errors in the user information; and
receiving a corrected user template.

9. The method of claim 8, wherein the user information comprises a user name and a location.

10. The method of claim 9, further comprising:
associating the communication device with the user name and the location.

11. A non-transitory computer-readable medium embodied with software, the software when executed is configured to:
initiate a setup process of a communication device;
receive an identification number of the communication device;
receive configuration data; and
associate the configuration data with the communication device in response to receiving the configuration data and the identification number;
add an administrator to a location when creating a new location using a location creation wizard by:

displaying a user interface comprising the location creation wizard, the location creation wizard comprising one or more subwizards;

displaying a first subwizard of the one or more subwizards in an expanded state;

receiving by an input to the first subwizard an outgoing number associated with the new location;

after receiving the outgoing number associated with the new location, continue monitoring the input for an expansion condition;

expanding automatically a second subwizard of the location creation wizard in response to detecting the expansion condition;

receiving by the input to the second subwizard assignment of an administrator to the new location, wherein the administrator is not in a list of current administrators; and storing the assignment of the administrator to the new location; and automatically change a configuration of the communication device based, at least in part, on the configuration data and assign management of the communication device to the administrator of the new location in response to removal of the communication device from a first location in a network and coupling of the communication device to a second location in the network, wherein the second location comprises the new location.

12. The non-transitory computer-readable medium of claim 11, wherein the software is further configured to:
monitor the input for a collapse condition; and
automatically collapse the first subwizard in response to detecting the collapse condition.

13. The non-transitory computer-readable medium of claim 11, wherein the software is further configured to receive user information, and receiving the user information comprises:
sending a blank user template;
receiving a user template comprising user information;
validating the user information in the user template;
displaying errors in the user information; and
receiving a corrected user template.

14. The non-transitory computer-readable medium of claim 13, wherein the user information comprises a user name and a location.

15. The non-transitory computer-readable medium of claim 14, wherein the software is further configured to:
associate the communication device with the user name and the location.

* * * * *